US008549143B2

(12) United States Patent
Mandato et al.

(10) Patent No.: US 8,549,143 B2
(45) Date of Patent: Oct. 1, 2013

(54) SPECIFICATION OF A SOFTWARE ARCHITECTURE FOR CAPABILITY AND QUALITY-OF-SERVICE NEGOTIATIONS AND SESSION ESTABLISHMENT FOR DISTRIBUTED MULTIMEDIA APPLICATIONS

(75) Inventors: Davide Mandato, Stuttgart (DE); Teodora Guenkova-Luy, Ulm (DE); Andreas Kassler, Ulm (DE); Markus Nosse, Ulm (DE)

(73) Assignees: Sony Deutschland GmbH, Berlin (DE); Nokia Siemens Networks GmbH & Co. KG, München (DE)

( * ) Notice: Subject to any disclaimer, the term of this patent is extended or adjusted under 35 U.S.C. 154(b) by 1855 days.

(21) Appl. No.: 10/532,311

(22) PCT Filed: Oct. 15, 2003

(86) PCT No.: PCT/EP03/11439
§ 371 (c)(1),
(2), (4) Date: Jul. 24, 2006

(87) PCT Pub. No.: WO2004/039031
PCT Pub. Date: May 6, 2004

(65) Prior Publication Data
US 2006/0294112 A1 Dec. 28, 2006

(30) Foreign Application Priority Data

Oct. 23, 2002 (EP) ..................................... 02023836
Dec. 9, 2002 (EP) ..................................... 02027408

(51) Int. Cl.
*G06F 15/173* (2006.01)

(52) U.S. Cl.
USPC ........... 709/225; 709/230; 709/231; 709/236; 370/392; 370/476; 370/401; 370/253; 370/465

(58) Field of Classification Search
USPC ................. 709/225, 230, 231, 236; 370/392, 370/476, 401, 253, 465
See application file for complete search history.

(56) References Cited

U.S. PATENT DOCUMENTS
2004/0037264 A1* 2/2004 Khawand ...................... 370/349

FOREIGN PATENT DOCUMENTS
EP         1 248 431         10/2002

OTHER PUBLICATIONS

Mandato D: "Deliverable 1.2—Concepts for Service adaption, scalability and QoS handling on mobility enabled networks" 1ST-1999-10050 Brain, XX, XX, Mar. 31, 2001, pp. 1-229, XP002205057.
Mandato D: "Presentation: Concepts of Service Adaption, Scalability, and QoS Handling on Mobility enabled Networks" IST Mobile Communication Summit, XX, XX, Sep. 10, 2001, pp. 1-16, XP002205058.

* cited by examiner

*Primary Examiner* — Thuong Nguyen
(74) *Attorney, Agent, or Firm* — Oblon, Spivak, McClelland, Maier & Neustadt, L.L.P.

(57) ABSTRACT

A system offering an Application Programming Interface for multi-stream multimedia applications running on at least two registered end peers participating in a mobile telecommunication session and/or middleware being connected to a mobile network. The system providing guaranteed end-to-end quality and resource capabilities using the concept of concatenated E2ENP phases and providing a pre-negotiation of a multiplicity of alternative capabilities and QoS Contracts, management of leased pre-negotiated information, session establishment between said end peers with negotiation of a multiplicity of alternative capabilities and/or QoS Contracts, and a dynamic re-negotiation of the end-to-end quality and capabilities. The information to be negotiated is expressed in an interchangeable format allowing multi-stream multimedia applications to agree on a specific reference model of the negotiated information, which can then be used for dynamically configuring Finite State Machines to orchestrate local, peer, and network resources according to the preferences and profiles of the respective user.

24 Claims, 58 Drawing Sheets

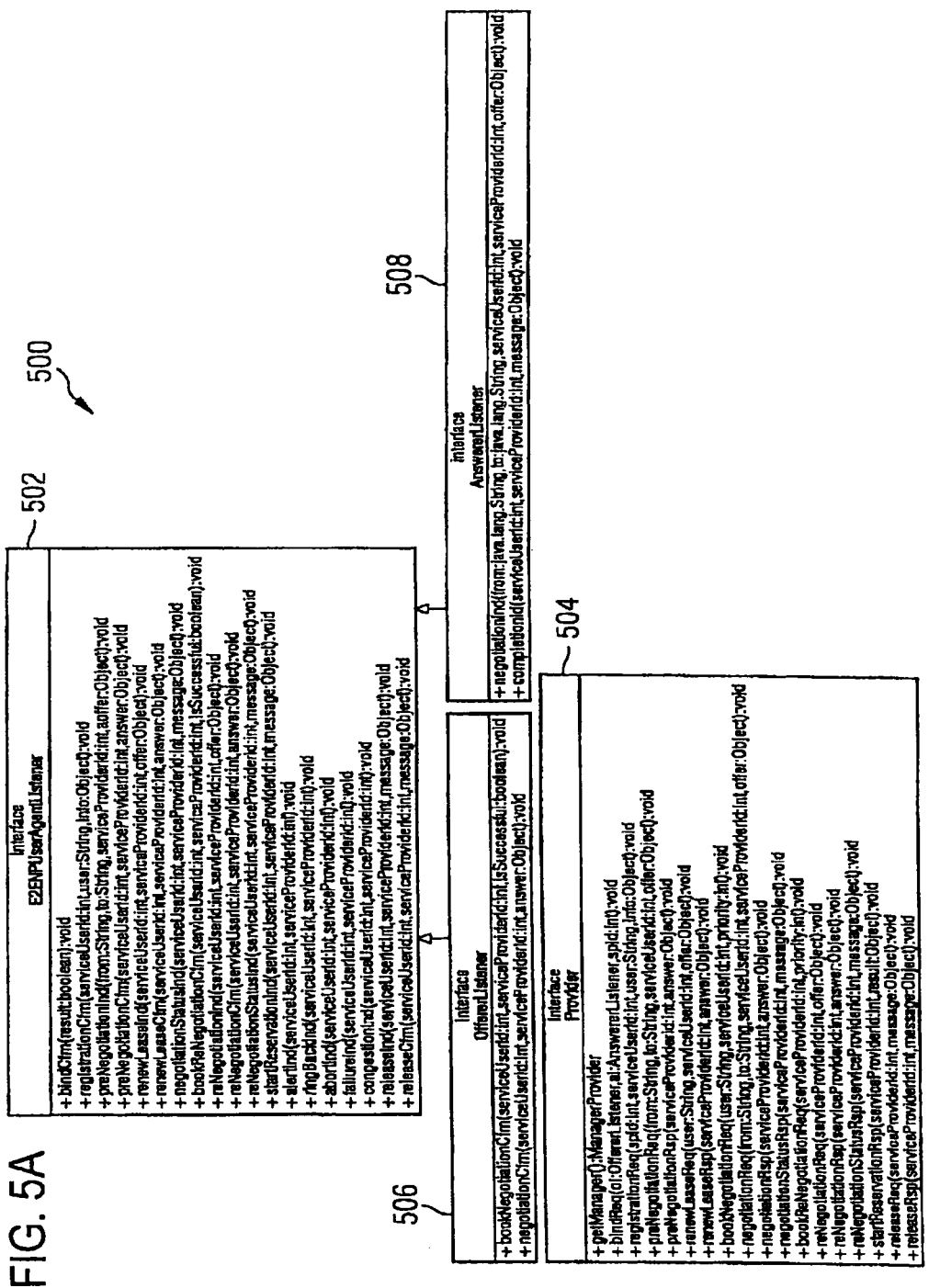

FIG 6

| | | |
|---|---|---|
| E2ENP-URI | = | "e2enp://" [ userinfo "@" ] hostport |
| userinfo | = | [ user ] [ ":" password ] |
| user-unreserved | = | "&" / "=" / "+" / "$" / "," / ";" / "?" |
| escaped | = | "%" HEXDIG HEXDIG |
| unreserved | = | alphanum / mark |
| mark | = | "-" / "_" / "." / "!" / "~" / "*" / " ' " / "(" / ")" |
| alphanum | = | ALPHA / DIGIT |
| user | = | *( unreserved / escaped / user-unreserved ) |
| password | = | *( unreserved / escaped / "&" / "=" / "+" / "$" / "," ) |
| hostport | = | host / host ":" port |
| host | = | hostname / hostaddress |
| hostname | = | *( domainlabel "." ) toplabel [ "." ] |
| domainlabel | = | alphanum / alphanum * ( alphanum / "-" ) alphanum |
| toplabel | = | ALPHA / ALPHA * ( alphanum / "-" ) alphanum |
| hostaddress | = | ipv4-addr / ipv6-addr |
| ipv4-addr | = | digits"."digits"."digits"."digits |
| digits | = | 1*3DIGIT |
| ipv6-addr | = | hexpart [ ":" IPv4address ] |
| hexpart | = | hexseq / hexseq "::" [ hexseq ] / "::" [ hexseq ] |
| hexseq | = | hex4 *( ":" hex4) |
| hex4 | = | 1*4HEXDIG |
| port | = | 1*DIGIT |

```
public void bindReq(OffererServiceUser oSu, AnswererServiceUser a Su, int spId)
        Binds the given Service User's event listeners to the given E2ENP UA.
public void registration Req(int spId, int serviceUserId, java.lang.String user, java.lang.Object info)
        Registers a user with the UA and optionally with a remote registrar.
public void preNegotiationReq(java.lang.String from, java.lang.String to, int serviceUserId,
                java.lang.Object offer)
        Initiates a pre-negotiation phase.
public void preNegotiationRsp(int serviceProviderId, java.lang.Object answer)
        Answers to an incoming request from the peer for pre-negotiation.
public void renewLeaseReq(java.lang.String user, int serviceUserId, java.lang.Object offer)
        Initiates a pre-negotiation information lease refresh.
public void renewLeaseRsp(int serviceProviderId, java.lang.Object answer)
        Answers to an incoming request from the peer for pre-negotiation information lease
        refresh.
public void bookNegotiationReq(java.lang.String user, int serviceUserId, int priority)
        Before initiating the negotiation phase, this primitive allows the Service User to book
        the mutually exclusive use of the resource reservation process, with respect to
        concurrent instances of Service Users.
public void negotiationReq(java.lang.String from, java.lang.String to, int serviceUserId,
                int serviceProviderId, java.lang.object offer)
        Initiates a negotiation phase.
public void negotiationStatusRsp(int serviceProviderId, java.lang.Object message)
        Generates an intermediate signaling during negotiation in respose to a peer's
        signaling.
public void bookReNegotiationReq(int serviceUserId, int priority)
        Before initiating the re-negotiation phase, this primitive allows the Service User to
        book the mutually exclusive use of the resource reservation process,
        with respect to concurrent instances of Service Users. In this case, the
        serviceProviderId must be specified.
public void reNegotiationReq(int serviceProviderId, boolean isPlanned, java.lang.Object offer)
        Initiates a re-negotiation phase.
public void reNegotiationRsp(int serviceProviderId, java.lang.Object answer)
        Answers to an incoming request from the peer for re-negotiation.
public void reNegotiationStatusRsp(int serviceProviderId, java.lang.Object message)
        Generates an intermediate signaling during re-negotiation in response to a peer's
        signaling.
public void startReservationRsp(int serviceProviderId, java.lang.Object result)
        Notifies that the Service User has completed both local and network resource
        reservation.
public void releaseReq(int serviceProviderId, java.lang.Object message)
        Release the given phase (during pre-negotiation and lease renewal) or the overall
        session.
public void releaseRsp(int serviceProviderId, java.lang.Object message)
        Replies to a request from the peer to release the given phase (during pre-negotiation
        and lease renewal) or the overall session.
public void resetReq(int serviceUserId, int serviceProviderId)
        Resets the given session as an emergency procedure.
public void resetRsp(int serviceUserId, int serviceProviderId)
        Replies to a request from the peer to reset the given session as an emergency
```

```
public void bindCfm (Boolean result)
         Returns the result of the bindReq primitive.
public void registrationCfm (int serviceUserId, java.lang.String user, java.lang.Object info)
         Confirms the registration of the given user with the UA and optionally with an
external
         registrar.
public void preNegotiationInd(java.lang.String from, java.lang.String to, int serviceProviderId,
                java.lang.Object offer)
         Notifies the Service User of a request from the peer to initiate a pre-negotiation
         phase.
public void preNegotiationCfm(int serviceUserId, int serviceProviderId, java.lang.Object answer)
         Notifies the Service User of a reply from the peer concerning the given
         pre-negotiation phase.
public void renewLeaseInd(int serviceUserId, int serviceProviderId, java.lang.Object offer)
         Notifies the Service User of a request from the peer to initiate a pre-negotiation
         information lease refresh.
public void renewLeaseCfm(int serviceUserId, int ServiceProviderId, java.lang.Object answer)
         Notifies the Service User of a reply from the peer concerning the given
         pre-negotiation information lease refresh.
public void negotiationStatusInd(int ServiceUserId, int serviceProviderId, java.lang.Object message)
         Notifies the Service User of an intermediate signaling during negotiation,
         in correspondence to a peer's signaling.
public void bookReNegotiationCfm(int serviceUserId, int serviceUserId, boolean isSuccessful)
         Before initiating the re-negotiation phase, this primitive notifies the Service User that
         the E2ENP UA has successfully booked the mutually exclusive use of the resource
         reservation process, with respect to concurrent instances of Service Users.
public void reNegotiationInd(int serviceUserId, int serviceProviderId, boolean isPlanned,
                java.lang.Object offer)
         Notifies the Service User of a request from the peer to initiate a re-negotiation phase.
public void reNegotiationCfm(int serviceUserId, int serviceProviderId, java.lang.Object answer)
         Notifies the Service User of a reply from the peer concerning the given re-
negotiaton.
public void reNegotiationStatusInd(int serviceUserId, int serviceProviderId, java.lang.Object
message)
         Notifies the Service User of an intermediate signaling during re-negotiation, in
         correspondence to a peer's signaling.
public void startReservationInd(int serviceUserId, int serviceProviderId, java.lang.Object result)
```

```
public void releaseCfm(int serviceUserId, int serviceProviderId, java.lang.Object message)
        Notifies the Service User of a reply from the peer concerning the release of the given
        phase (during pre-negotiation and lease renewal) or the overall session.
public void alertInd(int serviceUserId, int serviceProviderId)
        Notifies the Service User that a remote peer has called in.
public void ringBackInd(int serviceUserId, int serviceProviderId)
        Notifies the Service User that the remote peer has been alerted.
public void congestionInd(int serviceUserId, int serviceProviderId)
        Notifies the given Service User instance that other higher priority instances are
        waiting for the mutex to be released. The Service User shall pre-empt by rolling back
        to the state before the negotiation/re-negotiation started, and invoke the release
        primitive.
public void failureInd(int serviceUserId, int serviceProviderId)
        Notifies the Service User that an E2ENP UA internal error occurred and that the
        Service User shall invoke the release primitive.
public void abortInd(int serviceUserId, int serviceProviderId, int reason)
        Notifies the Service User that a SIP error occurred and that the Service User shall
        simply consider the current operation as aborted. A reason is passed as well,
        indicating one of the possible sources of error:
                    0 - redirection,
                    1 - client error,
                    2 - server error,
                    3 - network failure.
public void resetInd(int serviceUserId, int serviceProviderId)
        Notifies the Service User of a request from the peer concerning the reset of the
        session.
public void resetCfm(int serviceUserId, int serviceProviderId)
```

FIG. 40

4100 public void bookNegotiationCfm(int serviceUserId, int serviceUserId, boolean isSuccessful)
    Before initiating the negotiation phase, this primitive notifies the Service User that the E2ENP UA has successfully booked the mutually exclusive use of the resource reservation process, with respect to concurrent instances of Service Users.
    This primitive is specific of the offerer side, whereas the homonymous bookReNegotiationCfm may be invoked either at the offerer or at the answerer side.
public void negotiationCfm(int serviceUserId, int serviceProviderId, java.lang.Object Answer)
    Notifies the Service User of a reply from the peer concerning the given negotiation.

FIG. 41

4200 public void negotiationInd(java.lang.String from, java.lang.String to, int serviceUserId, int serviceProviderId, java.lang.Object offer)
    Notifies the Service User of a request from the peer to initiate a negotiation phase.
public void completionInd(nt serviceUserId, int serviceProviderId, Object message)
    Notifies the Service User that the negotiation/setup phase has been completed successfully.

| | |
|---|---|
| public LevelOneEntry | LevelOneCache.createEntry(CoreSession session, int serviceProviderId)<br>Creates a level 1 entry. |
| public LevelOneEntry | LevelOneCache.getEntry(int serviceProviderId)<br>Gets a level 1 entry by using the service provieder ID as primary key. |
| public LevelOneEntry | LevelOneCache.findEntry(int serviceUserId)<br>Gets a level 1 entry using the service user ID as secondary key. |
| public LevelOneEntry | LevelOneCache.findEntry(java.lang.String from, java.lang.String to)<br>Gets a level 1 entry using the(From,To)SIP address couple as secondary key. |
| public java.util.Vector | LevelOneCache.findEntryByExtSessionId(java.lang.String sessionId)<br>Gets the level 1 entries by using the E2ENP Session ID as secondary key. |
| public void | LevelOneCache.removeEntry(LevelOneEntry entry)<br>Deletes the given entry from the cache. |
| public void | LevelOneCache.clear()<br>Removes all the entries. |
| public void | LevelOneEntry.putSessionID(java.lang.String sessionId)<br>Puts the E2ENP Session ID in the entry associated with the given service provider ID. |
| public java.lang.String | LevelOneEntry.getSessionID()<br>Gets the E2ENP Session ID associated with the given service provider ID. |
| public void | LevelOneEntry.putServiceUserID (int serviceUserId)<br>Puts the service user ID in the entry associated with the given service provider |
| public int | LevelOneEntry.getServiceUserID ()<br>Gets a service user ID. |
| public int | LevelOneEntry.getServiceProviderID()<br>Gets a service provider ID. |
| public void | LevelOneEntry.putFromAddress(java.lang.String from)<br>Puts the SIP From Address associated with the given service provider ID. |
| public java.lang.String | LevelOneEntry.getFromAddress()<br>Gets the SIP From Address associated with the given service provider ID. |
| public void | LevelOneEntry.putToAddress(java.lang.String to)<br>Puts the SIP To Address associated with the given service provider ID. |
| public java.lang.String | LevelOneEntry.getToAddress()<br>Gets the SIP To Address associated with the given service provider ID. |

| public LevelTwoEntry | LevelTwoCache.createEntry(int serviceProviderId)<br>    Creates a level 2 entry. |
|---|---|
| public LevelTwoEntry | LevelTwoCache.findEntry(java.lang.String sessionId)<br>    Gets all the level 2 entries by using the E2ENP Session ID as primary key. |
| public void | LevelTwoCache.removeEntry(LevelTwoEntry entry)<br>    Deletes the given entry from the cache. |
| public void | LevelTwoCache.clear()<br>    Removes all the entries. |
| public void | LevelTwoEntry.putSessionID(java.lang.String sessionId)<br>    Puts the E2ENP Session ID in the entry associated with the given service provider ID. |
| public java.lang.String | LevelTwoEntry.getSessionID()<br>    Gets the E2ENP Session ID associated with the given service provider ID. |
| public void | LevelTwoEntry.putServiceUserID(int serviceUserId)<br>    Puts the service user ID in the entry associated with the given service provider |
| public int | LevelTwoEntry.getServiceUserID()<br>    Gets a service user ID. |

FIG. 44A

| | |
|---|---|
| java.lang.String | getType()<br>Returns an identifier to uniquely specifiy the type of this parser. |
| boolean | isConfirmExpected(java.io.Serializable in)<br>Checks all media stream definitions for preconditions (PC), and, if at least one such definition has a PC that the offerer is going to carry out reservation, and thus, going to send a confirmation to the answerer when done. |
| boolean | isKeepResultsCached(java.io.Serializable in)<br>Extracts information about whether the results of a negotiation of re-negotiations should be cached or not. |
| boolean | isRingBackExpected(java.io.Serializable in)<br>Checks all media stream definitions and returns true, if any of the streams is going to be generated by the answerer. |
| java.lang.Object | parseFinalResponse(java.io.Serializable in)<br>Parses a final result message and returns the corresponding status. |
| java.lang.Object | parseLeaseAnswer(java.io.Serializable in)<br>Parses a transport representation of a renew lease answer and returns the corresponding object representation. |
| java.lang.Object | parseLeaseOffer(java.io.Serializable in)<br>Parses a transport representation of a renew lease offer and returns the corresponding object representation. |
| long | parseLeaseTime(java.io.Serializable in)<br>Parses a transport representation of a lease answer/offer and returns the corresponding lease time as a basic long value. |
| java.util.Vector | parseListOfUsedSessionIds(java.io.Serializable in)<br>Parses the given input selectively to extract the external representation of the list of referenced E2ENP session identifier. |
| java.lang.Object | parseMessage(java.io.Serializable in)<br>Parses content which is mapped over various e2enp primitives/SIP messages. |
| java.lang.Object | parseNegAnswer(java.io.Serializable in)<br>Parses a transport representation of a negotiation answer and returns the corresponding object representation. |
| java.lang.Object | parseNegCOffer(java.io.Serializable in)<br>Parses a transport representation of a negotiation counter-offer and returns the corresponding object representation. |
| java.lang.Object | parseNegOffer(java.io.Serializable in)<br>Parses a transport representation of a negotiation offer and returns the corresponding object representation. |

| | |
|---|---|
| java.lang.Object | parsePreNegAnswer(java.io.Serializable in)<br>Parses a transport representation of a pre-negotiation answer and returns the corresponding object representation. |
| java.lang.Object | parsePreNegOffer(java.io.Serializable in)<br>Parses a transport representation of a pre-negotiation offer and returns the corresponding object representation. |
| java.lang.Object | parseReNegAnswer(java.io.Serializable in)<br>Parses a transport representation of a re-negotiation answer and returns the corresponding object representation. |
| java.lang.Object | parseReNegCOffer(java.io.Serializable in)<br>Parses a transport representation of a re-negotiation counter-offer and returns the corresponding object representation. |
| java.lang.Object | parseReNegOffer(java.io.Serializable in)<br>Parses a transport representation of a re-negotiation offer and returns the corresponding object representation. |
| java.lang.Object | parseReservationResult(java.io.Serializable in)<br>Parses a transport representation of a reservation result message and returns the corresponding object representation. |
| java.lang.String | parseSessionId(java.io.Serializable in)<br>Parses the given input selectively to extract the external representation of the E2ENP session identifier. |

| | |
|---|---|
| Parser | createParser(java.lang.String protocolID)<br>Creates a parser instance for the given protocol. |
| void | registerParser(java.lang.String protocolID, java.lang.String parserClassName)<br>Registers a parser implementation for the given protocol. |

FIG. 46

| java.io.Serializable | createFinalResponse(java.lang.Object status)<br>Creates the transport representation for a final response message. |
|---|---|
| java.io.Serializable | createLeaseAnswer(java.lang.Object in)<br>Creates the transport representation for a renew lease answer. |
| java.io.Serializable | createLeaseOffer(java.lang.Object in)<br>Creates the transport representation for a renew lease offer. |
| java.io.Serializable | createMessage(java.lang.Object in)<br>Creates serializable representation of content which is mapped over various |
| java.io.Serializable | createNegAnswer(java.lang.Object in)<br>Creates the transport representation for a negotiation answer. |
| java.io.Serializable | createNegCOffer(java.lang.Object in)<br>Creates the transport representation for a negotiation counteroffer. |
| java.io.Serializable | createNegOffer(java.lang.Object in)<br>Creates the transport representation for a negotiation offer. |
| java.io.Serializable | createPreNegAnswer(java.lang.Object in)<br>Creates the transport representation for a pre-negotiation answer. |
| java.io.Serializable | createPreNegOffer(java.lang.Object in)<br>Creates the transport representation for a pre-negotiation offer. |
| java.io.Serializable | createReNegAnswer(java.lang.Object in)<br>Creates the transport representation for a re-negotiation answer. |
| java.io.Serializable | createReNegCOffer(java.lang.Object in)<br>Creates the transport representation for a re-negotiation counteroffer. |
| java.io.Serializable | createReNegOffer(java.lang.Object in)<br>Creates the transport representation for a re-negotiation offer. |
| java.io.Serializable | createReservationResult(java.lang.Object in)<br>Creates the transport representation for a reservation result message. |
| long | getLeaseTime(java.lang.Object in)<br>Extracts the lease time stored in the internal representation represented by the input parameter 'in'. |
| java.util.Vector | getListOfUsedSessionIds(java.lang.Object in)<br>Extracts the list of used session IDs stored in the internal representation represented by the input parameter 'in'. |
| java.lang.String | getSessionId(java.lang.Object in)<br>Extracts the session ID stored in the internal representation represented by the input parameter 'in'. |
| java.lang.String | getType()<br>Returns an identifier to uniquely specifiy the type of this factory. |
| boolean | isKeepResultsCached(java.lang.Object in)<br>Extracts information about whether the results of a negotiation or of re-negotiations |

| Factory | createFactory(java.lang.String protocolID) |
|---|---|
| void | registerFactory(java.lang.String protocolID, java.lang.String factoryClassName)<br>Registers a factory class for the given protocol. |

| abstract Factory | createFactory(java.lang.String protocolID)<br>Creates a factory instance for the given protocol. |
|---|---|
| abstract Parser | createParser(java.lang.String protocolID)<br>Creates a parser instance for the given protocol. |
| static E2ENPContentHandlerFactory | getInstance()<br>Provides access to the singleton instance of the E2ENPContentHandlerFactory. |
| abstract void | registerFactory(java.lang.String protocolID, java.lang.String factoryClassName)<br>Registers a factory class for the given protocol. |
| abstract void | registerImplementation(java.lang.String ID, java.lang.String parserClassName, java.lang.String factoryClassName)<br>Registers a parser and factory implementation using the given ID. |
| abstract void | registerParser(java.lang.String protocolID, java.lang.String parserClassName)<br>Registers a parser implementation for the given protocol. |

FIG. 49
5000

```
void release()
        Shuts down the given SIP UA.
void bindReq(SipEndUser user, SipUserAgentClientListener ssmlc, SipUserAgentServerListener
ssmls)
        Binds the given user's event listeners to the given SIP UA.
void configureReq(SipManagementListener sml, SipConfigurationReq conf)
        Configures the given SIP UA.
void connectionReq(SipEndUser user, int connectionId, SipConnectionReq invitation,
        java.io.Serializable message, java.lang.String mimeContentType)
        Allows generating a request to establish a session.
void connectionRsp(SipEndUser user, int connectionId, int status, java.io.Serializable message,
        java.lang.String mimeContentType)
        Allows replying to a request to establish a session.
void connectionStatusReq(SipEndUser user, int connectionId, int type, boolean isMiddle,
        java.io.Serializable message, java.lang.String mimeContentType)
        Allows generating provisional responses.
void connectionStatusRsp(SipEndUser user, int connectionId, int type, java.io.Serializable message,
        java.lang.String mimeContentType)
        Allows generating explicitly an ACK.
void disconnectionReq(SipEndUser user, int connectionId, java.io.Serializable message,
        java.lang.String mimeContentType)
        Allows closing a session.
void disconnectionRsp(SipEndUser user, int connectionId)
        Allows replying to an incoming request to close a session.
void optionsReq(SipEndUser user, int connectionId, java.lang.String target, java.io.Serializable body,
        java.lang.String mimeContentType)
        Allows sending OPTIONS.
void optionsRsp(SipEndUser user, int connectionId, java.io.Serializable body, java.lang.String
        mimeContentType)
        Allows replying to an incoming OPTIONS.
void messageReq(SipEndUser user, int connectionId, java.lang.String target, java.io.Serializable body,
        java.lang.String mimeContentType)
        Allows sending a MESSAGE.
void messageRsp(SipEndUser user, int connectionId, java.io.Serializable body, java.lang.String
        mimeContentType)
        Allows replying to an incoming MESSAGE.
void provisionalAckReq(SipEndUser user, int connectionId, java.io.Serializable message,
        java.lang.String mimeContentType)
        Allows sending a PRACK.
void provisionalAckRsp(SipEndUser user, int connectionId, java.io.Serializable message,
        java.lang.String mimeContentType)
        Allows replying to an incoming PRACK.
void registerReq(SipEndUser user, SipRegistrationReq registration, java.io.Serializable body,
        java.lang.String bodytype)
        Allows registering the specified user at the given SIP Registrar.
void reservationCoordReq(SipEndUser user, int connectionId, java.io.Serializable message,
        java.lang.String mimeContentType)
        Allows sending an UPDATE.
void reservationCoordRsp(SipEndUser user, int connectionId, java.io.Serializable message,
        java.lang.String mimeContentType)
        Allows replying to an incoming UPDATE.
```

FIG. 50    5100

```
void connectionCfm(SipEndUser user, int connectionId, java.lang.String from, java.io.Serializable
            body, java.lang.String mimeContentType)
        Acknowledges a SIP session establishment.
void provisionalAckCfm(SipEndUser user, int connectionId, java.lang.String from,
            java.io.Serializable body, java.lang.String mimeContentType)
        Acknowledges a PRACK.
void registerCfm(SipEndUser user, SipRegistrationCfm registration, int status,
            java.io.Serializable body, java.lang.String mimeContentType)
        Acknowledges a registration request.
```

FIG. 51    5200

```
void connectionInd(SipEndUser user, int connectionId, java.lang.String from,
            java.io.Serializable body, java.lang.String mimeContentType)
        Indicates an incoming request of SIP session establishment.
void provisionalAckInd(SipEndUser user, int connectionId, java.lang.String from,
            java.io.Serializable body, java.lang.String mimeContentType)
        Indicates an incoming PRACK.
```

FIG. 52                                                  5300

```
void connectionStatusInd(SipEndUser user, int connectionId, int type, java.lang.String typeString,
            java.lang.String from, java.io.Serializable body, java.lang.String mimeContentType)
        Indicates an incoming provisional response from the peer.
void disconnectionCfm(SipEndUser user, int connectionId, java.lang.String from,
            java.io.Serializable body, java.lang.String mimeContentType)
        Acknowledges a former request to close the session.
void disconnectionInd(SipEndUser user, int connectionId, java.lang.String from,
            java.io.Serializable body, java.lang.String mimeContentType)
        Indicates a request from the peer to close the session.
void optionsInd(SipEndUser user, int connectionId, java.lang.String from, java.io.Serializable body,
            java.lang.String mimeContentType)
        Notifies the incoming of OPTIONS.
void messageInd(SipEndUser user, int connectionId, java.lang.String from,
            java.io.Serializable body, java.lang.String mimeContentType)
        Notifies the incoming of a MESSAGE.
void optionsCfm(SipEndUser user, int connectionId, java.lang.String from, java.io.Serializable body,
            java.lang.String mimeContentType)
        Acknowledges a former request to send OPTIONS.
void messageCfm(SipEndUser user, int connectionId, java.lang.String from,
            java.io.Serializable body, java.lang.String mimeContentType)
        Acknowledges a former request to send a MESSAGE.
void reservationCoordCfm(SipEndUser user, int connectionId, java.lang.String from,
            java.io.Serializable body, java.lang.String mimeContentType)
        Acknowledges a former request to send an UPDATE.
void reservationCoordInd(SipEndUser user, int connectionId, java.lang.String from,
            java.io.Serializable body, java.lang.String mimeContentType)
        Indicates an incoming UPDATE sent by the peer.
```

```
void bindReq(SipEndUser user, SipRegistrarListener ssml)
        Binds the given user's event listener to the given SIP UA.
void configureReq(SipManagementListener sml, SipConfigurationReq conf)
        Configures the given SIP UA.
void optionsRsp(SipEndUser user, int connectionId, java.io.Serializable body,
        java.lang.String mimeContentType)
        Acknowledges OPTIONS.
void messageRsp(SipEndUser user, int connectionId, java.io.Serializable body,
        java.lang.String mimeContentType)
        Acknowledges a MESSAGE.
void registerRsp(SipEndUser user, int connectionId, SipRegistrationRsp registration, int status,
        java.io.Serializable body, java.lang.String bodytype)
        Primitive allowing a Registrar to reply to a request for registration from SIP users.
```

```
void registerInd(SipEndUser user, int connectionId, SipRegistrationInd registration,
        java.io.Serializable body, java.lang.StringEmimeContentType)
        Indicates a request from the peer to make a registration.
void optionsInd(SipEndUser user, int connectionId, java.lang.String from, java.io.Serializable body,
        java.lang.String mimeContentType)
        Notifies the incoming of OPTIONS.
void messageInd(SipEndUser user, int connectionId, java.lang.String from, java.io.Serializable body,
        java.lang.String mimeContentType)
        Notifies the incoming of a MESSAGE.
```

| Source State | Triggering event | Guard condition | Action | Target state |
|---|---|---|---|---|
| Root.Idle | disconnectionCfm | | releaseCfm | Root.Idle |
| " | releaseRsp | | disconnectionRsp | Root.Idle |
| Root.WaitRenewLeaseRsp | Timer T2 expires | | failureInd | Root.WaitToClear |
| Root.WaitRenewLeaseCfm | connectionStatusInd | Status >=300 | abortInd | Root.Idle |
| " | Timer T101 expires | | failureInd | Root.WaitToClear |
| Root.WaitPreNegotRsp | Timer T1 expires | | failureInd | Root.WaitToClear |
| Root.WaitPreNegotCfm | connectionStatusInd | Status >=300 | abortInd | Root.Idle |
| " | Timer T102 expires | | failureInd | Root.WaitToClear |
| Root.NegOfferer | Timer T103 expires | | failureInd | Root.WaitToClear |
| Root.ReNegOfferer.WaitNegReq | connectionStatusInd | Status >=300 | abortInd | Root.SessionEstablished |
| " | Timer T5 expires | | ResvMtx.sign al abortInd | Root.Idle |
| Root.NegOfferer.WaitTryingInd | connectionStatusInd | Status >=300 | abortInd | Root.Idle |
| Root.NegOfferer.WaitProgressInd | connectionStatusInd | Status >=300 | abortInd | Root.Idle |
| Root.NegOfferer.WaitNegStatusRsp | Timer T6 expires | | failureInd | Root.WaitToClear |
| Root.NegOfferer.WaitPrackCfm | connectionStatusInd | Status >=300 | failureInd | Root.WaitToClear |
| Root.NegOfferer.WaitReservCompl | Timer T7 expires | | failureInd | Root.WaitToClear |
| Root.NegOfferer.WaitRCoordCfm | connectionStatusInd | Status >=300 | failureInd | Root.WaitToClear |
| Root.NegOfferer.WaitRinging | connectionStatusInd | Status >=300 | failureInd | Root.WaitToClear |

| Source State | Triggering event | Guard condition | Action | Target state |
|---|---|---|---|---|
| Root.NegOfferer.WaitFinalProvAckCfm | connectionStatusInd | Status >=300 | failureInd | Root.WaitToClear |
| Root.NegOfferer.WaitConnectionCfm | connectionStatusInd | Status >=300 | failureInd | Root.WaitToClear |
| Root.NegOfferer.WaitContractAdjusted | Timer T8 expires | | failureInd | Root.WaitToClear |
| Root.ReNegOfferer | Timer T104 expires | | failureInd | Root.WaitToClear |
| Root.ReNegOfferer.WaitReNegReq | connectionStatusInd | Status >=300 | abortInd | Root.SessionEstablished |
| " | Timer T9 expires | | ResvMtx.signal abortInd | Root.Idle |
| Root.ReNegOfferer.WaitTryingInd | connectionStatusInd | Status >=300 | abortInd | Root.SessionEstablished |
| Root.ReNegOfferer.WaitProgressInd | connectionStatusInd | Status >=300 | abortInd | Root.SessionEstablished |
| Root.ReNegOfferer.WaitNegStatusRsp | Timer T10 expires | | failureInd | Root.WaitToClear |
| Root.ReNegOfferer.WaitPrackCfm | connectionStatusInd | Status >=300 | abortInd | Root.SessionEstablished |
| Root.ReNegOfferer.WaitReservCompl | Timer T11 expires | | failureInd | Root.WaitToClear |
| Root.ReNegOfferer.WaitCoordCfm | connectionStatusInd | Status >=300 | abortInd | Root.SessionEstablished |
| Root.ReNegOfferer.WaitRinging | connectionStatusInd | Status >=300 | failureInd | Root.WaitToClear |
| Root.ReNegOfferer.WaitFinalProvAckCfm | connectionStatusInd | Status >=300 | abortInd | Root.SessionEstablished |
| Root.ReNegOfferer.WaitFConnectionCfm | connectionStatusInd | Status >=300 | abortInd | Root.SessionEstablished |
| Root.ReNegOfferer.WaitContractAdjusted | Timer T12 expires | | failureInd | Root.WaitToClear |
| Root.NegAnswerer | negotiationReq | | abortInd | Root.NegAnswerer |
| " | reNegotiationReq | | abortInd | Root.NegAnswerer |

FIG. 55C

| Source State | Triggering event | Guard condition | Action | Target state |
|---|---|---|---|---|
| " | Timer T105 expires | | failureInd | Root.WaitToClear |
| Root.NegAnswerer.WaitAnswer | Timer T13 expires | | failureInd | Root.WaitToClear |
| Root.NegAnswerer.WaitCounterOffer | | | | |
| Root.NegAnswerer.WaitNegStatusRsp | Timer T14 expires | | failureInd | Root.WaitToClear |
| Root.NegAnswerer.WaitFinalProvAck | | | | |
| Root.NegAnswerer.WaitFinalAnswer | Timer T15 expires | | failureInd | Root.WaitToClear |
| Root.NegAnswerer.HoldOnAnswer | | | | |
| Root.NegAnswerer.WaitConnectionCfm | | | | |
| Root.NegAnswerer.WaitForCoordDone.WaitLocalCoord | Timer T19 expires | | failureInd | Root.WaitToClear |
| Root.NegAnswerer.WaitForCoordDone.WaitRemoteCoord | Timer T20 expires | | failureInd | Root.WaitToClear |
| Root.NegAnswerer.WaitForCoordDone.LocalTokenAchieved | | | | |
| Root.NegAnswerer.WaitForCoordDone.RemoteTokenAchieved | | | | |
| Root.ReNegAnswerer | Timer T106 expires | | failureInd | Root.WaitToClear |
| Root.ReNegAnswerer.WaitAnswer | Timer T16 expires | | failureInd | Root.WaitToClear |
| Root.ReNegAnswerer.WaitCounterOffer | | | | |
| Root.ReNegAnswerer.WaitNegStatusRsp | Timer T17 expires | | failureInd | Root.WaitToClear |

| Source State | Triggering event | Guard condition | Action | Target state |
|---|---|---|---|---|
| Root.ReNegAnswerer.WaitFinalProvAck | | | | |
| Root.ReNegAnswerer.WaitFinalAnswer | Timer T18 expires | | failureInd | Root.WaitToClear |
| Root.ReNegAnswerer.HoldOnAnswer | | | | |
| Root.ReNegAnswerer.WaitConnectionCfm | | | | |
| Root.ReNegAnswerer.WaitForCoordDone.WaitLocalCoord | Timer T21 expires | | failureInd | Root.WaitToClear |
| Root.ReNegAnswerer.WaitForCoordDone.WaitRemoteCoord | Timer T22 expires | | failureInd | Root.WaitToClear |
| Root.ReNegAnswerer.WaitForCoordDone.LocalTokenAchieved | | | | |
| Root.ReNegAnswerer.WaitForCoordDone.RemoteTokenAchieved | | | | |
| Root.SessionEstablished | | | | |
| Root.WaitReleaseRsp | disconnectionCfm | | releaseCfm | Root.WaitReleaseRsp |
| " | Timer T3 expires | | releaseReq | Root.WaitDisconnectionCfm |
| Root.WaitToClear | Timer T4 expires | | releaseReq | Root.WaitDisconnectionCfm |
| Root.WaitDisconnectionCfm | releaseRsp | | disconnectionRsp | Root.WaitDisconnectionCfm |

| Name | Description | Default Value |
|---|---|---|
| T1 | Waiting pre-negotiation response from E2ENP UA API Service User | TBD |
| T2 | Waiting lease renew response from E2ENP UA API Service User | TBD |
| T3 | Waiting release response from E2ENP UA API Service User | TBD |
| T4 | Waiting release request from E2ENP UA API Service User, after the E2ENP UA has generated a failure indication or a congestion indication to the Service User | TBD |
| T5 | Waiting negotiation request from E2ENP UA API Service User after having booked the resource reservation mutex at the offerer side | TBD |
| T6 | Waiting negotiation status response with counter-offer, from E2ENP UA API Service User at the offerer side | TBD |
| T7 | Waiting start reservation response from E2ENP UA API Service User at the offerer side | TBD |
| T8 | Waiting negotiation status response from E2ENP UA API Service User to handle contract adjustment at the offerer side | TBD |
| T9 | Waiting re-negotiation request from E2ENP UA API Service User after having booked the resource reservation mutex at the offerer side | TBD |
| T10 | Waiting re-negotiation status response with counteroffer, from E2ENP UA API Service User at the offerer side | TBD |
| T11 | Waiting start reservation response from E2ENP UA API Service User, during re-negotiation at the offerer side | TBD |
| T12 | Waiting re-negotiation status response from E2ENP UA API Service User to handle contract adjustment at the offerer side | TBD |
| T13 | Waiting negotiation status response with answer from E2ENP UA API Service User at the answerer side | TBD |
| T14 | Waiting negotiation status response with counteroffer from E2ENP UA API Service User at the answerer side | TBD |
| T15 | Waiting negotiation response from E2ENP UA API Service User at the answerer side | TBD |
| T16 | Waiting re-negotiation status response with answer from E2ENP UA API Service User at the answerer side | TBD |

FIG. 56B                                    5700

| Name | Description | Default Value |
|---|---|---|
| T17 | Waiting re-negotiation status response with counteroffer from E2ENP UA API Service User at the answerer side | TBD |
| T18 | Waiting re-negotiation response from E2ENP UA API Service User at the answerer side | TBD |
| T19 | Waiting start reservation response from E2ENP UA API Service User at the offerer side during negotiations | TBD |
| T20 | Waiting negotiation response from E2ENP UA API Service User side for handling adjusted contracts during negotiations | TBD |
| T21 | Waiting start reservation response from E2ENP UA API Service User at the offerer side during re-negotiations | TBD |
| T22 | Waiting negotiation response from E2ENP UA API Service User side for handling adjusted contracts during re-negotiations | TBD |
| T101 | Waiting OPTIONS confirmation from SIP API for handling lease renewal primitive | TBD |
| T102 | Waiting MESSAGE confirmation from SIP UA for handling pre-negotiation primitive | TBD |
| T103 | Exceeding delay in receiving any SIP UA Generic API primitive while acting as offerer in a negotiation process | TBD |
| T104 | Exceeding delay in receiving any SIP UA Generic API primitive while acting as answerer in a negotiation process | TBD |
| T105 | Exceeding delay in receiving any SIP UA Generic API primitive while acting as offerer in a re-negotiation process | TBD |
| T106 | Exceeding delay in receiving any SIP UA Generic API primitive while acting as answerer in a re-negotiation process | TBD |

SPECIFICATION OF A SOFTWARE ARCHITECTURE FOR CAPABILITY AND QUALITY-OF-SERVICE NEGOTIATIONS AND SESSION ESTABLISHMENT FOR DISTRIBUTED MULTIMEDIA APPLICATIONS

The underlying invention generally relates to the field of distributed mobile computing in a mobile wireless networking environment with distributed multimedia applications and systems. More specifically, it is directed to the field of quality negotiation and session establishment for adaptive real-time streaming services running on fixed and mobile devices which support different access technologies in dynamic wireless Internet Protocol (IP) networks, thereby including research and development issues which are especially related to multimedia middleware and resource reservation mechanisms.

A problem that distributed systems will most likely face is how to cope with limited resources at the end systems and in the network, and unstable environment conditions. Mobile users are in fact expected to incur more frequently on the unfortunate case of having their QoS Contracts being no longer supported by the network infrastructure, due to various reasons like wireless link quality degradations, horizontal and/or vertical handovers, limited amount of mobile terminal resources, etc., which shall be referred to as "QoS violations". By assuming proper resource overprovision in the backbone, it can be expected that QoS violations will most likely originate due to handovers or within the access network, especially in the radio part thereof.

Furthermore, mobile multimedia applications dealing with multiple media streams of information being simultaneously exchanged with a multiplicity of peers require an effective and efficient way of negotiating capability and handling QoS requirements, especially in view of the aforementioned unstable environment conditions.

A possible way of coping with unstable environment conditions is to enable the mobile users' applications to efficiently and timely react to QoS violations. Peers can in fact negotiate off-line various alternative QoS Contracts at different levels of abstraction, so that at the time when a connection is established and whenever QoS violations occur, agreements on how to most effectively adapt to the mutated conditions can timely be accomplished among the peers.

BRIEF DESCRIPTION OF THE PRESENT STATE OF THE ART

In the European patent application EP 01 122 366.6, the End-to-End Negotiation Protocol (E2ENP) has already been introduced and described in detail. As the present invention develops further the ideas described in this European patent application, its disclosure is hereby incorporated by reference.

The following table gives a brief overview of recently published articles which describe the concept of QoS and capability negotiation protocols (in alphabetical order):

| Abbr. | Publication |
| --- | --- |
| [Ber] | T. Berners-Lee et al.: "Uniform Resource Identifiers (URI): Generic Syntax", Networking Working Group, Standards Track RFC 2396. |
| [Bos1] | L. Bos et al.: "A Framework for End-to-End User Perceived Quality of Service Negotiation", IETF Internet Draft, work in progress, <draft-bos-mmusic-sdpqos-framework-00.txt>. It describes a process for negotiating QoS with SIP and SDP between two peers. However, it does not describe any architecture for the entity using this process. |
| [Bos2] | L. Bos et al.: "SDPng Extensions for Quality-of-Service Negotiation", IETF Internet Draft, work in progress, <draft-bos-mmusic-sdpng-qos-00.txt>. It describes a process for negotiating QoS with SIP and SDP between two peers. However, it does not describe any software architecture for the entity using this process. |
| [BRAIN] | "Concepts for Service Adaptation, Scalability and QoS Handling on Mobility-Enabled Networks", IST-1999-10050 BRAN Deliverable 1.2 (http://www.ist-brain.org/). |
| [BRENTA] | A. Kassler et al.: "BRENTA - Supporting Mobility and Quality of Service for Adaptable Multimedia Communication", in: Proceedings of the IST Mobile Communications Summit 2000, Galway, Ireland, October 2000, pp. 403-408. |
| [Cam1] | G. Camarillo, W. Marshall, J. Rosenberg: "Integration of Resource Management and SIP", IETF Internet Draft, work in progress, <draft-ietf-sip-manyfolks-resource-07.txt>. It develops the requirements of an "Offer/Answer Model" based on SDP, also in the sense of reservation. However, it does not describe any software architecture for the entity performing such specific negotiations. |
| [Cam2] | G. Camarillo et al.: "Grouping of Media Lines in SDP" (IETF Internet Draft, work in progress, <draft-ietf-mmusic-fid-04.txt>). |
| [Gam] | E. Gamma et al.: "Design Patterns - Elements of Reusable Object-Oriented Software", Addison-Wesley, Reading-Massachusetts (USA), 1994. |
| [Gu] | X. Gu, K. Nahrstedt et al.,: "An XML-based Quality-of-Service-Enabling Language for the Web", Project Report of the National Science Foundation, 2001. |
| [Gue] | T. Guenkovy-Luy, A. Kassler, J. Eisl, D. Mandato: "Efficient End-to-End Qos Signaling - Concepts and Features", IETF Internet Draft, work in progress, <draft-guenkova-mmusic-e2enp-sdpng-00.txt>. |
| [Kly1] | G. Klyne: "A Syntax for Describing Media Feature Sets", IETF RFC 2533. |
| [Kly2] | G. Klyne: "Identifying Composite Media Features", IETF RFC 2938. It describes an optimization for the algorithm disclosed in [Kly1] by introducing data handles and hashing. |
| [Kut1] | D. Kutscher et al.: "Requirements for Session Description and Capability Negotiation" (IETF Internet Draft, work in progress, <draft-kutscher-mmusic-sdpng-req-01.txt>). |
| [Kut2] | D. Kutscher et al.: "Session Description and Capability Negotiation", IETF Internet Draft, work in progress, <draft-ietf-mmusic-sdpng-05.txt>. |
| [Man1] | D. Mandato, A. Kassler, T. Robles, G. Neureiter: "Concepts for Service Adaptation, Scalability and QoS Concepts on Mobility-Enabled Networks" (IST Global Summit 2001, Barcelona, September 2001, pp. 285-293). This article describes the core concepts of the End-to-End Negotiation Protocol (E2ENP). A similar paper has been presented at PIMRC 2001 in San Diego, October 2001. |
| [Man2] | D. Mandato, A. Kassler, T. Robles and G. Neureiter: "Handling End-to-End QoS in Mobile Heterogeneous Networking Environments" (PIMRC 2001, San Diego, 30/9/2001 to 3/10/2001, pp. C-49 to C-54) |
| [ReqSpec] | "End-to-End Negotiation Protocol", IST-2000-28584/SO/WP1/PI/I/003/a1, MIND Internal Contribution to WP1, Activity 1.3, Work Item 2. |

-continued

| Abbr. | Publication |
|---|---|
| [Ros1] | J. Rosenberg, H. Schulzrinne et al.: "SIP: Session Initiation Protocol", IETF Standards Track, Network Working Group, RFC 3261. This document describes the Session Initiation Protocol (SIP), which is an application-layer control (signaling) protocol for creating, modifying and terminating sessions with one or more participants. |
| [Ros2] | J. Rosenberg, H. Schulzrinne: "An Offer/Answer Model with SDP", IETF Internet Draft, work in progress, <draft-ieft-mmusic-sdp-offer-answer-02.txt>. This document defines a mechanism by which two entities can make use of SDP to provide a common view of a multimedia session between them. |

[Cam1] presents a multi-phase call-setup mechanism that makes network QoS and security establishment a precondition to sessions initiated by the Session Initiation Protocol (SIP) and described by the Session Description Protocol (SDP). Network resources are reserved before the session is started, thereby using existing network resource reservation mechanisms (e.g. RSVP).

[Kly1] presents a format to express media feature sets that represent media handling capabilities. In addition, an algorithm is provided that matches the feature sets. It might be used to determine if the capabilities of a sender and receiver are compatible. In addition, in [Kly2] an abbreviated format for composite media feature sets that use a hash of the feature representation to describe the composite is disclosed.

In [Ros2], a complete model for a one-to-one capabilities negotiation with SDP is described. However, this model suffers from problems caused by the definition of mutually referred information and information on grouping media streams due to the flat hierarchy structure of the SDP.

[Kut1] describes a set of requirements relevant for a framework for a session description and an end-point capability negotiation in multi-party multimedia conferencing scenarios. Depending on user preferences, system capabilities or other constraints, different configurations can be chosen for the conference. Thereby, the need for a negotiation process among the peers is identified, but not described in order to determine a common set of potential configurations and select one of the common configurations to be used for information exchange. This capability negotiation is used to get a valid session description, compatible with the end system capabilities and user preferences of the potential participants. Different negotiation policies may be used to reflect different conference types. They also identify the need for network resource reservation coupled with session setup. Finally, a proposal is drafted for describing capabilities and providing the negotiation language, but not a protocol. Thereby, the solution proposed in [Kut1] does neither consider the negotiation protocol for determining a common set of QoS configuration nor integrate local, peer and network resource reservation.

The most recent version of this IETF draft, in the following referred to as [Kut2], provides a detailed XML Schema specification and a prototype of the Audio Codec and Real-Time Protocol (RTP) Profiles.

In [Bos1], an end-to-end user-perceived QoS negotiation is described, with the presumption that some middleware and services may strongly be involved in the final decision about the negotiated QoS-information of the end peers. The decision as described may be taken over some standard "contract types". Although it is mentioned that the signaling and the data path may go different ways through the network, it is suggested that some middleware on the way of the negotiation path may influence the negotiation though in general having nothing to do with the data paths. In case this protocol model is deployed, the network is not transparent. The negotiation process according to [Bos1] is performed at one shot interleaving also with some non-QoS information (e.g. security, network admittance, etc.) without considering protocol modularity and information consistency with respect to QoS. With the model of [Bos1], it is only possible to use a push mode for the negotiation, which may be restrictive for some applications and services. The adaptation paths are only degrading and fixed.

In the articles [Man1], [Man2], and [Cam2], the possibility of grouping media streams is discussed. However, the authors do not consider criteria for the grouping, the possibility of recursive group building (a group of many groups), and the treatment of real, pseudo-real and non-real-time information media streams that also may be grouped. Besides, [Man1] and [Man2] define negotiation steps that may or may not run at one shot but not during independent negotiation phases. For this reason, they do not meet the requirements for the consistency of the negotiated QoS information during a negotiation phase and after it. Thereby, in [Man1] the core concepts of the E2ENP are disclosed. The treatment of colliding "Economy Principle" applications is also not considered. Moreover, [Man1] and [Man2] describe the possibility of setting and managing adaptation paths for the QoS adaptation, which is controlled by a third party component—the QoS Broker. However, the authors do not consider any possibility for the end parties to perform and control the negotiations on their own.

PROBLEMS TO BE SOLVED BY THE INVENTION

Nowadays, adaptive applications and/or middleware (e.g. QoS Brokers) do not comprise any component which is capable of handling QoS pre-negotiation, QoS negotiation and/or QoS re-negotiation, resource reservation and/or release coordination offering a technology-independent Application Programming Interface (API), which masks the type of signaling protocols used for implementing those mechanisms. Instead, adaptive multi-stream multimedia applications and/or middleware have directly to be coded against protocols like H.323, the Session Initiation Protocol (SIP) and/or the Session Description Protocol (SDP, in future SDPng as described in [Kut2]). Furthermore, said SIP- and/or SDP-based applications or middleware directly perform a parsing of the SDP data and have to infer the actions to be taken by examining changes on the SDP data from previously exchanged versions thereof.

Another problem is that adaptive applications and/or middleware (e.g. QoS Brokers) are not able to express the information to be negotiated (e.g. capabilities, application-level QoS Contracts, network-level QoS Contracts, stream-level adaptation paths, and stream-group-level adaptation paths) in an interchangeable format. It is required that heterogeneous applications and/or middleware can easily agree on a reference model, which said applications and/or said middleware can then use for dynamically configuring themselves to orchestrate local, peer, and network resources according to the preferences and profiles of the respective user, policies of the respective systems and network providers in a coordinated manner among a multiplicity of heterogeneous applications and middleware used by various peers.

In the European patent application EP 01 122 366.6, the overall E2ENP concept, its requirements, and a possible implementation idea thereof is disclosed, however, without detailing any implementation. Any pre-negotiated information is not accomplished in time.

Although the current form of SDPng as described in [Kut2] is structured in a modular way, it does not consider E2ENP aspects and can not be used in a modular way across different SIP messages (or other protocol messages). Capability negotiations based on SDPng use the SDP Offerer/Answerer model described in [Ros2], in which complex multi-phase negotiation processes such as the one proposed in the scope of E2ENP are not explicitly taken into account.

A process capable of considering user profile information as input for the overall QoS negotiation process is neither addressed in the European patent application EP 01 122 366.6 nor in SDPng.

OBJECT OF THE UNDERLYING INVENTION

In view of the explanations mentioned above, it is the primary object of the underlying invention to propose a negotiation method and a software architecture supporting capability and QoS negotiation and session establishment combined with resource reservation mechanisms for adaptive real-time services and multimedia applications.

This object is achieved by means of the features of the independent claims. Advantageous features are defined in the subordinate claims. Further objects and advantages of the invention are apparent in the following detailed description.

SUMMARY OF THE UNDERLYING INVENTION

The underlying invention is basically dedicated to the concept and realization of a novel User Agent (UA) for an End-to-End Negotiation Protocol (E2ENP)—a software module encapsulating the end-to-end signaling processes of the E2ENP as described in [ReqSpec]—, which can advantageously be applied to define user profile and terminal capability information in such a way that hierarchical QoS Contract specifications (e.g. compelling correlations across different sets of QoS Contracts for related media streams) can be enforced and used for deriving negotiable information. As a reference implementation of this concept, this invention describes a novel usage of the Session Initiation Protocol (SIP) standardized by the Internet Engineering Task Force (IETF) in conjunction with extensions of the Session Description Protocol—Next Generation (SDPng) specification based on the Extensible Markup Language (XML) in order to implement End-to-End QoS Negotiation Protocol (E2ENP) concepts. More specifically, the hereby proposed model extends the SDPng negotiation mechanisms by defining user profile and terminal capability information which allow to enforce and use hierarchical QoS Contract specifications.

Thereby, said End-to-End Negotiation Protocol (E2ENP) is applied to derive negotiable information, which enables a pre-negotiation, fast negotiation and a fast, dynamic re-negotiation of the end-to-end quality and capabilities for a telecommunication session, for multiple configurations of two or a multiplicity of end peers and/or middleware in a consistent, reliable, and incremental way by enabling the mobile applications to efficiently and timely react to QoS violations. Furthermore, the invention pertains to the concept and realization of a novel E2ENP User Agent which encapsulates the signaling part of E2ENP. Said E2ENP User Agent expresses the information to be negotiated in an interchangeable format in such a way that heterogeneous applications can easily agree on a reference model, which can then be used for dynamically configuring Finite State Machines to orchestrate local, peer, and network resources according to the preferences and profiles of the respective user in a coordinated manner.

According to the underlying invention, the conversation of an interchangeable format between an internal (application- and/or middleware-specific) and an external (SIP User Agent specific) representation is performed by a Parser and a Factory implementation. These software components are also configurable according to the specific needs of the underlying carrier protocol agent, the E2ENP User Agent, and the respective application and/or middleware. In this connection, the specific E2ENP User Agent session identification and the respective application and/or middleware session identification of the applied negotiation processes and sub-processes are uniquely mapped to each other and cached in order to be able to uniquely identify pre-negotiation, negotiation and/or re-negotiation sessions. Thereby, the Parser, the Factory, and the Cache are coupled with the implementations of the respective E2ENP User Agent. It should be noted that the configuration of these four software components—Parser, Factory, Cache, and E2ENP User Agent—and the User Agent of the applied carrier protocol is an application-specific task, which depends on the needs of the respectively employed application and/or middleware component.

BRIEF DESCRIPTION OF THE DRAWINGS

Further advantages and possible applications of the underlying invention result from the subordinate claims as well as from the following description of the preferred embodiment of the invention, illustrated by the following figures and tables:

FIG. 6 presents a document showing examples for the syntax of the E2ENP Universal Resource Identifier (URI), thereby using the Augmented Backus-Naur Form (ABNF), FIG. 7 outlines a first message sequence chart (MSC) showing the pre-negotiation procedure enabled by the User Agent (UA) of the proposed End-to-End Negotiation Protocol (E2ENP), FIG. 8 outlines a second message sequence chart (MSC) showing the session establishment with a QoS negotiation and resource reservation coordination enabled by the User Agent (UA) of the proposed End-to-End Negotiation Protocol (E2ENP), FIG. 9 exhibits a UML class diagram showing the org::mind::e2enp::Cache sub-package, FIG. 38 shows a list of primitives implemented by the Service Provider, based on a Java implementation of the Application Programming Interface (API) applied to the User Agent (UA) of the End-to-End Negotiation Protocol (E2ENP), FIGS. 39A and 39B show a list of primitives to be implemented by the Service User, based on a Java implementation of the Application Programming Interface (API) applied to the User Agent (UA) of the End-to-End Negotiation Protocol (E2ENP), FIG. 40 shows a list of primitives to be implemented by the Service User acting as an Offerer, based on a Java implementation of the Application Programming Interface (API) applied to the User Agent (UA) of the End-to-End Negotiation Protocol (E2ENP), FIG. 41 shows a list of primitives to be implemented by the Service User acting as an Answerer, based on a Java implementation of the Application Programming Interface (API) applied to the User Agent (UA) of the End-to-End Negotiation Protocol (E2ENP), FIG. 42 shows the methods provided by the Application Programming Interface (API) of the first Cache level, FIG. 43 shows the methods provided by the Application Programming Interface (API) of the second Cache level, FIGS. 44A and 44B show a list of primitives which have to be implemented by the Application Programming Interface (API) of the Parser, FIG. 45 shows a list of primitives which have to be implemented for generating a specific Parser instance, FIG. 46 shows a list of primitives which have to be implemented by the Application Programming Interface (API) of the Factory, FIG. 47 shows a list of primitives which have to be implemented for generating a specific Factory instance, FIG. 48 shows the methods provided by the well-known Factory-Factory class E2ENPContentHandlerFactory, FIG. 49 shows a list of primitives implemented by the Service Provider of the User Agent (UA) of the End-to-End Negotiation Protocol (E2ENP), based on a Java implementation of the generic Application Programming Interface (API) applied to the User Agent (UA) of the End-to-End Negotiation Protocol (E2ENP), FIG. 50 shows a list of client-side-specific primitives implemented by the Service User, based on a Java implementation of the generic Application Programming Interface (API) applied to the User Agent (UA) of the End-to-End Negotiation Protocol (E2ENP), FIG. 51 shows a list of server-side-specific primitives implemented by the Service User, based on a Java implementation of the generic Application Programming Interface (API) applied to the User Agent (UA) of the End-to-End Negotiation Protocol (E2ENP), FIG. 52 shows a list of both client-side- and server-side-specific primitives implemented by the Service User, based on a Java implementation of the generic Application Programming Interface (API) applied to the User Agent (UA) of the End-to-End Negotiation Protocol (E2ENP), FIG. 53 shows a list of primitives implemented by the Service Provider, based on a Java implementation of the generic Application Programming Interface (API) applied to the User Agent (UA) of the End-to-End Negotiation Protocol (E2ENP), FIG. 54 shows a list of primitives implemented by the Service User, based on a Java implementation of the generic Application Programming Interface (API) applied to the User Agent (UA) of the End-to-End Negotiation Protocol (E2ENP), FIGS. 55A, 55B, 55C, and 55D are a state transition table showing a survey of the applied exception events, and FIGS. 56A and 56B show the applied timers applied to the End-to-End Negotiation Protocol (E2ENP) according to the underlying invention.

DETAILED DESCRIPTION OF THE UNDERLYING INVENTION

According to one embodiment of the underlying invention, an E2ENP UA 128 supports the following platforms: Win32 and Linux. Quality, robustness, maintainability, extensibility, flexibility and efficiency are the challenges to the architecture and its solutions.

Quality includes testability and verification of the system already during development. Robustness is the ability of the system to stay stable and available also in error situations. Both aims directly affect the availability and acceptance of the system.

Maintainability and extensibility include all costs of the system in later phases (concerning both error correction and extensions). These costs must be minimized.

Flexibility also addresses the point that changes should be applied as cost-effective as possible.

Efficiency addresses minimization of resource usage (concerning memory and processor).

For the architecture, the following basic conceptual and technical requirements can be derived:

definition of design components with well chosen and defined responsibility and features;

small dependencies between design components (loose coupling), so that changes have only a limited effect;

minimum resource consumption, especially concerning the applied Random Access Memories (RAMs);

a strict separation between interface and implementation (a change of the implementation shall not affect the interface);

definition of restrictions, if this simplifies the realization concept—however, restrictions and their effects must be negotiated with the stakeholders.

Figure 1:
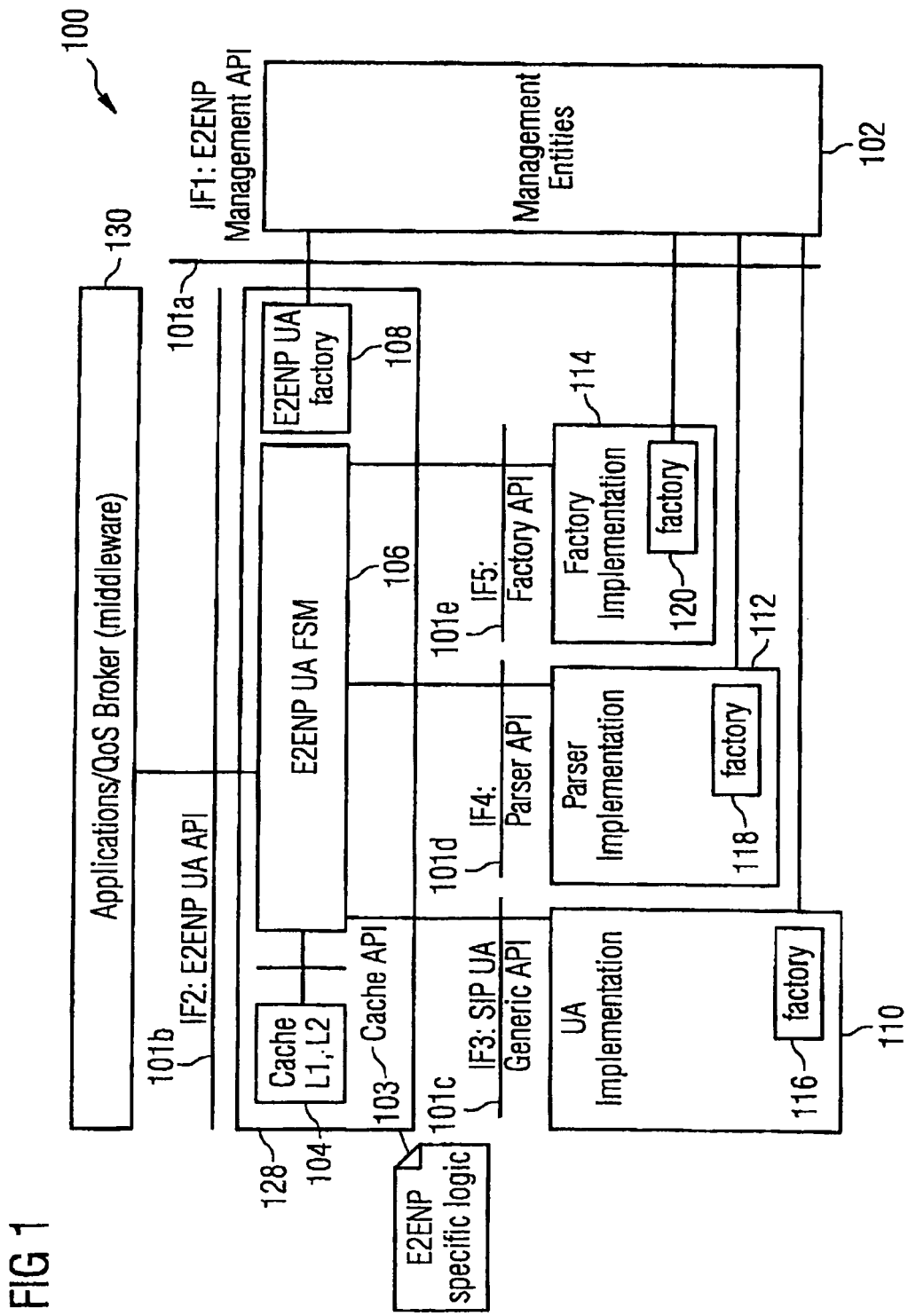
FIG. 1 presents a block diagram showing the applied architecture for the User Agent (UA) of the End-to-End Negotiation Protocol (E2ENP) according to the underlying invention.

The E2ENP UA 128 depicted in FIG. 1 is designed as a software component which communicates with the environment through the following five APIs:

E2ENP Management API 101a (IF1): This API represents the interface between the E2ENP UA 128 and any entities 102 managing it, in the sense of configuration, monitoring, and control.

E2ENP UA API 101b (IF2): This API represents the interface between the E2ENP UA 128 and any application 130 or middleware using the services offered by said E2ENP UA 128. The information exchanged through this API can be modeled as an object structure or as an XML-based document, to be accordingly interpreted by applications 130 or middleware 130 placed on top of the E2ENP UA 128.

SIP UA Generic API 101c (IF3): This API represents the interface between the E2ENP UA 128 and the session-layer protocol used for implementing the E2ENP-specification. The name of this API clearly indicates that the Session Initiation Protocol (SIP) described in [Ros1] is used as a reference session-layer protocol. However, with minor modifications, this API can easily be generalized in a future design review, so as to remove the E2ENP UA dependency on the SIP. Nevertheless, by using this design it would be possible to have a complete Java Remote Method Invocation (RMI) implementation of the SIP UA Generic API 101c (IF3).

Parser API 101d (IF4): This API represents the interface between the E2ENP UA 128 and any Parser implementation 112 used for decoding the E2ENP session description.

Factory API 101e (IF5): This API represents the interface between the E2ENP UA 128 and any Factory tool 114 used for encoding the E2ENP session description.

Internally, the E2ENP UA 128 is composed of different Finite State Machines 106 (FSMs) handling the coordination of the procedures associated with the aforementioned interfaces, and their interrelations. More specifically, the E2ENP UA 128 should feature a client FSM 106 and a server FSM 106 for independently and simultaneously handling, respectively, the initiation of an E2ENP (pre-)negotiation and/or session establishment, and the response to such procedures. This means mapping primitives of the interface 101b (IF2) to primitives of the interface 101c (IF3), and vice versa. The mapping of the primitives concerns both object and object identifiers mapping. The mapped objects and the identifiers are stored in a respective Cache 104 at the E2ENP UA 128 and/or at the application 130 above IF2.

During this mapping process, the E2ENP UA FSMs 106 should also be able to access the interfaces 101d (IF4) and 101e (IF5) for handling, respectively, E2ENP session description decoding and encoding.

The Parser and Factory implementations 112 and 114, respectively, though essential entities for implementing the E2ENP concept, are designed as separated software components, insofar as they can be implemented in various ways (based on SDP, SDPng, SDPng dialects, or any other session description languages of choice).

In the following subsection, the basic problem domains of the to system shall be described and how they are solved within the E2ENP UA 128. Each problem domain is discussed individually and across the system. It refers to other problem domains if there is any interference with them or if a part of the problem domain is discussed more detailed in an extra section.

The E2ENP UA 128 is designed according to the object-oriented paradigm, and a Java-based prototype based on such design is hereby described. It allows using various types of XML parsing tools (through IF4) and various session level protocols (through IF3) to transport E2ENP primitives. The hereby-described prototype based on the aforementioned E2ENP UA design uses SIP as described in [Ros1] as session-layer protocols. Various SIP implementations are supported by the E2ENP UA design, thanks to the abstract nature of IF3.

In the scope of the underlying invention, both the E2ENP UA FSM 106 and the SIP UA Generic API (IF3) are explicitly designed to support SIP. It is foreseen that in a future design review these dependencies will be removed by making IF3 even more abstract. The E2ENP UA 128 will also be able to simultaneously support multiple users of multiple applications 130 using multiple instances of the E2ENP UA services.

The E2ENP UA 128 supports three types of object categories: identifiers (IDs), description objects (object graphs or a formal description of an object graph, like XML) and event objects. These categories correspond to the objects passed to the agent through IF2, IF3, IF4, and IF5 in both directions.

The IDs are needed to uniquely identify the session description objects. There are two types of identifiers, which are also objects:
  E2ENP internal object IDs, corresponding to the objects processed within the E2ENP UA FSMs 106,
  application IDs pointing also at the respective E2ENP UA FSM 106 objects, which are used by an application 130 to steer negotiation events.

The session description objects are either object graphs used by the E2ENP UA FSM processing or external descriptions used by the Parser implementation 112, the Factory implementation 114, and the E2ENP UA 128 by a negotiation process. All these session description objects can persistently be saved by the application 130 (above IF2) using them. The management (leasing descriptions, refreshing of leased descriptions, etc.) of the saved objects is an application-specific task.

The event objects correspond to application negotiation events, which affect the E2ENP UA FSM 106 functionality by triggering adaptation sequences.

The IDs, the E2ENP UA FSM object graphs and the event objects are Java objects. The external protocol representations can be SDP, SDPng, SDPng dialects, or any other session description language objects of choice. The implementation of the Java objects passed through interface IF2 depend on the interface definition of IF2. The objects passed through the interfaces IF4 and IF5 are either E2ENP UA FSM 106 object representations or external protocol representations. The objects passed through IF3 are external protocol representations. All the external representations of the session description objects passed through IF3, IF4 and IF5 should implement java.io.Serializable in order to be compatible with the SIP Surrogate RMI implementation.

The internal representations of the session description objects passed over the IF2, IF3, IF4 and IF5 shall be typed as java.lang.Object and should be cast into the expected type by the E2ENP UA 128, the Parser 112, and the Factory 114. This requirement is necessary to keep the SIP UA 110 and the implementations of the Parser 112 and the Factory 114 modular by leveraging generic APIs.

The following section contains a brief survey of the applied implementations of the Parser 112 and the Factory 114.

Since the negotiation process involves at least two entities interconnected by a network, it is necessary to provide mapping functionality from system-internal representation to a transport representation over the network and back. The mechanisms that provide this mapping are called Parser API 101*d* (in the following referred to just as Parser 112) and Factory API 101*e* (referred to as Factory 114), where the Parser 112 takes an object encoded in network representation as input and generates a system-internal representation of said object. In contrast, the Factory 114 generates a network representation for a given system-internal representation.

The need for said Parser API 101*d*, said Factory API 101*e* and the functionality defined by them arises from the facts that the system-internal representation may not be appropriate for a transport representation that can be sent over networks and the transport representation may not be adequate for a system-internal representation.

Additionally, introducing these components into the system decouples the higher application layer from the lower transport-oriented layers. As a consequence, the actually used transport protocol is of no concern to the upper application layers and should ideally be pluggable.

The use of the Extensible Markup Language (XML) as transport syntax is motivated by the widespread adoption of XML as an industry standard, and it also allows for the incorporation of external features (SDPng libraries and profiles) and provides compatibility to related work (SDPng schema). Another feature of XML is its simple extensibility.

As described above, the use of different carrier protocols requires that the Parser 112 and the Factory 114 are configurable by the same means as the protocol, which means that in case the protocol is configurable at runtime, said Parser 112 and said Factory 114 might also have to be changed while the system is running. This implies the specification of an abstract interface, since the actual implementations depend on the specific underlying carrier protocols.

Concrete Factory 114 implementations for different carrier protocols will produce different results. For example, an RMI factory may just be a dummy implementation. It is thus possible to transfer Java objects, e.g. the objects "as is", directly over a network connection by simply using Java Remote Method Invocation (RMI).

If SIP is used as a carrier protocol, however, an external representation (more specifically a protocol data unit or PDU) to be sent over the network has to be generated.

Possibilities include but are not limited to some proprietary text format similar to SDP, for example, or a more structured approach using XML, as e.g. SDPng does.

The API definitions for the Parser API 101*d* and the Factory API 101*e* are un-typed in order to support loose coupling of the E2ENP UA 128 and the Parser 112 as well as the Factory 114. The transport representation as described above is implemented by just using the java.io.Serializable interface, which is inherently un-typed. The system-internal representation is chosen to be the represented as java.lang.Object. The matching between the actual implementations of the Parser 112 and the Factory 114 and the object representation used in the E2ENP UA 128 have to be established by configuration.

The mechanism is implemented by the following two software components:
  Parser API 101*d*: Primitives of this API should accept as parameters any object implementing the java.io.Serializable interface. The result of the parsing process yields an object representation according to IF2, which will abstractly be typed as java.lang.Object.
  Factory API 101*e*: Primitives of this API should accept as parameter any object representation according to IF2, which will be abstractly typed as java.lang.Object and generate a representation conforming to the java.io.Serializable interface.

Additionally, in order to achieve configurability, the use of a "factory design pattern" for creating Parser 112 and Factory 114 instances is a possible solution. For this purpose, the factory method is parameterized with the transport protocol (the distinguishing feature of different Parser 112/Factory 114 implementations). If dynamic support for different carrier protocols is needed, the factory classes have to provide a registration procedure for new protocols.

In the next section, the use of SIP surrogates shall briefly be described.

The applied SIP UA Generic API 101c (IF3) requires the availability of a SIP UA implementation which supports such an API. Similarly, the Parser API 101d (IF4) and the Factory API 101e (F5) presume the availability of parser and factory implementations compatible with the UA implementation 110, respectively. In order to allow validating and rapidly prototyping the E2ENP model, IF3, IF4, and IF5 have been designed in such a way that surrogates of real SIP UA implementations and of compatible Parser 112 and Factory 114 implementations can be used as handy alternatives for experimental purposes.

By using a legacy implementation (already provided code/API and/or software, possibly from an external implementer) of the SIP UA 110 for testing and/or updating the E2ENP UA 128, it might be sometimes difficult to establish the connection between the E2ENP UA 128 and the SIP UA 110, as the interface provided by the legacy SIP implementation may not match directly the interface 101c required by the E2ENP UA. In general, using a SIP UA 110 to provide network connectivity for the E2ENP UA 128 is not recommended whenever testing new E2ENP UA 128 features, due to possible conceptual contradictions between the protocol agents (SIP and E2ENP). These contradictions may result in specification changes of the carrier protocol—SIP, that is why for the tests of the E2ENP UA 128 the usage of a SIP emulator (which can easily adopt conceptual changes) is preferable.

In order to carry out a SIP emulation, SIP surrogates (e.g. Remote Procedure Call mechanisms, RPCs) can be employed. When E2ENP session description payloads have to be tested without necessarily using "full-blown" Parser 112 and Factory 114 implementations, solutions coupled with the chosen SIP surrogate can also be applied.

As mentioned above, a prototype E2ENP UA 128 implementation based on the hereby-presented architectural model has been selected for demonstrating the E2ENP concept. Since this implementation is based on Java, an RPC-based, built-in Java RMI mechanism has been selected as SIP surrogate.

Since RMI takes care of marshalling or demarshalling the SIP UA Generic API 101c (IF3) primitives payload directly, all the parameters passed to the API have to implement the java.io.Serializable interface.

In order to test E2ENP session description payloads without necessarily using "full-blown" Parser 112 and Factory 114 implementations (for the same reasons set forth above for the use of SIP surrogates), passing such content through the IF3 as a string might be not necessary as RMI can process objects. Rather, a whole object structure representing a given E2ENP session description payload might be exchanged directly through the RMI marshalling or demarshalling mechanism. Therefore, the prototype E2ENP UA 128 implementation based on the hereby-presented architectural model has been designed in such a way that the IF3 primitives shall accept as parameters any object implementing the java.io.Serializable interface, and not just instances of the java.lang.String class.

Said mechanism is implemented by the following software components:

SIP UA Generic API 101c: Primitives of this API shall accept as parameters any object implementing the java.io.Serializable interface, and not just instances of the java.lang.String class. A SIP UA 110 implementation shall interpret the passed objects as instances of the java.lang.String class via casting mechanism. The RMI surrogate SIP implementation shall directly serialize or deserialize the aforementioned objects "as is".

Parser API 101d: Primitives of this API shall accept as parameters any object implementing the java.io.Serializable interface.

Factory API 101e: Primitives of this API shall accept as parameters any object implementing the java.io.Serializable interface.

Figure 2:
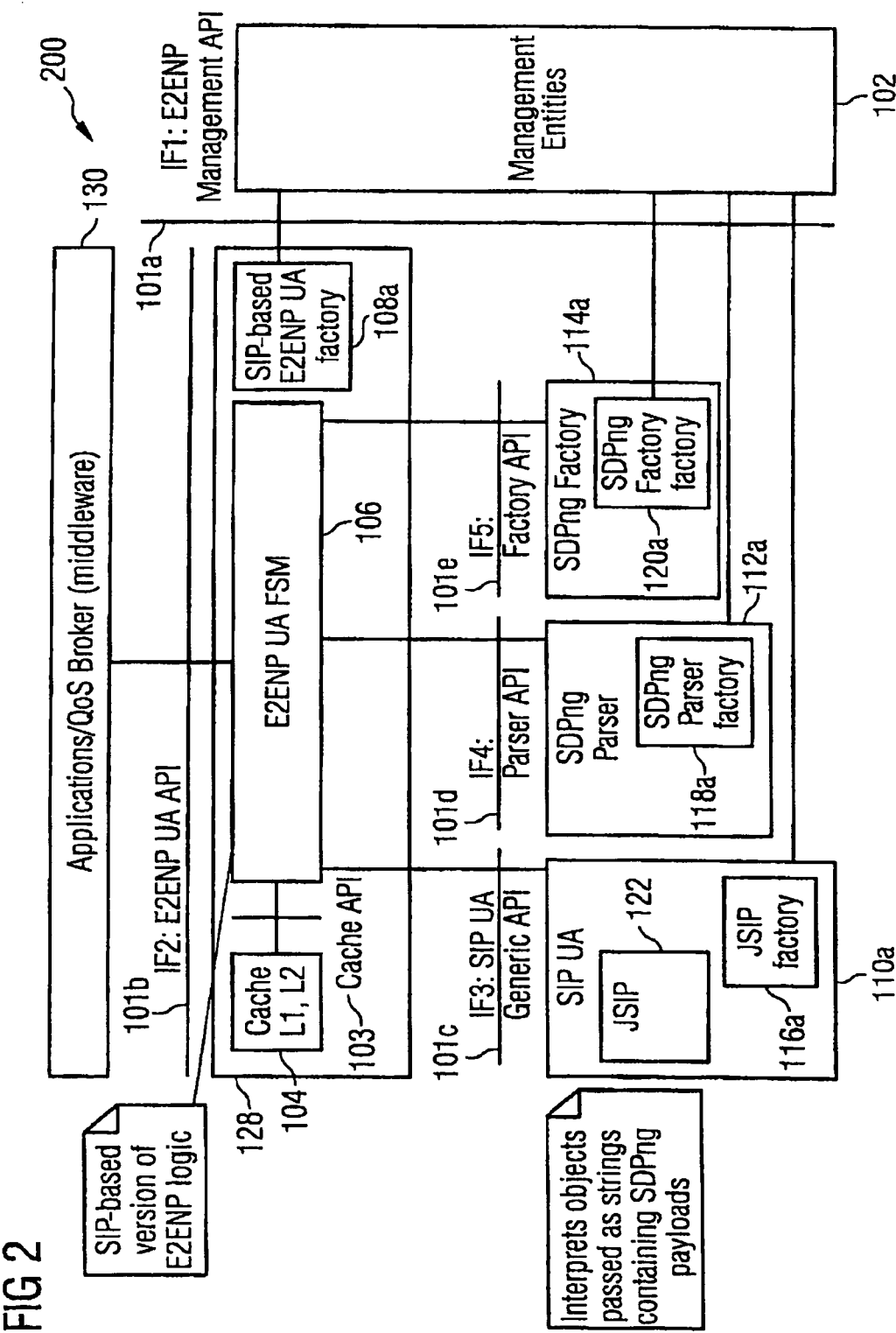
FIG. 2 shows a first implementation example of the applied architecture for the User Agent (UA) of the End-to-End Negotiation Protocol (E2ENP) according to one embodiment of the underlying invention using a Java-based SIP stack (JSIP), an SDPng Parser and Factory.

FIG. 2 shows an implementation of the architectural model as mentioned above, based on a specific SIP UA 110 implementation (e.g. a Java based SIP stack—JSIP), and on Factory 114 and Parser 112 implementations handling a modified version of SDPng.

Figure 3:
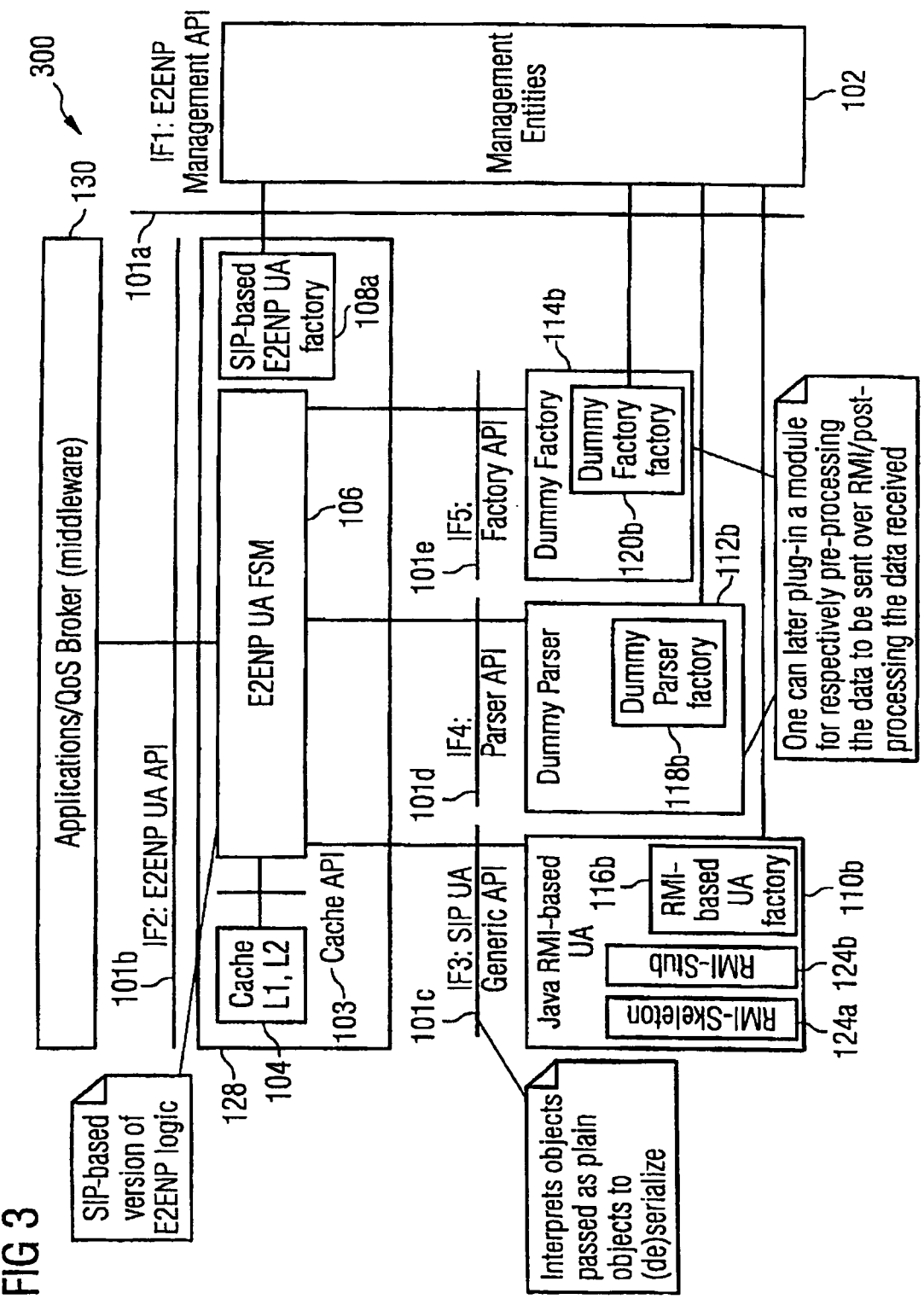
FIG. 3 shows a second implementation example of the applied architecture for the User Agent (UA) of the End-to-End Negotiation Protocol (E2ENP) according to one embodiment of the underlying invention using Sun's Java Remote Method Invocation (RMI)

FIG. 3 shows an implementation of the architectural model mentioned above, based on an RMI SIP surrogate: In this case, the Factory 114b and Parser 112b implementations are simply dummies.

The Dummy ParserFactory 118b and the Dummy FactoryFactory 120b respectively create the "Dummy Parser" runtime instance 112b and the "Dummy Factory" runtime instance 114b.

Though indicated as "dummy", still, said Parser 112b and said Factory 114b could check and/or enforce that the objects used in the object graph are typed as "java.io.Serializable".

Figure 4:
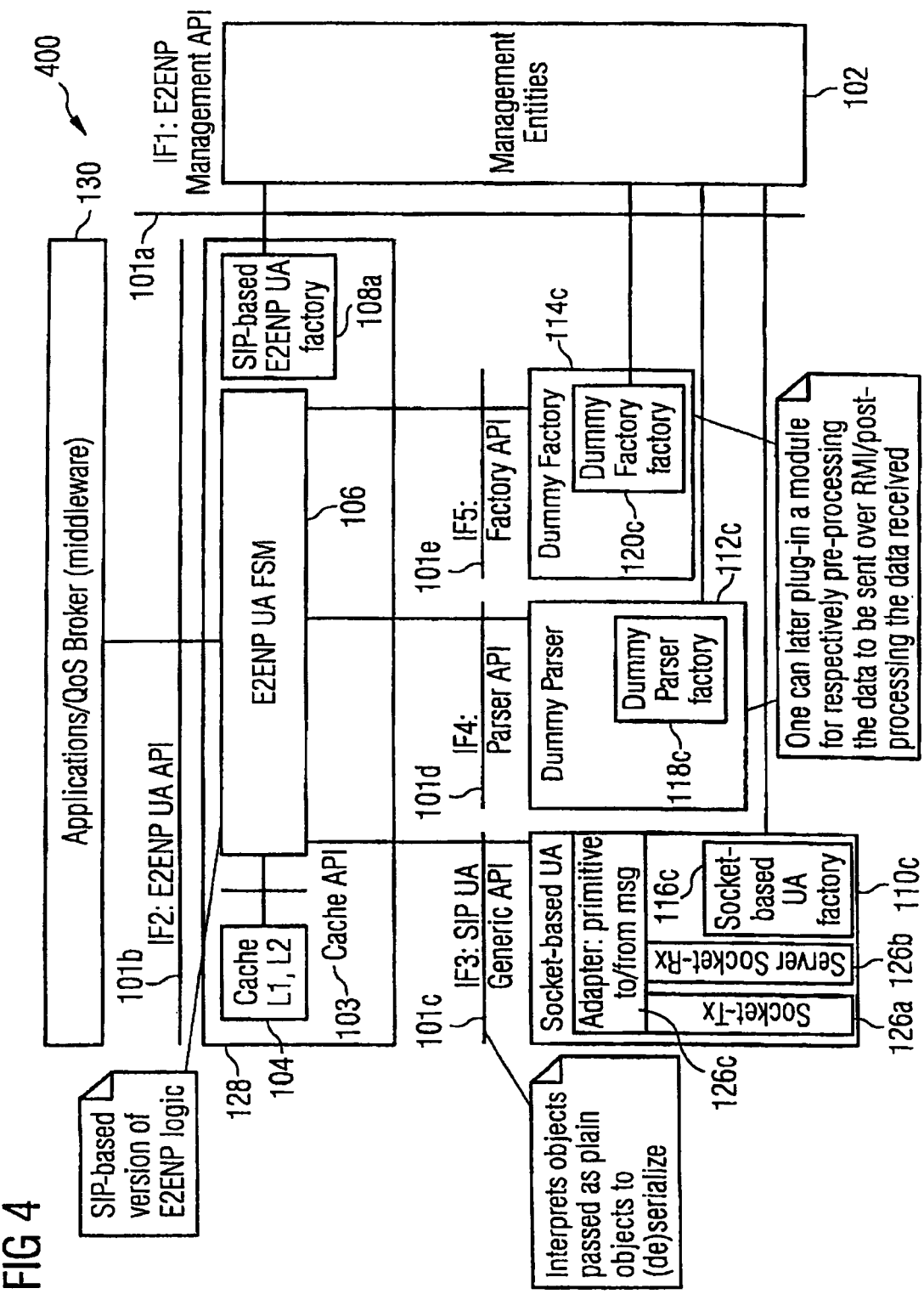
FIG. 4 shows a third implementation example of the applied architecture for the User Agent (UA) of the End-to-End Negotiation Protocol (E2ENP) according to one embodiment of the underlying invention using the socked-based User Datagram Protocol (UDP) or Transmission Control Protocol (TCP), FIG. 5A exhibits a UML class diagram showing the org:: mind::e2enp package.

FIG. 4 shows an implementation of the architectural model mentioned above, using a socket-based SIP surrogate: in this case, the Factory 114c and Parser 112c implementations are simply dummies. Nevertheless, one could also use the SDPng Parser 112a and SDPng Factory 114a to send XML based strings across the sockets using a proper Adapter 126c. The primitives are manually mapped into messages to be sent over sockets, thus implementing a proprietary Remote Procedure Call (RPC) mechanism.

The Dummy FactoryFactory 120c and Dummy ParserFactory 118c create respectively the "Dummy Parser" runtime instance 112c and the "Dummy Factory" runtime instance 114c.

Though indicated as "dummy", still, said Parser 112c and said Factory 114c could check and/or enforce that the objects used in the object graph are typed as "java.io.Serializable".

In the following subsections, the software components applied within the scope of the E2ENP UA 128 according to the underlying invention shall briefly be described from the viewpoint of the component. For each software component, its requirements, offered services and constraints are described and also its relations to other software components. This description serves as the basis for the detailed design.

FIG. 1 shows all software components and their usage relations. A software component is assigned to a layer and may have relations to components on the same or a lower layer but not to software components on a higher layer. The layers do not have the strict meaning of encapsulating a lower layer.

Accordingly, the entity using the services offered by a given API will be referred to as Service User, whereas the entity implementing the services of said API will be referred to as Service Provider.

The E2ENP UA API 101*b* (the aforementioned IF2) exposes the E2ENP UA functionality to Service Users like QoS-aware applications 130 and/or QoS Brokers 130, according to the BRENTA model as described in [BRENTA]. This component realizes the specification of a generic API by defining a set of interfaces and complex data types exchanged through said API.

Thereby, said E2ENP UA API 101*b* allows multiple instances of Service Users to simultaneously access the E2ENP UA 128 functionality. More specifically, the E2ENP UA 128 offers the following services as described in [ReqSpec]:

1. pre-negotiation of a multiplicity of alternative capabilities and/or QoS Contracts (at both application and network level);
2. management of leased pre-negotiated information;
3. session establishment with negotiation of a multiplicity of alternative capabilities and/or QoS Contracts (at both application and network level), potentially referencing pre-negotiated information;
4. same as point 2, but with additional local, peer, and network resource reservation coordination;
5. re-negotiation, similar to points 2 and 3;
6. session release, with potential reservation release coordination.

In order to expose these services, the E2ENP UA API 101*b* shall expose, respectively, the following primitives:

1. pre-negotiation;
2. leaseRenewal, which can be used for refreshing or terminating a lease;
3. negotiation, parameterized to indicate whether resource reservation coordination is required. If resource reservation coordination is required, the E2ENP UA 128 allows the Service User at the Offerer side to book the mutually exclusive access to the resource reservation phase via the bookNegotiation and/or bookrenegotiation primitive;
4. re-negotiation: If resource reservation coordination has been specified as required in the original negotiation phase, the E2ENP UA 128 allows the Service User at the Offerer side to book the mutually exclusive access to the resource reservation phase via the bookRenegotiation primitive;
5. release.

The E2ENP UA API 101*b* has been designed based on the following design principles:

1. Primitives are classified into Request (Req), Indication (Ind), Response (Rsp), and Confirmation (Cfm) primitives, according to the ISO/OSI model. Request (Req) and Response (Rsp) primitives are invoked by the client application 130 or middleware 130 implementation (also known as Service User), in order to respectively initiate or respond to a particular message exchange. (In some cases the message exchange may involve a set of different messages being exchanged between peers, thanks to the abstraction offered by the given E2ENP UA implementation, whereas in other cases the message exchange is limited to the given message and its acknowledgment.) Indication (Ind) and Confirmation (Cfm) primitives are invoked by the E2ENP UA 128 (also known as Service Provider) to the registered client-side of the Service User 130, in order to respectively indicate the arrival of a particular message exchange or to confirm the conclusion of a given message exchange. (Again, in some cases the message exchange may involve a set of different messages being exchanged between peers, thanks to the abstraction offered by the given Service Provider, whereas in other cases the message exchange is limited to the given message and its acknowledgment.) The client-side of the Service User 130 must implement these primitives. To a request primitive generated by the peer initiating the given protocol message exchange, corresponds an Indication (Ind) primitive at the target peer. To a Response (Rsp) primitive generated by the target peer, responding to the given protocol message exchange, corresponds a Confirmation (Cfm) primitive at the initiating peer.
2. In order to distinguish different Service Users 130, the E2ENP UA 128 exposes at interface 101*b* (IF2) one Service Access Point (SAP) per registered Service User 130. Thereby, any given Service User 130 can use more than one SAP at said interface 101*b* (IF2) in a one-to-many relationship.
3. Users can only be registered with one Service User 130 at a time, which means that each user will be associated with at most one SAP at said interface 101*b* (IF2).
4. In order to simultaneously and independently use different session layer protocols 110 (e.g. various SIP implementations and/or RMIs), the E2ENP UA 128 exposes at interface 101*c* (IF3) one SAP per registered session layer protocol.
5. In order to properly associate Service Users 130 with underlying session layer protocols, the E2ENP UA 128 exposes at interface 101*a* (IF1) proper configuration mechanisms, which allow associating SAPs at interface 101*b* (IF2) with SAPs at interface 101*c* (IF3) in a one-to-one relationship. In this way, user using a given type of application 130 will automatically and transparently be using the associated session layer protocol as configured.
6. When configuring a SAP at interface 101*c* (IF3), the binding of the E2ENP UA 128 to the session-layer protocol 110 is done automatically. With the given SIP UA 110 Generic API at interface 101*c* (IF3) the binding in the opposite direction is done when registering a user with the E2ENP UA 128, and this leads to a registration of the user to the configured session layer protocol 110.
7. The bidirectional binding of the Service User 130 to the E2ENP UA 128 is done by means of the bindReq and bindcfm primitives, where one of the parameters is a special identifier, and the SAP ID (spId) uniquely identifies one of the configured SAPS at interface 101*b* (IF2).
8. Any given user of any given Service User 130 registers himself/herself on the proper Upper SAP by means of the registrationReq and registrationcfm primitives, where one of the parameters is the aforementioned spId, which uniquely identifies the SAP of choice at interface 101*b* (IF2).
9. In order to select the proper Upper SAP when locally initiating any E2ENP session, the following primitives now feature a new parameter "String user" indicating the locally registered user, which uniquely identifies the SAP at interface 101*b* (IF2) said user is registered to:
   renewLeaseReq and
   bookNegotiationReq
10. To select the proper Upper SAP when locally initiating any E2ENP session, the already existing "String form" parameter of the following primitives indicates the locally registered user, which uniquely identifies the SAP at interface 101*b* (IF2) said user is registered to:

preNegotiationReq and
negotiationReq

11. The instances of the application or middleware FSM 130 and of the E2ENP UA FSM 106 are uniquely identified, respectively, by the serviceUserId and serviceProviderId.
12. A simplified version of the "observer design pattern" as described in [Gam] (implemented in Java with a derivation of the Java Beans event model) offers the mechanism allowing the Service User 130 to register (via a primitive called "Bind Request") for Indication (Ind) and/or Confirmation (Cfm) primitive callbacks.
13. In order to allow supporting E2ENP signaling extensibility, most of the primitives allow passing a payload: Today, some of these primitives are in fact not designed to carry payloads, but there is a chance that the E2ENP specification might be reviewed. Thereby, some additional E2ENP information piggybacking could be required.
14. In order to allow different types of Service Users 130 accessing the services of the E2ENP UA 110, the payloads are typed as the Java root class, java.lang.Object: In this way, applications 130 or middleware may use either internal custom representations of the information to be exchanged via the E2ENP (e.g. an XML-based representation), or resort to the default information structure described above.

Thereby, said E2ENP UA API 101*b* depends on the respective application 130 and/or middleware 130 using the services of said E2ENP UA 128, the applied E2ENP UA FSM 106, concerning the implementation of the Request (Req) and Response (Rsp) primitives, and the applied Factory 114 and Parser 112: The chosen implementation of these components dictates the type of representation used for the information exchanged through this API.

Figure 5B:
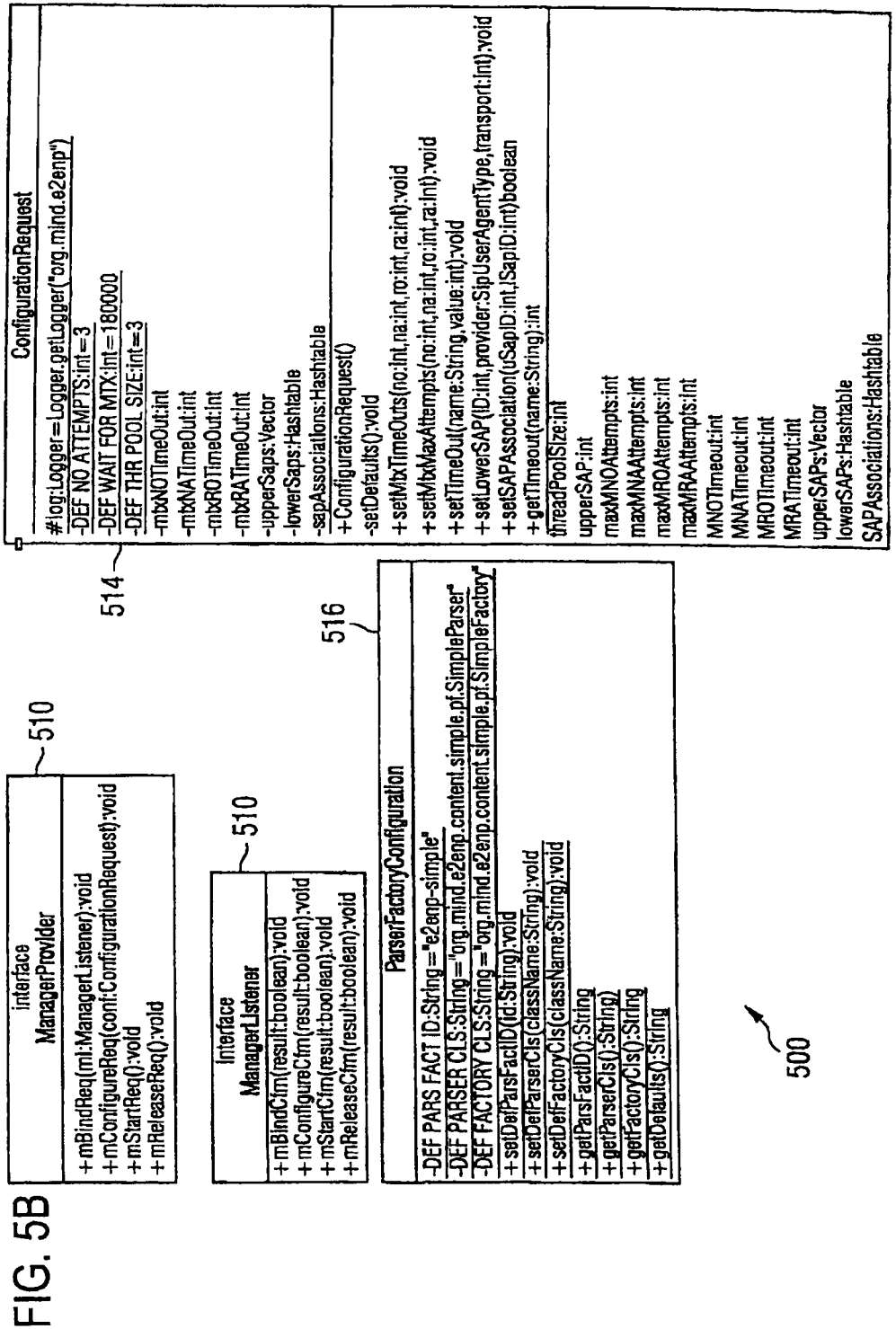
FIG. 5B shows the E2ENP Management API between the E2ENP UA Factory and the Management Entities.

The E2ENP UA API 101*b* has been designed with the aid of the object-oriented paradigm, and is thus hereby described using the Unified Modeling Language (UML). The information to be exchanged via the E2ENP is described above. The component is composed of a basic package, the org::mind::e2enp as depicted in FIGS. 5A and 5B.

To this basic package belong the following interfaces:
The Provider 504 represents the interface that an E2ENP UA Service Provider implementation conforming to the herewith specification, shall support for implementing Request (Req) and Response (Rsp) primitives. FIG. 38 lists the primitives exposed by the Provider interface 504.

The E2ENPUserAgentListener 502 generalizes all the interfaces that Service Users shall implement for intercepting Indication and/or Confirmation (Cfm) primitives generated by the E2ENP UA 128.

FIGS. 39A and 39B list the primitives exposed by the E2ENPUserAgentListener interface 502.

The E2ENPUserAgentListener interface 502 is specialized in the OffererListener interface 506 and the AnswererListener interface 508. The former is specially designed for the application- or middleware-initiating E2ENP procedures; the latter is specially designed for applications 130 or middleware 130 responding to said E2ENP procedures.

FIG. 40 shows the primitives exposed by the OffererListener interface 506, and FIG. 41 lists the primitives exposed by the AnswererListener interface 508.

The "to/from"-parameters passed on by the pre-negotiation and negotiation primitives are addresses identifying E2ENP users (respectively, the Offerer and the Answerer). The E2ENP UA 128 maps these addresses to the specific syntax used by the given session-layer protocol that is used for piggybacking E2ENP information: in the case of this writing, SIP. The E2ENP addresses shall therefore be independent of the specific session-layer protocol, and possibly of the transport protocol used underneath by the E2ENP UA 128. To this extent, a new syntax, which has specially been designed for the E2ENP, shall herewith be proposed.

FIG. 5B shows the E2ENP Management API 101*a* (IF1) between the E2ENP UA Factory 108 and the Management Entities 102, designed by means of the object-oriented paradigm. Thereby, the E2ENP Management API 101*a* (IF1) is composed of a basic package, to which the following components belong: the ManagerProvider interface 510 and the ManagerListener interface 512. For the configuration of the Parser implementation 112 and the Factory implementation 114 via said interface IF1, the classes ConfigurationRequest 514 and ParserFactoryConfiguration 516 are used.

FIG. 6 presents a formal description of such a Universal Resource Identifier (URI) syntax by using the Augmented Backus-Naur Form (ABNF). Thereby, said specification is similar to the SIP URI syntax specification described in [Ros1], but deliberately does not indicate any transport protocol parameter, except for the IP address and/or port number. As an example of E2ENP URI, "e2enp://dave: vG$1809@acme.com" represents a user named "Dave" at the "acme" organization, using password "vG$1809". The "//" indication is a form of a separator for default user cases, when the user is not indicated in the address. The example "e2enp://:xyz %45637@acme.com" shows a default user (which is not indicated) with a password "xyz %45637".

The full or partial usage of the E2ENP address components depends on the domain model (proxying) and the address resolution mechanisms, which are mainly part of the respectively applied session layer protocol (e.g. SIP). The E2ENP UA 128 should use at least the user (default user) name and the domain name to identify the communicating partners, if the session layer protocol is already offering some proxying and/or redirection mechanisms to identify the network paths.

In the following subsections, the procedures executed by the E2ENP UA API 101*b* shall be described by means of a set of UML Message Sequence Charts (MSCs).

Figure 7:
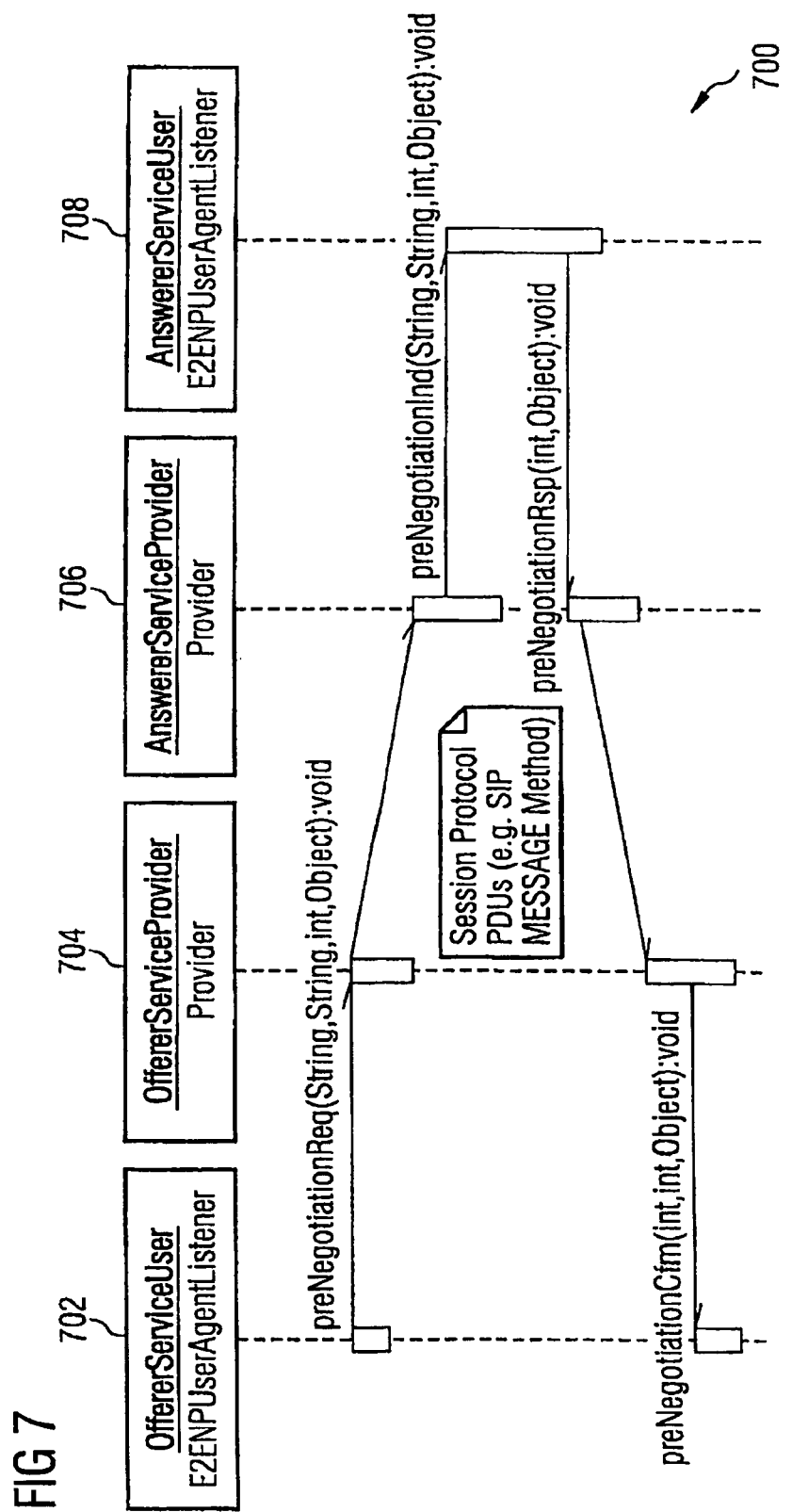

FIG. 7 depicts the simple pre-negotiation scenario in terms of an exchange of primitives through the E2ENP API. With respect to these primitives, specific transport protocol messages are exchanged between the OffererServiceProvider 704 and the AnswererServiceProvider 706, but they are not indicated in FIG. 7 for the sake of generality.

Figure 8:
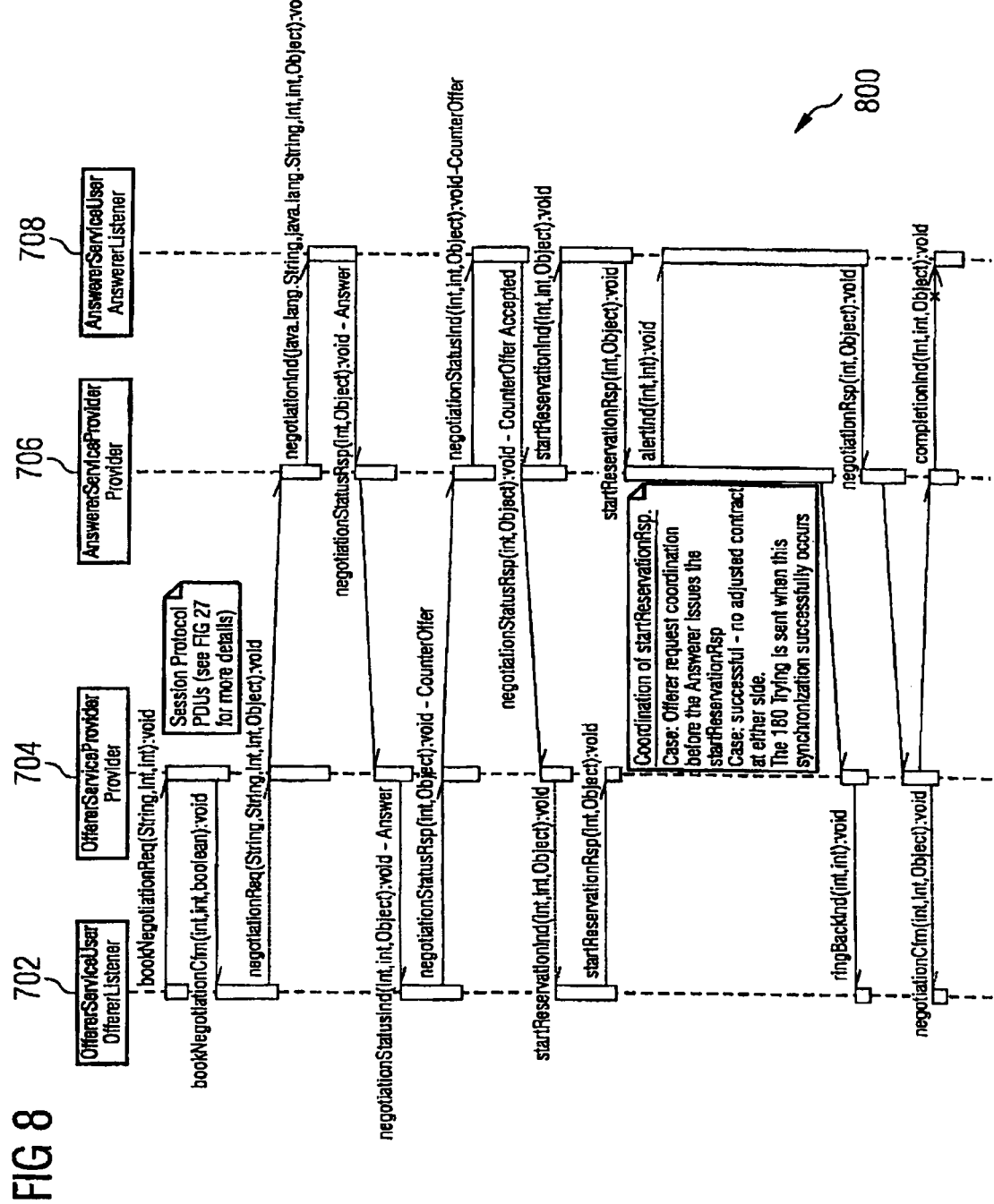

FIG. 8 depicts the MSC for a simple session establishment scenario, wherein QoS negotiation and resource reservation coordination processes are highlighted. In the presented scenario, for the sake of simplicity, the confirmation of resource reservation completion from the Offerer side arrives before the same happens at the Answerer side. Likewise, this simple scenario assumes for the sake of simplicity that the resource reservation process succeeds in reserving exactly the amount of resource, which has originally been requested.

The re-negotiation procedure is similar to the negotiation procedure, except that the names of the primitives have been changed as follows:

| Old Name | New name |
|---|---|
| bookNegotiation<type> | bookReNegotiation<type> |
| negotiation<type> | reNegotiation<type> |
| negotiationStatus<type> | reNegotiationStatus<type> |

The Cache 104 is a database for saving different object identifiers. In order to decouple the Service User identification scheme from the one specified for the E2ENP [ReqSpec], an E2ENP Cache 104 is used for:

- saving and retrieving E2ENP session identifiers specified in [ReqSpec],
- saving and retrieving the E2ENP session identifiers handled by E2ENP UA FSM 106 (serviceproviderIds), and
- saving and retrieving E2ENP UA API Service Users' session identifiers (serviceUserIds).

The Cache 104 should be searchable for different identifiers and following different criteria set by the E2ENP UA 128. The E2ENP UA 128 is responsible for the Cache management.

The cached objects correspond to the identifier object category. The Cache 104 maintains two types of data:

Pre-cached data: The E2ENP UA pre-caches information (indexed by serviceProviderId as primary key, and serviceUserId and E2ENP session identifiers specified in [ReqSpec] as secondary keys) during the execution of a given E2ENP pre-negotiation or negotiation procedure. Once the given procedure has been successfully completed, the precached data remains cached, so that E2ENP UA API 101*b* Service Users have reference to such data during a later E2ENP session as described in [ReqSpec].

Cached data: This information can be used later, during a new E2ENP pre-negotiation or negotiation procedure, as a reference to data, which has already been (pre-) negotiated among the peers. For each of said E2EPN sessions, the Cache 104 stores the association between the given ServiceUserId and the corresponding E2ENP session identifier described in [ReqSpec]. Each entry in this Cache 104 is leased between peers and should be refreshed over time as described in [ReqSpec]. The Service Users 130 themselves are responsible for managing their own leases and (pre-) negotiated information. The Cache 104 simply stores non-persistently the correlations among previous E2ENP sessions.

The E2ENP Cache 104 is a database used for managing the negotiation object IDs. The E2ENP UA FSM 106 requests the Cache 104 services. In an embodiment of this invention, the Cache 104 is designed as a set of java.util.Hashtable objects referencing each other. An alternative implementation based upon tupel-space technology is left for further study.

In order to keep the E2ENP UA 128 implementation simple, the Cache API 103 between the Cache 104 and the E2ENP UA FSM 106 represents a synchronous interface.

In the implemented version of the underlying invention, a two-stage Cache 104 is used:

Level One (L1) of said Cache 104 saves pre-cached information in form of the following tupel (serviceProviderId, serviceUserId, FromSIPAddress, ToSIPAddress, E2ENPSessionID), where the FromSIPAddress and ToSIPAddress allow detecting dual seizures; the primary key is the serviceProviderId.

Level Two (L2) of said Cache 104 saves pre-cached information in form of the following tupel (serviceUserId, E2ENPSessionID), where the primary key is the serviceProviderId.

Figure 9:
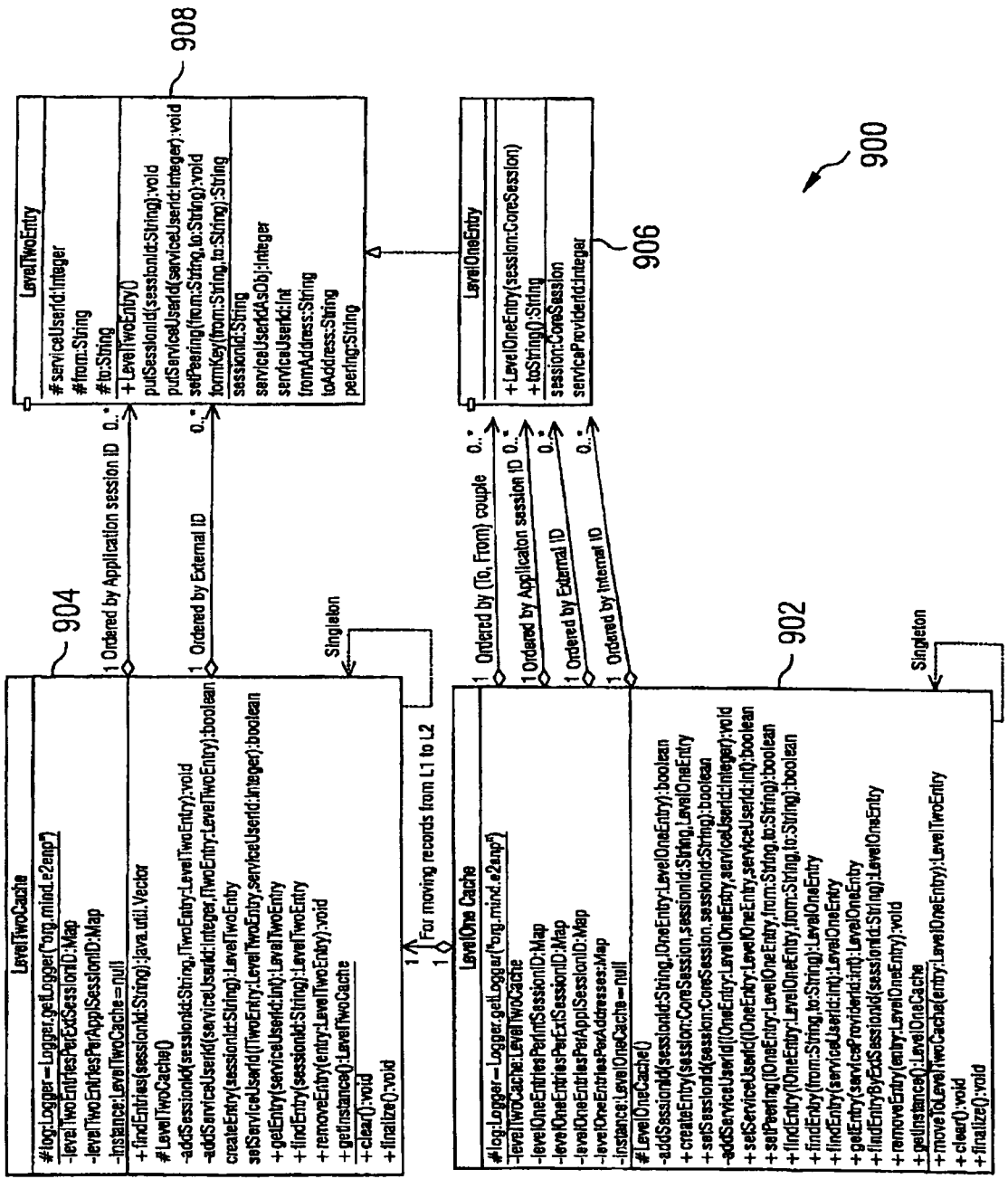

The two levels of the Cache 104 are implemented as two distinct singleton objects as described in [Gam], which are initiated and managed by the E2ENP UA 128. The Cache objects run within the instance of the E2ENP UA 128. FIG. 9 depicts a UML Class Diagram of the org::mind::e2enp:: Cache sub-package that contains the Cache implementation.

The singletons LevelOneCache 902 and LevelTwoCache 904 respectively represent the Cache level L1 and the Cache level L2 and provide APIs for creating, searching, and releasing Cache entries (LevelOneEntry 906 and LevelTwoEntry 908, respectively).

The methods provided by the API of the first and second Cache level (L1 and L2) are depicted in FIG. 42 and FIG. 43, respectively.

In the following subsection, an XML-based serialized transport representation shall be defined by means of an XML schema definition. Rather than defining such a format from scratch, the transport representation is based upon and using the baseline SDPng format definition. Aside from providing compatibility, it is also possible to use and benefit from a third-party library and profile definitions designed for SDPng as described in [Kut2]. Examples include but are not limited to the Real-Time Protocol (RTP) as well as audio and video codec profiles.

In order to illustrate how the Factory API 101*e* and the Parser API 101*d* share common transport representation syntax, the following subsection provides one possible definition for such a format. The XML description of E2ENP extends and uses the baseline SDPng XML description format.

The XML representation for E2ENP (in the following, E2ENP will be used synonymously for this representation) has chosen to be an extension to the SDPng baseline XML definition. The main reason for this decision is that SDPng is expected to be standardized by the IETF, which results in some major benefits:

E2ENP as an extension to SDPng will be able to benefit from external contributions to SDPng-like profile and library definitions. There are already examples pointed out in the SDPng draft [Kut2], namely the audio and RTP profile. These extensions are already incorporated into the specification of the E2ENP XML.

Applications 130 that implement the future SDPng standard can more easily be enhanced to also support E2ENP, ideally by simply linking the E2ENP module to the application 130. Likewise, in heterogeneous environments, applications 130 which do not support E2ENP are still able to work with the SDPng-specific parts and do not break interoperability completely.

The E2ENP XML representation is formally specified by an XML Schema definition as defined by the W3C. The schema definition can roughly be separated into three parts, one containing type definitions such as enumerations for attribute values or the definition of common content models as complex types. The main part defines the top-level E2ENP sections (i.e. elements), which are also plugged into SDPng using the substitution group mechanism. Finally, the third part defines E2ENP-specific elements with no relation to SDPng, which are used to completely define the content model of the top-level elements.

Figure 10:
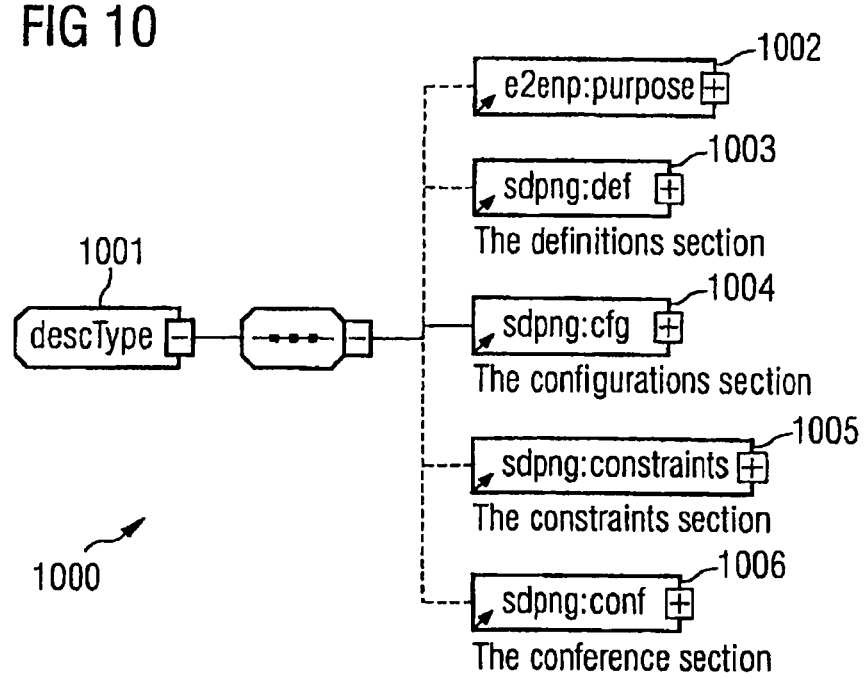
FIG. 10 presents a diagram showing the top-level view of an Extensible Markup Language (XML) description used for the End-to-End Negotiation Protocol (E2ENP)

As can be seen in FIG. 10, descType 1001—originally defined in SDPng—is redefined in such a way that the E2ENP-specific header section "purpose" 1002 appears as a legal child of the "desc root" element. E2ENP defines a "qos-def" section which can be used as a substitute for the "sdpng: d" element, the only valid child for the "sdpng:def" 1003 section, similarly, "qoscfg" may be used instead of "sdpng:c", in turn the only valid child for the "sdpng:cfg" 1004 section. The E2ENP-specific element types will be described in the following.

Figure 11:
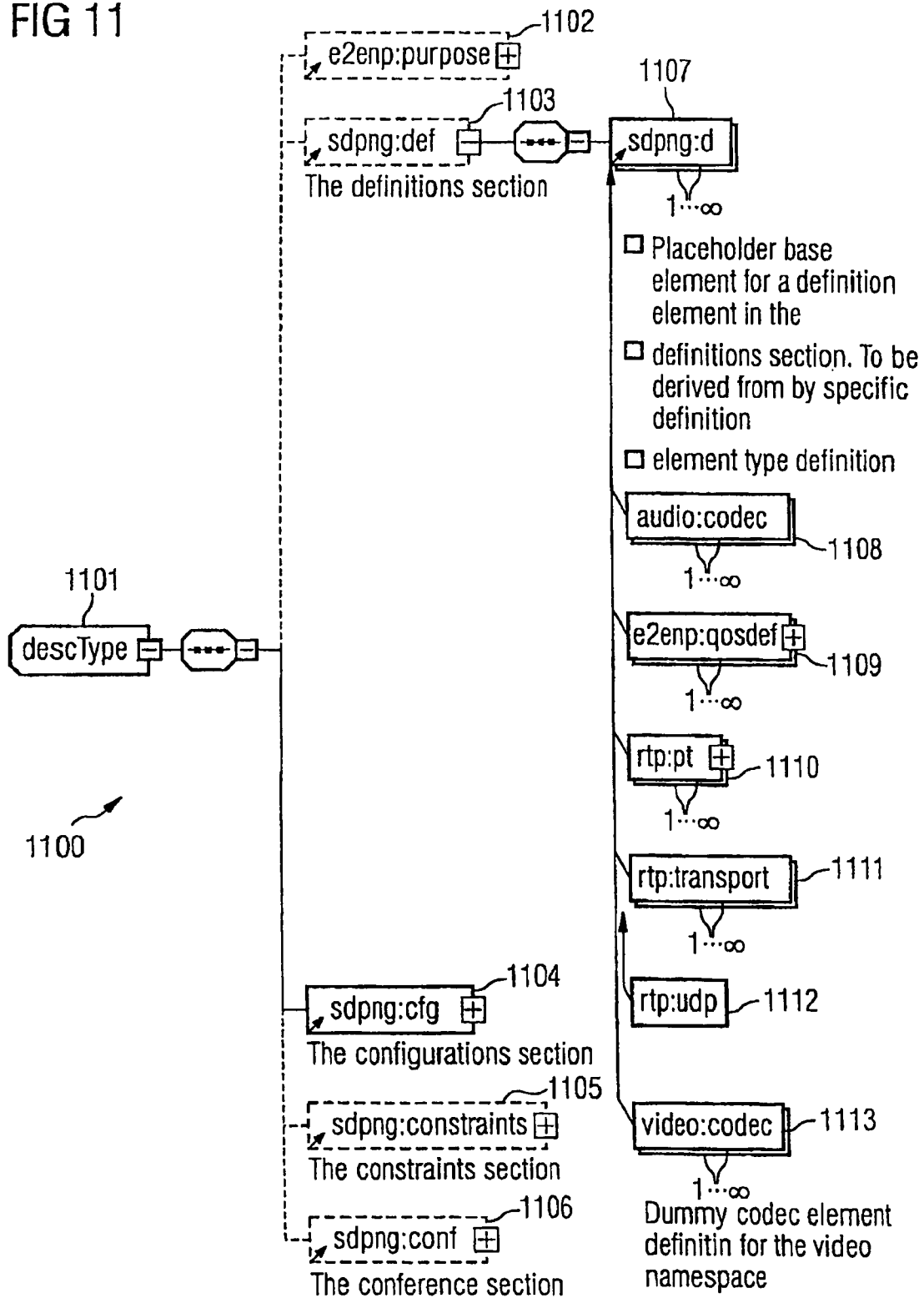
FIG. 11 presents a diagram showing the XML substitution groups used for the End-to-End Negotiation Protocol (E2ENP)

The extensions and plug-ins to SDPng are illustrated in FIG. 11, which shows how elements in substitution groups can be used to replace the head element of this group.

Here, "sdpng:d" 1107 is the head element which may be substituted by any of the members of the substitution group, that is, "audio:codec" 1108, "e2enp:qosdef" 1109, "rtp:pt" 1110, "rtp:transport" 01111 (which in turn again is the head element of a nested substitution group) and "video:codec" 1113. Thus, by using the substitution group mechanism combined with the XML namespaces concept, it is possible to define modular extensions to any XML schema definition. Additionally, the substitution group member "rtp:udp" 1112 can further be enhanced in order to support the option subgroup described in [Bost], thereby incorporating an option similar to that suggested by [Bost] (not shown in FIG. 11).

The aforementioned "qoscfg" element 1400 is defined in the substitution group headed by "sdpng:c", which in turn is a valid child of the "sdpng:cfg" section.

Figure 12:
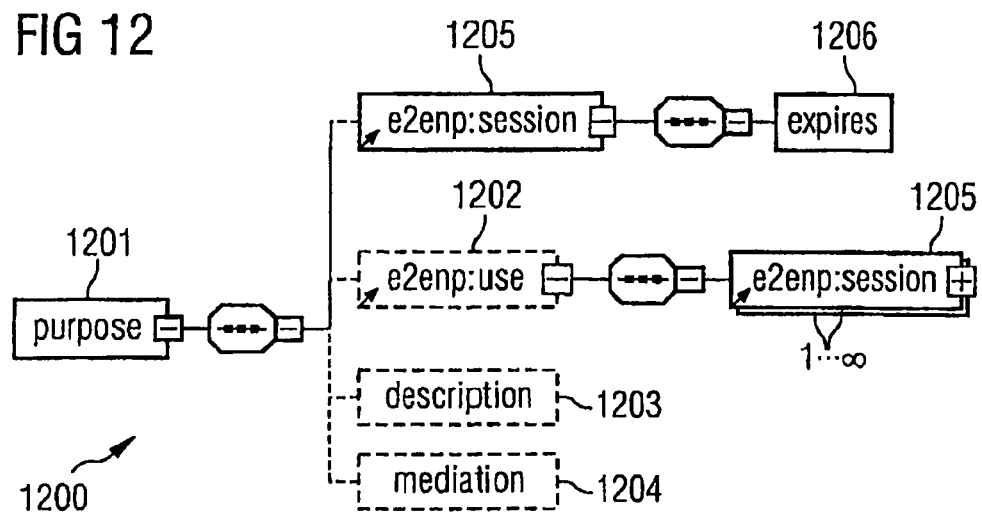
FIG. 12 presents a diagram showing the XML purpose element used for the End-to-End Negotiation Protocol (E2ENP)

Using the "purpose" 1201 element depicted in FIG. 12, it is possible to convey additional information about the negotiation process in the external description. The general structure of how the purpose element is defined is shown in FIG. 12.

Thereby, the header defines to which session the current message belongs to. It can also establish references to previous sessions by means of the "use" 1202 element, making it possible to reference definitions from these sessions.

Depending on what the E2ENP message is intended for, either the "description" 1203 or the "mediation" 1204 element should be present. For example, with the aid of the "description" 1203 element it is possible to state the kind of a message, i.e. Request (Req) or Response (Rsp) and what negotiation mode should be used (push, pull, push-pull).

Figure 13:
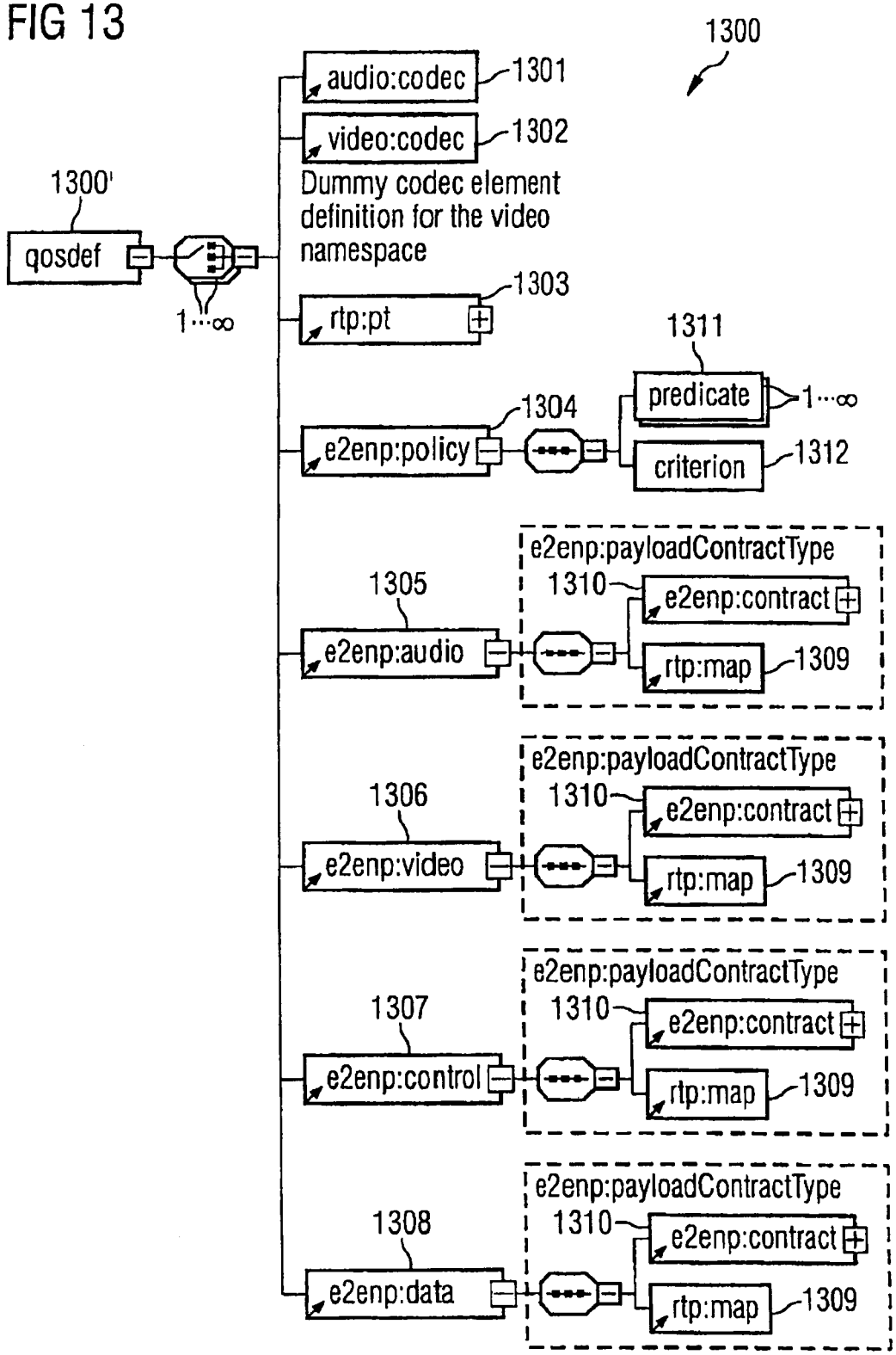
FIG. 13 presents a diagram showing the XML qosdef element used for the End-to-End Negotiation Protocol (E2ENP)

FIG. 13 illustrates the general structure of the "qosdef" element 1300. However, there is a constraint on the usage of the legal child elements, depending on the value of the "name" attribute of the qosdef element 1300. There are two possible values, "capabilities" and "contracts". Depending on that, the "qosdef" section 1300 either specifies capabilities of a peer or, in the case of contracts, defines validated contracts that have been validated by entities using the E2ENP UA 128.

Specifying Capabilities: In case the "name" attribute's value of the "qosdef" element 1300 is "capabilities", the valid child elements are "audio:codec" 1301, "video: codec" 1302, and "rtp:pt" 1303. The respective codec elements represent system capabilities of the peer in terms of audio and video codecs and their configuration. By using the "rtp:pt" 1303 element, it is possible to specify a desired RTP payload format for the given capabilities.

Specifying Contracts: In this case, the attribute value of the "name" element of the qosdef element 1300 has to be "contracts". Then, the valid child elements are "policy" 1304, "audio" 1305, and "video" 1306. The "policy" element has to appear exactly once. It specifies the usage for negotiating the resource management policies to enforce. It is possible to use a policy to optimize one or several aspects of system behavior, such as optimization of memory usage, CPU load, network traffic or power consumption. In order to achieve more flexibility, these atomic aspects can be combined by using predicates. The elements following the "policy" 1304 element can be one or many "audio" 1305, "video" 1306, "data" 1308, and "control" 1307 elements. These elements describe the QoS Contracts for the respective datastreams. By using the "rtp:map" 1309 element it is possible to define a mapping between an application level QoS Contract and a specific RTP payload format.

Figure 14:
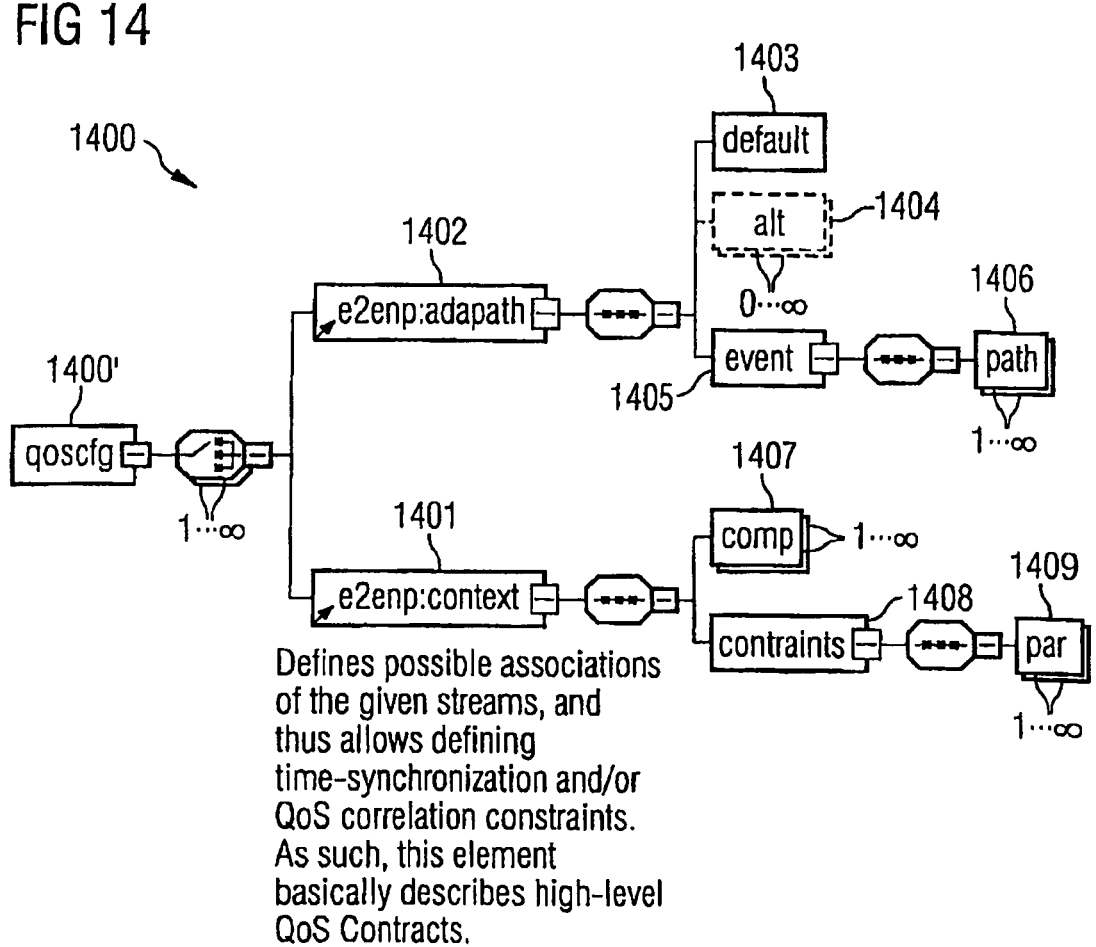
FIG. 14 presents a diagram showing the XML qoscfg element used for the End-to-End Negotiation Protocol (E2ENP), FIG. 15 exhibits a UML message sequence chart (MSC) showing the interaction between the E2ENP User Agent (E2ENP UA) according to the underlying invention and the applied Parser and Cache, FIG. 16 exhibits a UML class diagram showing the general structure of a Document Object Model (DOM) tree, FIG. 17 exhibits a UML class diagram showing a structural overview of the Parser implementation using a visitor design pattern.

FIG. 14 illustrates the general structure of the "qoscfg" element 1400. This section allows defining adaptation paths (AP) as well as QoS correlation and time synchronization constraints at various levels of abstraction, starting from stream-level QoS Contracts. Each level of abstraction is identified by the attribute "name" of this section. Possible values include "stream", "stream-group", "session", and "application". Thus, the definition of adaptation paths is possible at different levels, including stream-level adaptation paths as well as higher-level APs. The "context" 1401 elements define possible associations of the given streams, thus allowing to define time-synchronization-and/or QoS correlation constraints. As such, the "context" 1401 elements basically describe high-level QoS Contracts.

In the following subsection, a brief overview of the Parser API 101*d* shall be given.

The Parser API 101*d* provides primitives, which can be used to parse a description in some transport representation and generate an object representation according to IF2. In order to be able to loosely couple the E2ENP UA 128 and the Parser 112, this object representation is abstracted in such a way that it is expressed as a java.lang.Object. As already pointed out, the only requirement for the transport representation is that it implements the java.io.Serializable interface. This can be interpreted in the sense that the transport representation is un-typed, thereby providing much flexibility regarding what this representation can actually look like.

The transport representation may contain references to external, previously defined entities. These references are left untouched and unresolved by the Parser 112. This issue is handled later in the E2ENP UA 128 or higher layer entities.

Figure 15:
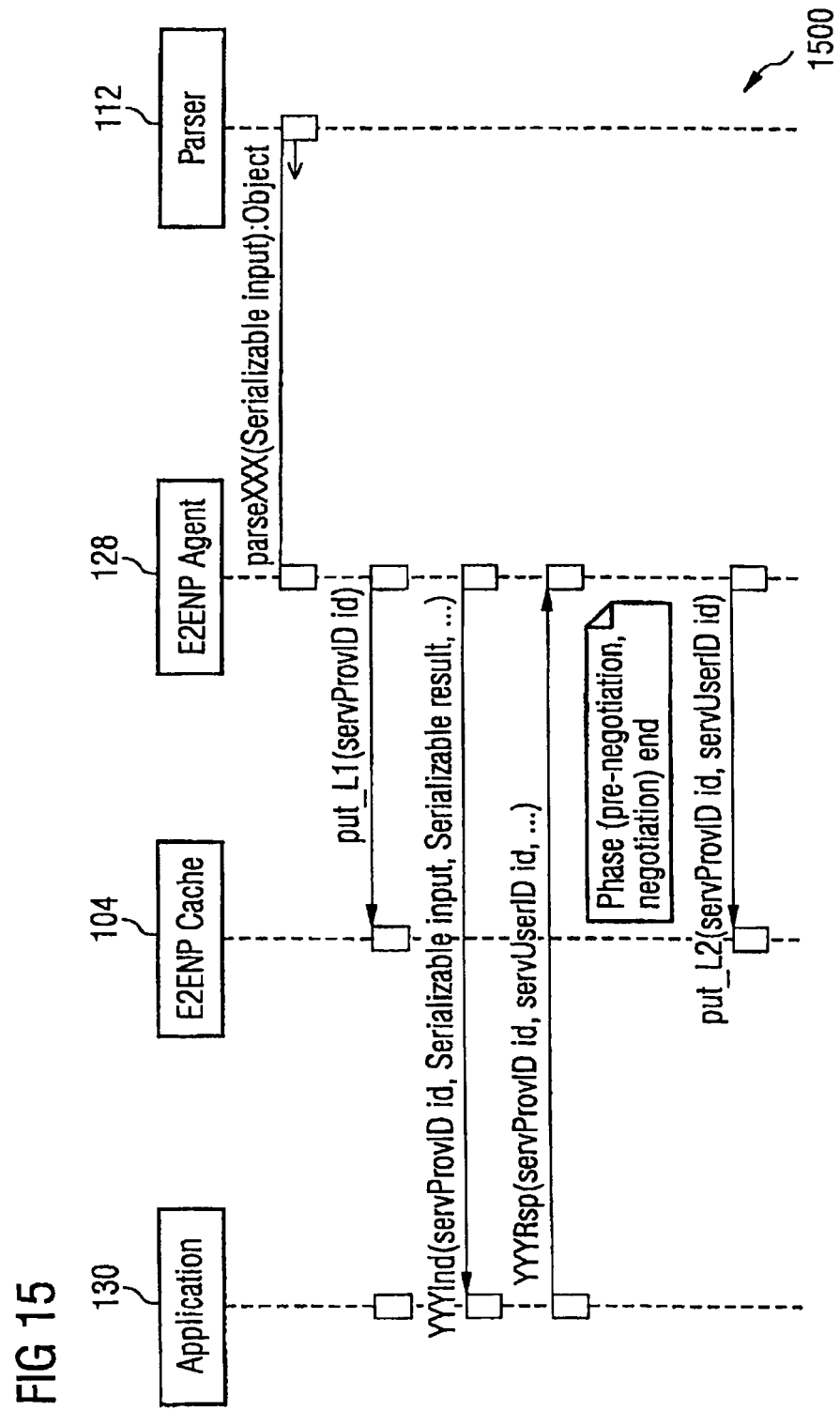

The Parser API 101*d* provides one primitive for each message type to be passed. Like this, the message types are represented implicitly and do not need to be considered in the object model. For each message type, the Parser 112 offers one primitive to parse the offer and the answer of the respective message type. Therefore, the general pattern depicted in FIG. 15 for the Parser API 101*d* primitives is Object parseXXX(Serializable input).

Thereby, "XXX" denotes a placeholder for the names of primitives like Negoffer or PreNegAnswer, etc. (see the API definition below for more details)

In addition to these general parsing methods, the Parser API 101*d* provides some specialized primitives intended to navigate through the content wrapped in the serialized representation. These primitives can be used by clients to access specific information or data on an abstract level, independent from the actual representation. Thus, if the representation changes due to future protocol enhancements, the clients which use older versions of the representation are not affected by the new changes since the information access methods do not change.

As the actual carrier protocol should be exchangeable, there is a need for providing functionality to exchange the actual Parser 112 implementation as well. As described above, this mechanism has to be the same for the Parser 112 implementation and for the carrier protocol.

Therefore, a ParserFactory API is defined which provides primitives to create an actual Parser 112 implementation instance (factory 118 depicted in FIG. 1 shows an implementation of such a ParserFactory). Additionally, it is possible to register new actual Parser 112 implementations for any given carrier protocol.

The communication between the E2ENP UA 110 and the Parser 112 could be asynchronous, e.g. implemented by an active request interface and a passive confirmation interface. However, this option is not appropriate for the underlying design, because some gain in performance and flexibility is opposed by much more complicated state models for the FSMs 106 of the E2ENP. One consequence of this decision is that the E2ENP UA 128 and the Parser 112 (and also the Factory 114) communicate synchronously and thus have to share a common address space, which in most circumstances is a reasonable assumption.

Another consequence of this decision is that the Parser 112 (and also the Factory 114) have to be designed as threadsafe, re-entrant libraries.

The object representation, generated during the parsing and passed as a result back to the calling E2ENP VA 128, is described very abstractly by just using the java.lang.Object class, in order to provide loose coupling of the Parser 112 and the E2ENP VA 128. The actual classes implementing the Parser 112 for a given transport representation and a given object model, used in the E2ENP VA 128, have to be fitted together by configuration.

The actual Parser and Factory implementations 112 and 114, respectively, have to agree on a common format for the transport representation. The definition of these formats is implementation-specific and corresponds to the actual Parser 112 and Factory 114 components, even though the usage of existing standards is encouraged and envisioned. Therefore, a format has been defined, which is compatible to the baseline SDPng definition.

The registration functionality offered by the ParserFactory API can be handled in different ways. However, this is up to the actual ParserFactory 112 implementation. Some options what can be done with registration are:

Registrations may be stored permanently to survive multiple application life cycles.

Registrations may be made public for the use of other applications 130, which also implies permanent storage.

Registrations may only be stored in a transient way for the current application life cycle.

Applications 130 may check if they have instantiated a matching pair of Parser 112 and Factory 114 by calling the respective getType( ) methods of these instances and comparing the returned values for equality. The usage of a non-matching pair of Parser 112 and Factory 114 by an application 130 may result in unpredictable results and undefined or even erroneous behavior.

In the following, the dependencies shall briefly be summarized.

IF2 Object Model: This is only an implicit dependency that actual implementations of the Parser 112 have to fulfill. In general, this dependency is removed by the fact that the Parser 112 simply creates java.lang.Object instances. In a specifically configured system however, which will actually be created, instances of the specific object model classes are used in the E2ENP UA 128.

Transport Representation: Similar to the dependency above, an actual Parser 112 of course needs a well-defined structure of what it has to create. Thus, it depends on the respective definition of the transport representation. But in general, by abstractly describing the transport representation using java.io.Serializable, this dependency is removed from the design.

The primitives to be implemented by the Parser API 101*d* can be taken from FIGS. 44A and 44B. By contrast, the primitives to be implemented for generating a specific Parser 112 are listed in FIG. 45.

The ParserFactory API is realized by the class E2ENPContentHandlerFactory in the package org.mind.e2enp.content, also referred to as parser-factory implementation. It is designed as a singleton instance, so that all its clients can use registrations made earlier. Currently, the singleton instance created is a default implementation, but for future releases it is planned to provide a configurable approach (based on specific system properties) to determine the class to be used for the singleton instance. Methods provided by the E2ENPContentHandlerFactory class are depicted in FIG. 48.

Figure 16:
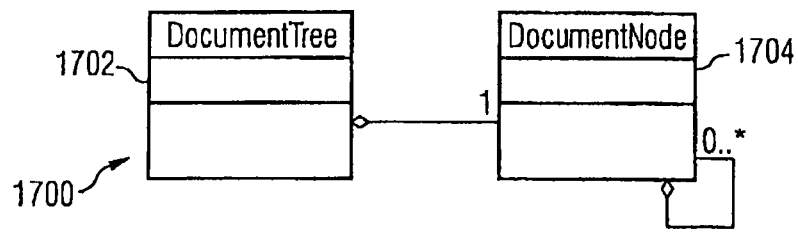

In the following subsection, the implementation of the Parser 112 needed for an XML-based transport representation shall briefly be described. Thereby, a possible Parser 112 implementation for the XML-based transport representation is proposed. FIG. 16 describes the general structure of a Document Object Model (DOM) tree, modeled as a class DocumentTree 1702, which aggregates one DocumentNode 1704 and can be interpreted as the document root element. Each DocumentNode 1704 in turn aggregates between 0 and N children, thus recursively describing the tree structure.

Figure 17:
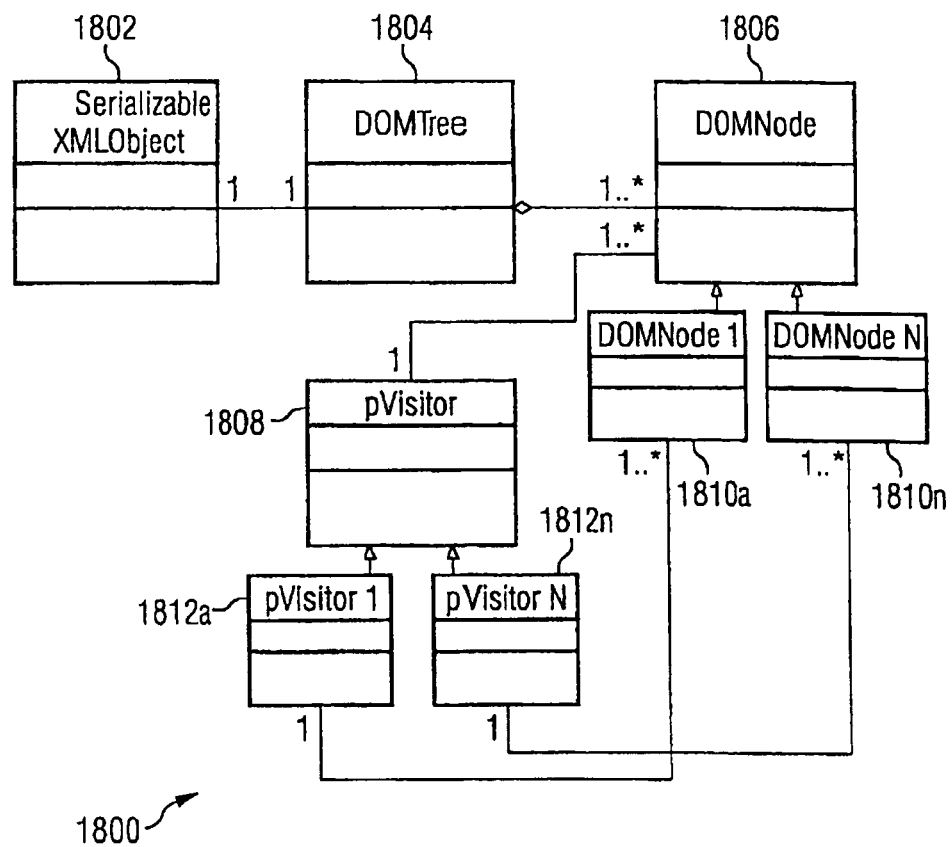

The Parser 112 for this representation can be implemented by using the "visitor design pattern" as described in [Gam]. The structural overview is given in FIG. 17. Thereby, a generic Parser 112 visitor class pVisitor 1808 is defined to use, or to be precise visit, 1 to N DOMNodes 1806. In order to handle derived DOMNodes for each specially derived DOMNode subclass, a specialized visitor is defined. (Even if the "visitor pattern" is intended for handling only subclasses, this concept can easily be extended in such a way that different element nodes are interpreted as categories of their own.)

In the following, the Application Programming Interface (API) applied to the Factory 114 shall briefly be described. The Factory API 101*e* provides primitives which can be used to create a transport representation for a given object representation according to IF2. The loose coupling of the E2ENP UA 128 and the Factory 114 is realized via the abstraction of the object representation (passing through the Factory interface 101*e*) as a java.lang.Object. As already pointed out, the only requirement for the transport representation is that it implements the java.io.Serializable interface. Therefore, the primitives defined by this API all return "java.io.Serializable" objects.

The object description may contain references to external, previously defined entities. These references are not handled or dereferenced by the Factory methods, they are just used.

Figure 18:
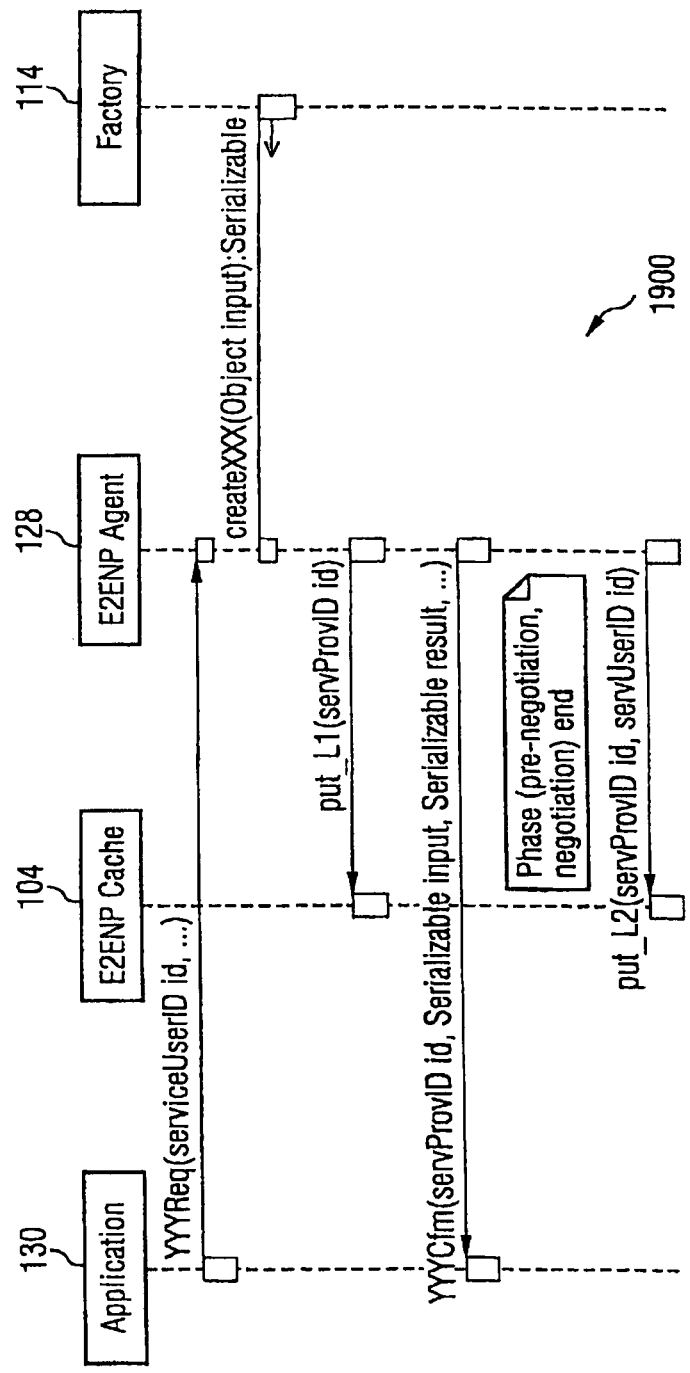
FIG. 18 presents a UML message sequence chart (MSC) showing the interaction between the E2ENP User Agent (E2ENP UA) according to the underlying invention and the applied Factory and Cache.

Like the Parser 112, the Factory API 101*e* provides one primitive for each message type to be passed. Like this, the message types are represented implicitly and do not need to be considered in the object model. The general pattern for the Factory API primitives as depicted in FIG. 18 is:

Serializable createXXX(Object input)

Thereby, "XXX" denotes a placeholder for the names of primitives like NegOffer or PreNegAnswer, etc. (see the API definition below for more details).

Since the actual carrier protocol should be exchangeable, there is a need to provide a functionality to make the actual Factory 114 implementation exchangeable as well. As described above, this mechanism has to be the same for the Factory 114 implementation and for the carrier protocol. Therefore, a FactoryFactory API is defined which provides primitives to create an actual Factory 114 implementation instance. (factory 120 in FIG. 1 shows an implementation of such a FactoryFactory.) Additionally, it is possible to register new actual Factory 114 implementations for any given carrier protocol in order to illustrate how the Factory API 101*e* and the Parser API 101*d* share a common transport representation syntax.

Communication between the E2ENP UA 128 and the Factory 114 could be asynchronous, e.g. implemented by an active request interface and a passive confirmation interface. This option is not used in the scope of the underlying invention because some gain in performance and flexibility is opposed by much more complicated state models for the FSMs 106 of the E2ENP. One consequence of this decision is that the E2ENP UA 128 and the Factory 114 (also the Parser 112) communicate synchronously and thus have to share a common address space, which in most circumstances is a reasonable assumption.

Another consequence of this decision is that the Factory 114 (and also the Parser 112) have to be designed as thread-safe, re-entrant libraries.

In order to provide loose coupling of the Factory 114 and the E2ENP UA 128, the transport representation, generated by the Factory 114 and passed back to the calling E2ENP UA 128 as a result, is abstractly described by using the java.io.Serializable class. Similarly, the java.lang.Object class abstractly describes the inputs of the Factory 114 primitives. Thus, the actual classes implementing a Factory 114 for a given transport representation and a given object model used in the E2ENP UA 128 have to be fitted together by configuration.

The actual Parser 112 and Factory 114 implementations have to agree on a common format for the transport representation. The definition of these formats is implementation-specific and corresponds to the actual Parser 112 and Factory 114 components, even though the usage of existing standards is encouraged and envisioned. Therefore, a format is proposed which is compatible to the baseline SDPng definition.

The registration functionality offered by the FactoryFactory 120 can be handled in different ways. Some options for registrations include but are not limited to:
 Registrations may be stored permanently to survive multiple application life cycles.
 Registrations may be made public for the use of other applications 130, which also implies permanent storage.
 Registrations may only be stored in a transient way for the current application life cycle.

Applications 130 may check if they have instantiated a matching pair of Parser 112 and Factory 114 by calling the respective getType( ) methods of these instances and comparing the returned values for equality. The usage of a non-matching pair of Parser 112 and Factory 114 by an application 130 may result in unpredictable results and undefined or even erroneous behavior.

In the following, the dependencies shall briefly be summarized:
 IF2 Object Model: This is only an implicit dependency that actual implementations of the Factory 114 have to fulfill. In general, this dependency is removed by the fact, that the Factory 114 simply expects java.lang.Object instances as input data. In a specifically configured system, however, which actually will be passed in to the creation process, instances of the specific object model classes are used in the E2ENP UA 128.
 Transport Representation: Similar to the dependency above, an actual Factory 114 of course needs a well-defined structure of what it has to create. Thus, it depends on the respective definition of the transport representation. But in general, by abstractly describing the transport representation using java.io.Serializable, this dependency is removed from the design.

The primitives specified by the Factory API 101e can be taken from FIG. 46. Additionally, the primitives to be implemented for generating a specific Factory 114 are listed in FIG. 47.

The FactoryFactory API is realized by the class E2ENPContentHandlerFactory in the package org.mind.e2enp.content, also referred to as factory-factory implementation. It is designed as a singleton instance, so that all its clients can use registrations made earlier. Currently, the singleton instance created is a default implementation, but for future releases it is planned to provide a configurable approach (e.g. based on specific system properties) to determine the class to be used for the singleton instance. Methods provided by the E2ENPContentHandlerFactory class can be taken from FIG. 48.

In the following subsection, a possible Factory 114 implementation for the XML-based transport representation shall be presented.

Figure 19:
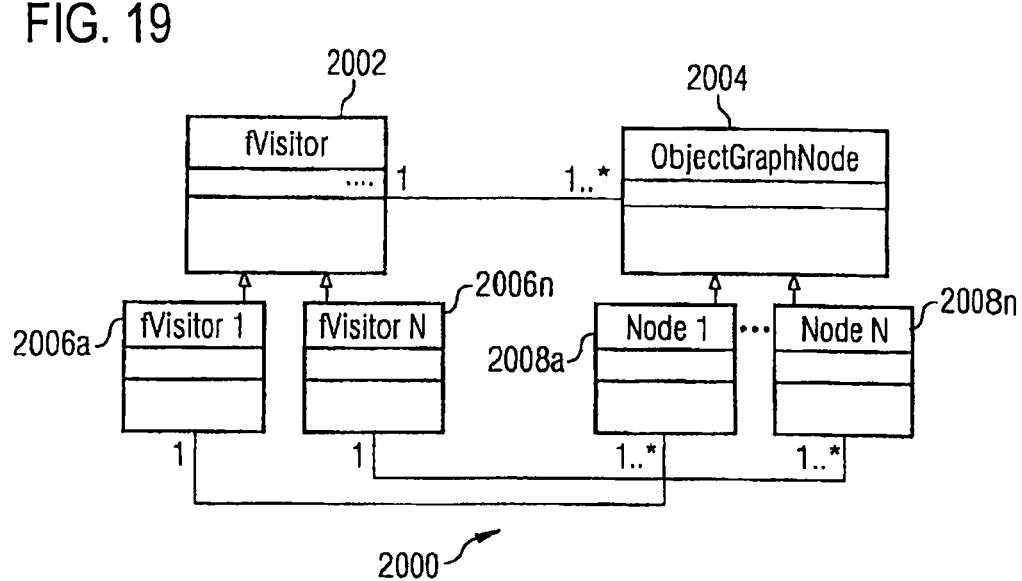
FIG. 19 presents a UML class diagram showing a structural overview of the Factory implementation, FIG. 20 exhibits a UML class diagram showing the org::mind::sip::sipApi package, FIG. 21 exhibits a UML class diagram showing the org::mind::sip::sipApi::userAgent package, FIG. 22 exhibits a UML class diagram showing the org::mind::sip::sipApi::registrar package, FIG. 23 exhibits a UML class diagram showing the org::mind::sip::sipApi::management package, FIG. 24 exhibits a UML class diagram showing the org::mind::sip::sipApi::time package, FIG. 25 exhibits a UML message sequence chart (MSC) showing the configuration of the Service Provider and the binding of the Service User with said Service Provider, FIGS. 26A and 26B exhibit a UML message sequence chart (MSC) showing the connection establishment between the User Agents of a client and a server, FIG. 27 exhibits a UML message sequence chart (MSC) showing the OPTIONS method used for the End-to-End Negotiation Protocol (E2ENP), FIG. 28 exhibits a UML message sequence chart (MSC) showing the connection release between the User Agents of a client and a server.

Like the Parser 112, the Factory 114 implementation uses the "visitor design pattern" described in [Gam]. The structure is illustrated by FIG. 19.

Again, a generic Factory 114 visitor class fVisitor 2002 is defined which visits 1 to N instances of ObjectGraphNode 2004 classes. For each concrete subclass of ObjectGraphNode, a corresponding concrete visitor class is defined.

In the following subsection, a brief overview of the SIP User Agent Generic API 101c (IF3) shall be given.

Since the SIP User Agent Generic API 101c exposes the functionality of a generic SIP UA 110 to the E2ENP UA 128, the main object of this API is to mask the actual implementation of the SIP UA 110 from the E2ENP UA FSM 106. The SIP User Agent Generic API 101c realizes the specification of such generic API by defining a set of interfaces and complex data types exchanged through said API. Specific SIP UA 110 implementations will be able to expose their native (eventually standard) APIs by means of specific Adapters, which shall map the SIP API native interfaces into the SIP UA Generic API 101c, and vice versa.

The SIP UA Generic API 101c allows multiple users to simultaneously access a given SIP UA 110 implementation (via multimedia applications 130 or middleware 130) for simultaneously establishing multiple SIP sessions.

The SIP UA Generic API 101c also supports SIP Registrar implementations with the SIP signaling required by these entities. To this extent, it should be noted that the SIP UA Generic API 101c is not designed to allow the simultaneous support of users' applications 130 and SIP Registrars on the same memory address space. With this design choice, SIP Registrar implementations are thus forced to run as standalone server side entities, distinct from pure application 130 or middleware 130 entities (in the present context, the E2ENP UA FSM 106). Applications 130 and/or middleware 130 (in the present context, the E2ENP UA FSM 106), and SIP Registrar implementations are examples of Service Users. A SIP UA 110 implementation exposing the SIP UA Generic API 101c represents the Service Provider.

The SIP UA Generic API 101c has originally been designed to expose an API from a specific open source SIP UA 110 implementation, the Mitre's JSIP v.0.8 library (http://jsip.sourceforge.net/), wherein API support is quite poor. The SIP UA Generic API 101c has been designed based on the following design principles:
 1. The definition of a set of primitives identifying various SIP procedures abstracted at a relatively highlevel, thereby simplifying the E2ENP UA FSM 106 design. Of course, the granularity of the procedures exposed by the current version of the SIP UA Generic API 101c reflects to a certain extent the capability of the JSIP implementation. Other SIP UA 110 implementations might offer more or less capabilities, which would require respectively more or less logic embedded in the corresponding aforementioned Adapters.
 2. The current version of the SIP UA Generic API 101c focuses only on the minimal set of features required for prototyping and testing the E2ENP UA 128. Therefore, the current version of SIP UA Generic API 101c is on purpose neither a complete SIP API specification nor meant to be standardized whatsoever.

3. Primitives are classified into Request (Req), Indication (Ind), Response (Rsp), and Confirmation (Cfm) primitives according to the ISO/OSI model. Request (Req) and Response (Rsp) primitives are invoked by the client Service User of the IF3 101c, or by a SIP Registrar implementation in order to respectively initiate or respond to a particular message exchange. (In some cases the message exchange may involve a set of different messages being exchanged between peers, thanks to the abstraction offered by the given SIP UA 110 implementation, whereas in other cases the message exchange is limited to the given message and its acknowledgment.) Indication (Ind) and Confirmation (Cfm) primitives are invoked by the Service Provider 110 to the registered client-side of the Service User of the IF3 101c in order to respectively indicate the arrival of a particular message or initiation of a particular message exchange or to confirm the conclusion of a given message exchange. The client-side of the Service User of the IF3 101c has to implement these primitives. To a Request (Req) primitive generated by the peer initiating the given protocol message exchange corresponds an Indication (Ind) primitive at the target peer. To a Response (Rsp) primitive generated by the target peer, responding to the given protocol message exchange, corresponds a Confirmation (Cfm) primitive at the initiating peer.

4. A simplified version of the "observer design pattern" as described in [Gam] (implemented in Java with a derivation of the Java Beans event model) offers the mechanism allowing the Service User to register (via a primitive called "Bind Request") for Indication (Ind) and/or Confirmation (Cfm) primitive callbacks.

5. In order to allow supporting E2ENP piggybacking over SIP, each primitive allows passing a payload, e.g. SDP, SDPng, or Multipurpose Internet Mail Extension (MIME) content.

6. In order to allow dry-run tests of the E2ENP signaling logic without the support of a real SIP UA 110 implementation and of SDP/SDPng Parsers 112 and/or Factories 114, the primitives are designed to handle the payloads as generic objects (instead of plain objects representing ASCII strings) that can be marshalled or demarshalled when using Remote Procedure Call (RPC) mechanisms, like Java serialization or deserialization in combination with Java RMI.

7. Since Mitre's JSIP Version 0.8 implementation used for designing this SIP UA Generic API 101c lacks proper support of the SIP Expires header field, which is typically manipulated by Service Users, an abstraction of this SIP header field has been created for handling any type of implementation of this field. This would be not necessary with other better SIP UA 110 implementations, where the designer would have the choice to either change the SIP UA Generic API 101c (and therefore the E2ENP UA FSM 106 implementation) accordingly or provide an Adapter 126c mapping the Expires header field support of the given Service Provider (without changing the E2ENP UA FSM 106 implementation).

Further design choices are:

The E2ENP negotiation model described in [ReqSpec] is a key aspect of the E2ENP and a piece of information intended for being embedded into SDPng payload and exchanged among peers on an end-to-end basis. For the sake of rapidly prototyping the E2ENP UA 128, a helper class named SipNegotiationModel 2216, representing the E2ENP negotiation model information, has provisionally been included into the SIP UA Generic API 101c.

Instead of uniquely identifying active sessions at application level by using the alphanumeric SIP Call Identifier header field, the SIP UA Generic API 101c uses a numerical integer identifier, named connectionId. This choice was dictated by the following reasons:

Service users can more easily handle lists with numerical identifiers rather than with alphanumerical ones.

Should the E2ENP UA 128 use other protocols instead of SIP in future, having generic primitives and generic session identifiers would help partly reusing the existing E2ENP UA FSM 106 design.

The SIP UA 110 associates an unused value of the connectionId to the SIP Call Identifier header field of an incoming INVITE, OPTIONS, MESSAGE, or REGISTER method. By applying the same design principle, Service Users requesting the transmission of any of those methods would obtain the connectionId value selected by the Service Provider in the Confirmation (Cfm) primitive associated with the original Request (Req) primitive.

Unfortunately, this solution is affected by to two problems:

1. Without yet knowing the connectionId value associated with a given Request (Req) primitive, Service Users can not correlate a Confirmation (Cfm) primitive with its corresponding Request (Req) primitive.

2. Before the arrival of a Confirmation (Cfm) primitive, intermediate messages (eventually indicating failure situations) might generate additional primitives (e.g. a Connection Status Indication), which would lead to the same correlation problem described in the previous point.

To solve these problems, the Service User must be in charge of selecting an unused connectionId value and force the SIP UA 110 associating such value with a proper SIP Call Identifier header field value.

The set of connectionId values allocated by the Service Provider in case of incoming INVITE, OPTIONS, MESSAGE, or REGISTER methods and by the Service User in case of outgoing INVITE, OPTIONS, MESSAGE, or REGISTER methods should be distinct, so that the processing of incoming and outgoing INVITE, OPTIONS, MESSAGE, or REGISTER methods can simultaneously take place without interference.

However, for the sake of simplicity, the SIP UA Generic API 101c has been designed with a centralized management of connectionId values allocation, embedded into the Service Provider itself. Service users are yet in charge of allocating connectionId values for outgoing INVITE, OPTIONS, MESSAGE, or REGISTER methods, but the actual allocation is delegated to the Service Provider by invoking the getConnectionId( ) method exposed by Service Provider. This method can in no way be considered a primitive itself, since it directly returns a value (the selected connectionId value): For instance, this would prevent implementing a loosely coupled interface, where primitives are exchanged between Service User and Service Provider via a (not RPC-like) message-based protocol. In any case, Service Users and Service Providers can be designed without the centralized connectionId value allocation management, and yet being compliant with the SIP UA Generic API 101c, by simply not using respectively implementing the getConnectionId( ) method. As a special case, a connectionId can be reused in case of SIP re-INVITEs: in this case, a proper Boolean parameter indicating whether this is a re-INVITE, shall be passed to the connectionReq primitive (see below).

Some primitives of the SIP UA Generic API 101c are SIPspecific:

provisionalAck(Req|Ind|Rsp|Cfm), which is used to implement the PRACK method, register (Req|Ind|Rsp|Cfm), which is used to implement the REGISTER method, options(Reg|Ind|Rsp|Cfm), which is used to implement the OPTIONS method, and message(Req|Ind|Rsp|Cfm), which is used to implement the MESSAGE method.

These primitives will eventually be mapped to more generic ones in a future E2ENP UA 128 design review in order to transform the SIP UA Generic API 101c into a E2ENP Session Level Protocol API, which will be totally independent of the session-layer protocol actually used.

The current version of the SIP UA Generic API 101c design is only partially compliant with the latest working (as of this writing) version of the SIP specification described in [Ros1]. For instance, REFER, DO, NOTIFY, SUBSCRIBE methods and many other features have been omitted since they are not essential for testing the E2ENP concept. The BYE and CANCEL methods are supported by the same Disconnection primitive.

Thereby, said E2ENP UA API 101b depends on the applied E2ENP UA FSM 106, concerning the implementation of the Indication (Ind) and Confirmation (Cfm) primitives and the Management component 102, which is used for configuring, controlling, and resetting the underlying SIP UA 110.

Figure 20:
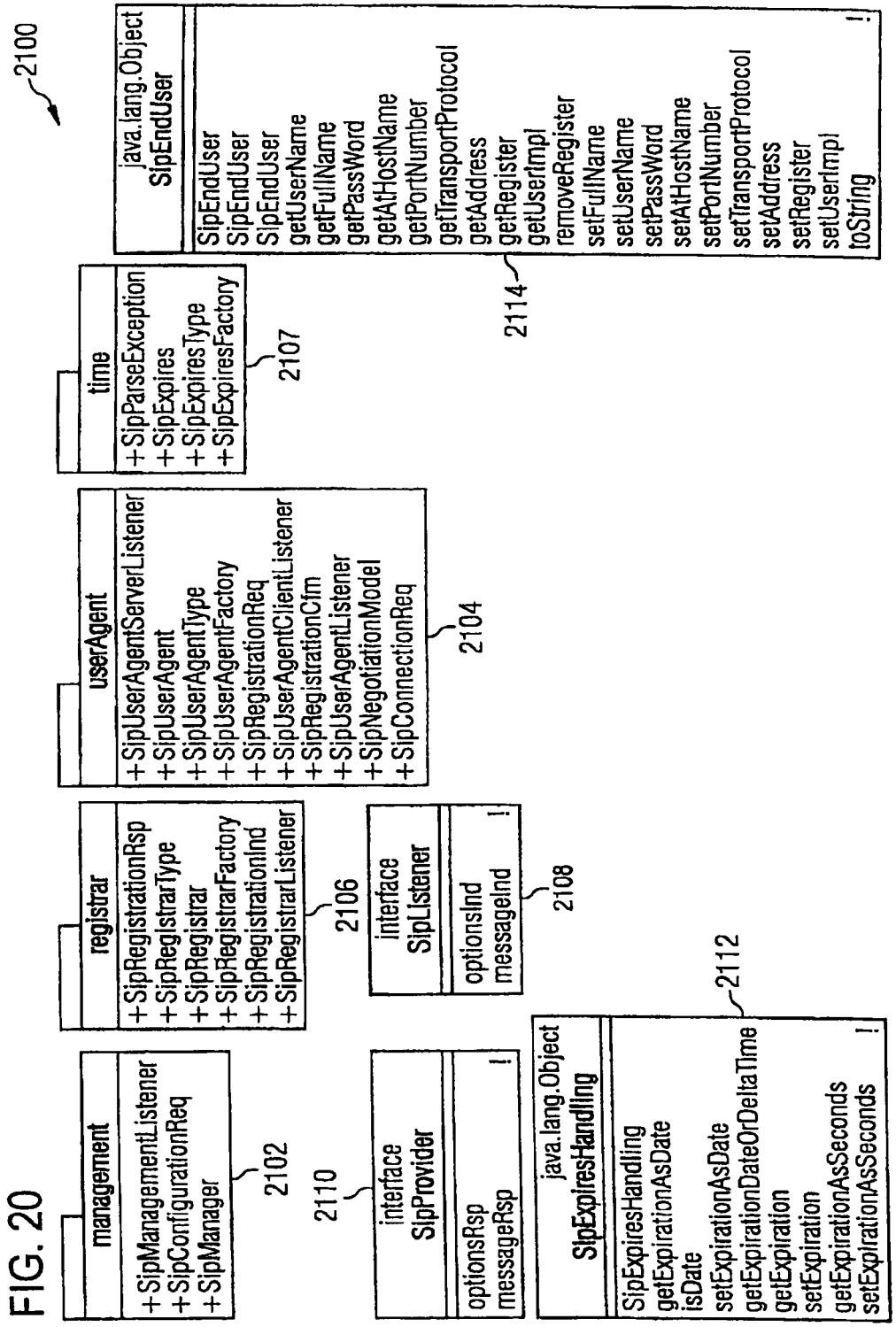

The SIP UA Generic API 101c has been designed using the object-oriented paradigm, and is thus hereby described by using the Unified Modeling Language (UML). It is composed of a basic package, the so-called org::mind::sip::sipApi as depicted in FIG. 20. To this basic package belong the classes SipEndUser 2214 and SipExpiresHandling 2112. The SipEndUser class 2214 represents a user accessing the SIP services offered by the SIP UA Generic API 101c. The SipExpiresHandling class generalizes the functionality for manipulating the SIP Expires header field. The SipListener 2108 generalizes all the interfaces that Service Users shall implement for intercepting Indication (Ind) and/or Confirmation (Cfm) primitives generated by the SIP UA 110. The SipProvider 2110 generalizes all the interfaces that the Service Provider shall support for implementing Request (Req) and Response (Rsp) primitives.

Four sub-packages complete the SIP UA Generic API 101c specification: one, the org::mind::sip::sipApi::time, deals with the SIP Expires header field abstraction, whereas the other three characterize different roles of the Service User:

org::mind::sip::sipApi::userAgent represents the application 130/middleware 130 implementation (in the present context, the E2ENP UA FSM 106);

org::mind::sip::sipApi::management represents the management entity 102;

org::mind::sip::sipApi::registrar represents the SIP Registrar implementation 2306.

Figure 21:
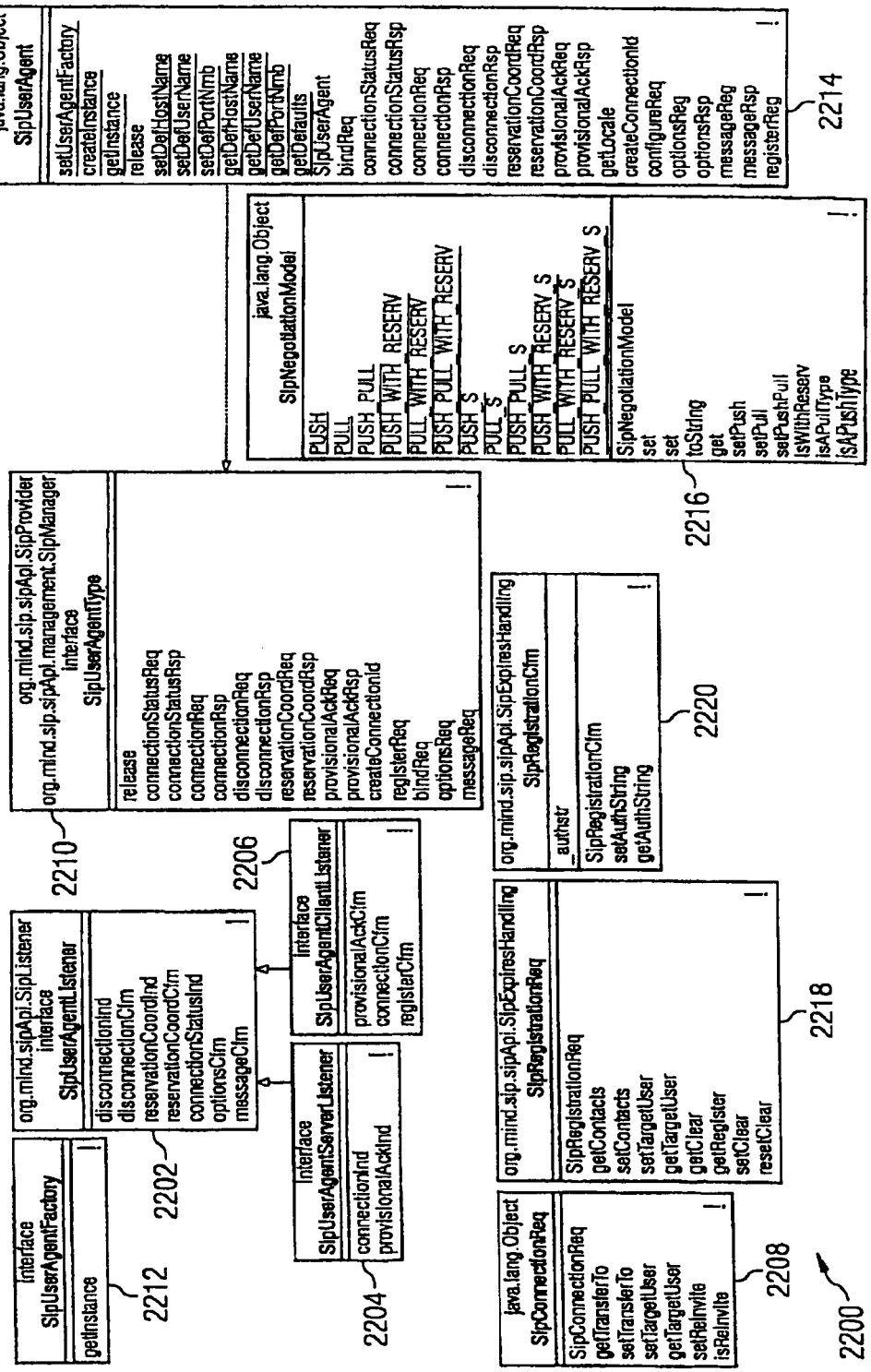

The org::mind::sip::sipApi::userAgent sub-package (cf. FIG. 21) contains interfaces and classes specifying the part of the SIP UA Generic API 101c that the Service User of the IF3 101c (in the present context, the E2ENP UA FSM 106) use for accessing the Service Provider. It consists of three major parts:

1. Interfaces that Service Users of the IF3 101c shall implement for intercepting the Indication (Ind) and Confirmation (Cfm) primitives generated by the Service Provider 110:

SipUserAgentListener 2202: common to both client and server side; a specialization of the org::mind::sip::sipApi::SipListener interface 2108.

SipUserAgentClientListener 2206: specific for the client side; a specialization of the SipUserAgentListener interface 2202.

SipUserAgentServerListener 2204: specific for the server side; a specialization of the SipUserAgentListener interface 2202.

2. Classes bundling parameters for specific primitives (currently only the SipConnectionReq class 2208 for the Connection Request (Req) primitive, the SipRegistrationReq class 2218 for the Registration Request (Req) primitive, and the SipRegistrationCfm class 2220 for the Registration Confirmation (Cfm) primitive). Instances of these classes are passed as parameters of the given primitives to the modules implementing the primitives. This solution allows extending and/or changing API details without disrupting the primitive signatures.

3. Interfaces and classes specifying the API that the Service Provider shall support for being compatible with the SIP UA Generic API 101c. The SipUserAgentType interface 2210 specifies the set of Request (Req) and Response (Rsp) primitives that the underlying SIP UA 110 implementation shall support for being compatible with the SIP UA Generic API 101c. The SipUserAgentType interface 2210 is a specialization of the org::mind::sip::sipApi::SipProvider interface. The SipUserAgent class 2214 wraps any given implementation of the aforementioned SipUserAgentType interface 2210, by applying the "abstract factory" and "singleton" design patterns as described in [Gam]. The "abstract factory" is defined by the SipUserAgentFactory interface 2212. The SipUserAgent class 2214 is designed to use a default implementation by using the defImpl class attribute holding the fully qualified class name of the default implementation. Custom implementations of the aforementioned SipUserAgentType interface 2210 can be created by providing specific factory classes implementing the aforementioned SipUserAgentFactory interface 2212. The SipUserAgent class 2214 provides a class method called setUserAgentFactory( ), which stores a singleton instance of the given custom factory.

Finally, this sub-package contains a class named SipNegotiationModel 2216, which represents the E2ENP negotiation model.

Figure 22:
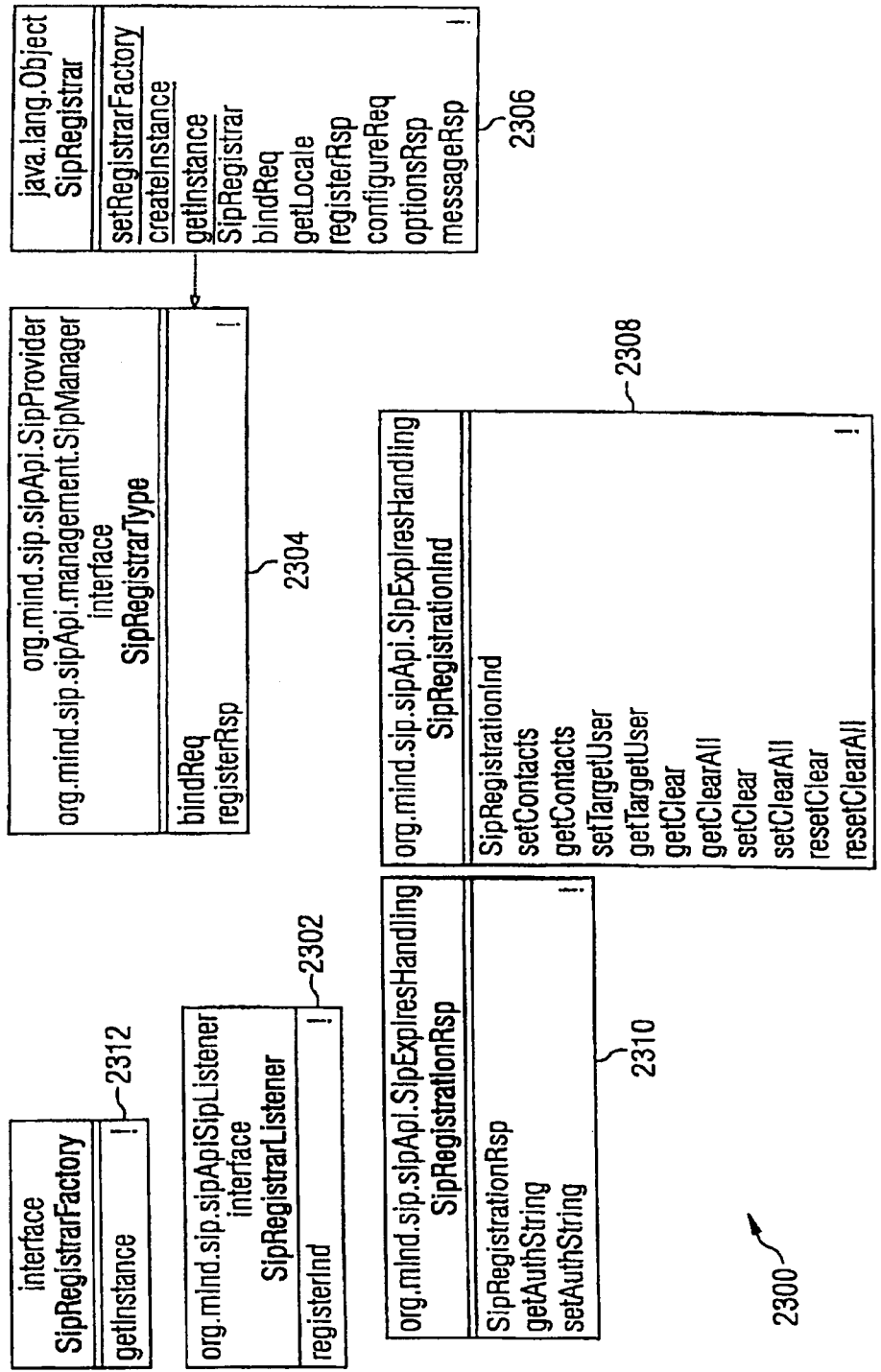

The org::mind::sip::sipApi::registrar sub-package (cf. FIG. 22) contains interfaces and classes specifying the part of the SIP UA Generic API 101c that SIP Registrar implementations used for accessing the Service Provider. It consists of three major parts:

1. Interfaces that Service Users of the IF3 101c shall implement for intercepting the Indication (Ind) and Confirmation (Cfm) primitives generated by the Service Provider:

SipRegistrarListener 2302: common to both client and server side; a specialization of the org::mind::sip::sipApi::SipListener interface 2108.

2. Classes bundling parameters for specific primitives (currently only the SipRegistrationInd class 2308 for the Registration Indication (Ind) primitive, and the SipRegistrationRsp class 2310 for the Registration Response (Rsp) primitive). Instances of these classes are passed as parameters of the given primitives to the modules implementing the primitives. This solution allows extending and/or changing API details without disrupting the primitive signatures.

3. Interfaces and classes specifying the API that the Service Provider 110 shall support for being compatible with the SIP UA Generic API 101c. The SipRegistrarType interface 2304 specifies the set of Request (Req) and Response (Rsp) primitives that the underlying SIP UA 110 implementation shall support for being compatible with the SIP UA Generic API 101c. The SipRegistrarType interface 2304 is a specialization of the org::mind::sip::sipApi::SipProvider interface 2110. The SipRegistrar class 2306 wraps any given implementation of the aforementioned SipRegistrarType interface 2304 by applying the "abstract factory" and "singleton" design patterns as described in [Gam]. The "abstract factory" is defined by the SipRegistrarFactory interface 2312. The SipRegistrar class 2306 is designed to use a default implementation by using the defImpl class attribute holding the fully qualified class name of the default implementation. Custom implementations of the aforementioned SipRegistrarType interface 2304 can be created by providing specific factory classes implementing the aforementioned SipRegistrarFactory interface 2312. The SipRegistrar class 2306 provides a class method called setRegistrarFactory( ), which stores a singleton instance of the given custom factory.

Figure 23:
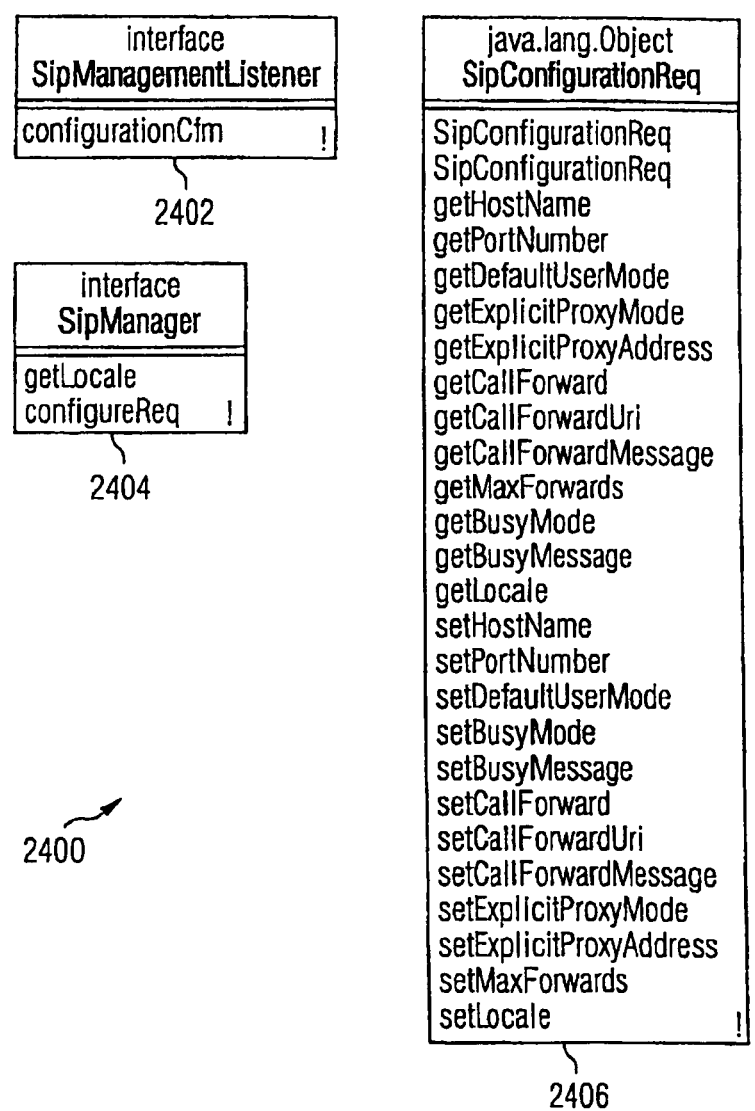

The org::mind::sip::sipApi::management sub-package (cf. FIG. 23) contains interfaces and classes specifying the part of the SIP UA Generic API 101c applied to the management entity 102 for configuring and controlling the Service Provider. It consists of three major parts:

1. Interfaces that Service Users shall implement for intercepting the Indication (Ind) and Confirmation (Cfm) primitives generated by the Service Provider: SipManagementListener.

2. Classes bundling parameters for specific primitives (currently only the SipConfigurationReq class 2406 for the Configuration Request (Req) primitive). Instances of these classes are passed as parameters of the given primitives to the modules implementing the primitives. This solution allows extending and/or changing API details without disrupting the primitive signatures.

3. An interface specifying the API that the Service Provider shall support for being compatible with the SIP UA Generic API 101c. The SipManager interface 2404 specifies the set of Request (Req) and Response (Rsp) primitives that the underlying SIP UA implementation shall support for being compatible with the SIP UA Generic API 101c.

Figure 24:
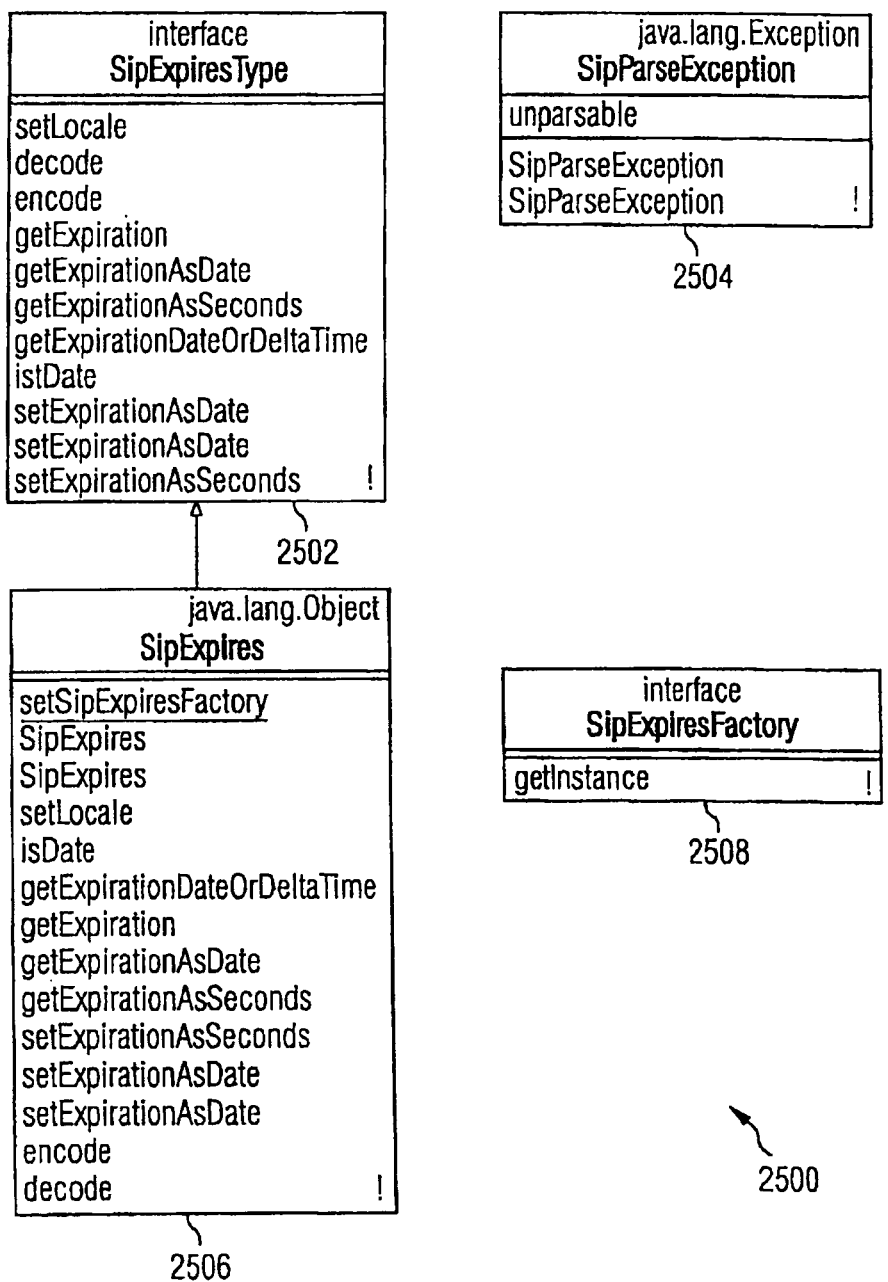

The org::mind::sip::sipApi::time sub-package (cf. FIG. 24) contains interfaces and classes specifying the part of the SIP UA Generic API 101c that allow Service Users manipulating the SIP Expires header field. It consists of two major parts:

1. Interfaces and classes specifying the API that the Service Provider shall support for being compatible with the SIP UA Generic API 101c. The SipExpiresType interface 2502 specifies the set of SIP Expires header field manipulation operations that the underlying SIP UA 110 implementation shall support for being compatible with the SIP UA Generic API 101c. The SipExpires class 2506 wraps any given implementation of the aforementioned SipExpiresType interface 2502 by applying the "abstract factory" and "singleton" design patterns as described in [Gam]. The "abstract factory" is defined by the SipExpiresFactory interface 2508. The SipExpires class 2506 is designed to use a default implementation by using the defImpl class attribute holding the fully qualified class name of the default implementation. Custom implementations of the aforementioned SipExpiresType interface 2502 can be created by providing specific factory classes implementing the aforementioned SipExpiresFactory interface 2508. The SipExpires class 2506 provides a class method called setSipExpiresFactory( ) which stores a singleton instance of the given custom factory.

2. The SipParseException class 2504 represents the exception thrown by the Service Provider whenever the parsing of the SIP Expires header field fails, due to malformed syntax.

In the following subsection, the procedures enabled by the SIP UA Generic API 101c shall be described by using a set of UML Message Sequence Charts (MSCs).

Figure 25:
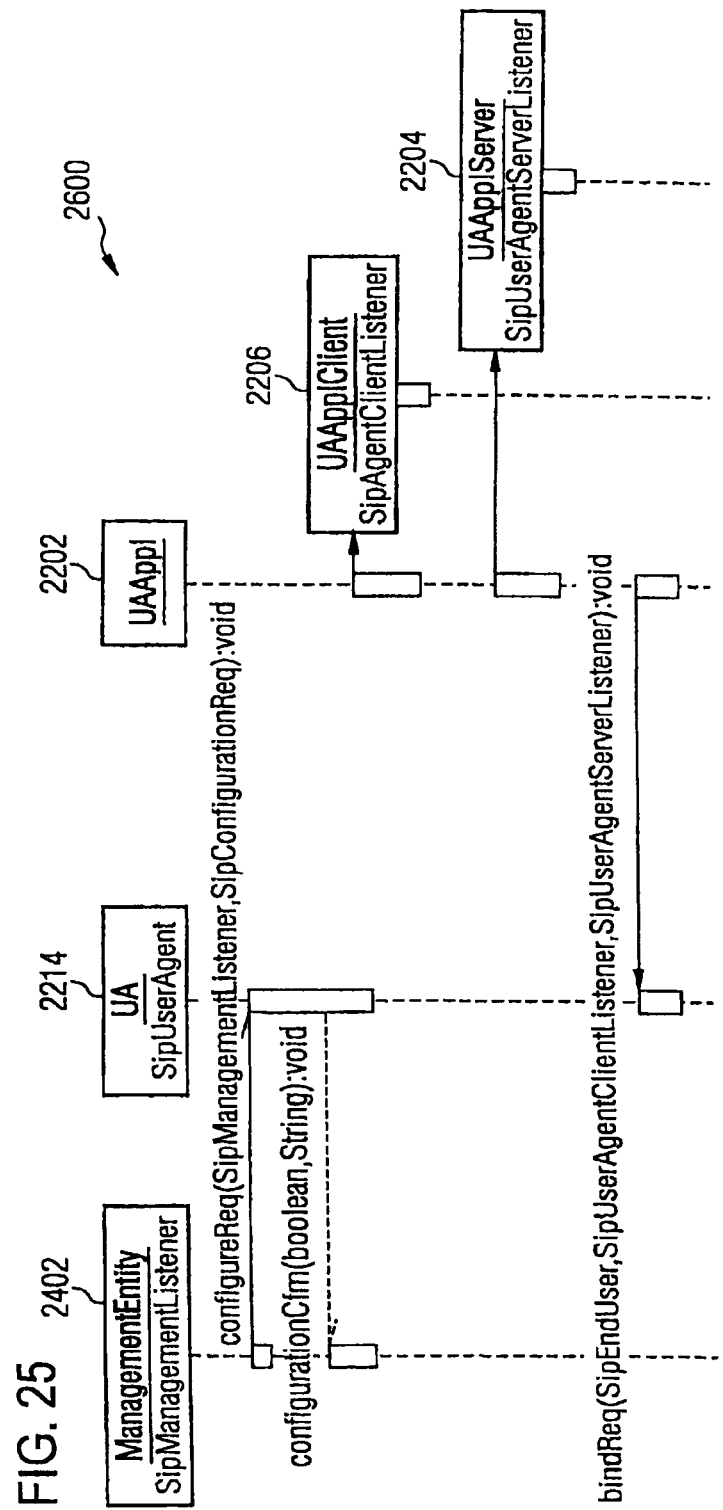
Figure 26A:
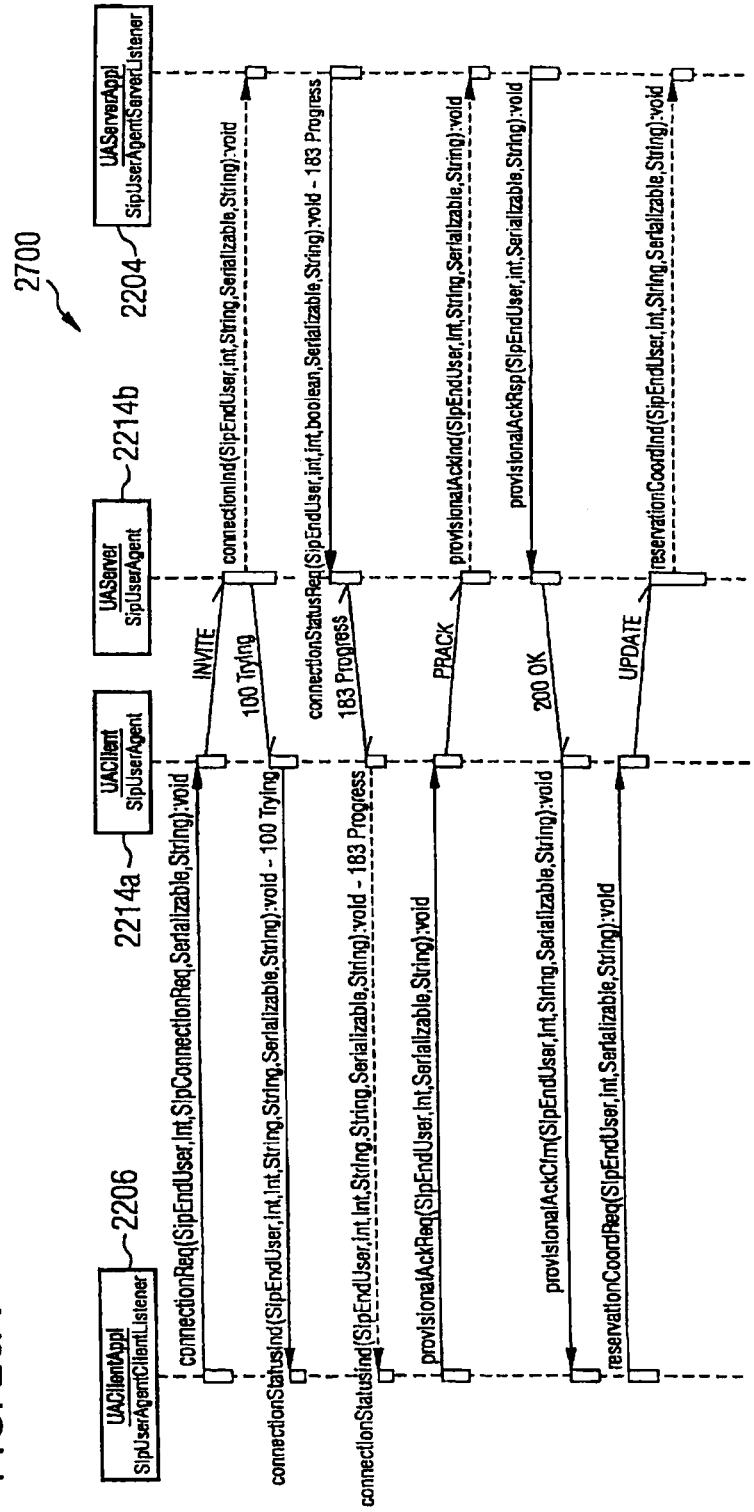
Figure 26B:
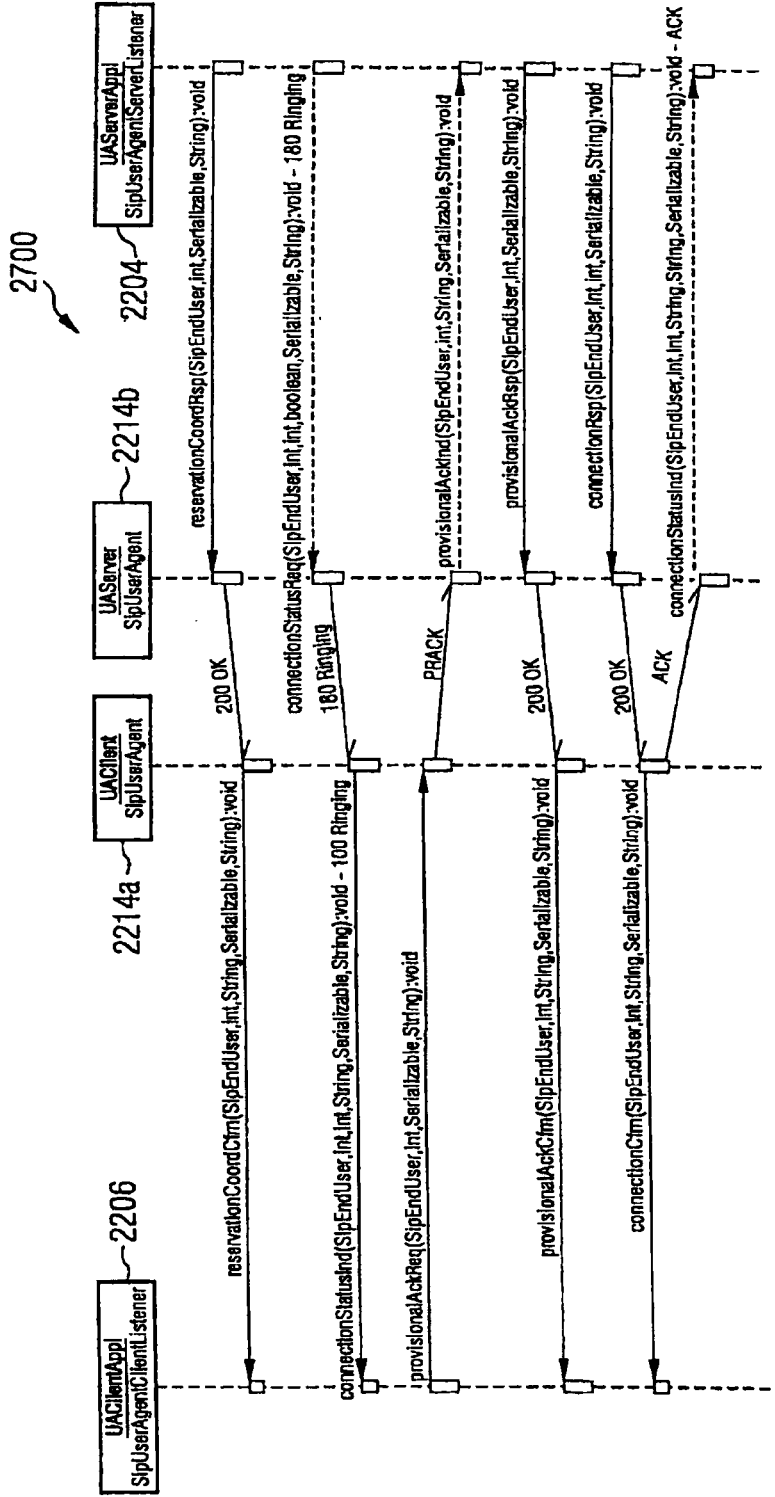

FIG. 25 shows how the Service Provider 110 is configured, and how a Service User of the IF3 101c creates and binds as Service User its client and server sub-units with the Service Provider 110. FIGS. 26A and 26B show how a SIP session can be established through the SIP UA Generic API 101c according to the procedures described in [Ros1].

This procedure starts with a connectionReq primitive invoked by a peer acting as calling party (or initiator), triggers a message exchange, which terminates only when the peer acting as called party (or responder) after having initially received a connectionInd primitive notifying the initiator's invitation to establish a SIP session, eventually accepts such invitation (after a number of negotiation and signaling steps), and replies with a connectionRsp primitive.

The responder generates SIP-provisional responses through the connectionStatusReq primitive invocations, which map at initiator's side to connectionStatusInd primitive invocations. The initiator acknowledges provisional responses with the PRACK method, by using the ProvisionalAckReq/Cfm primitive, which corresponds at responder's side to ProvisionalAckInd/Rsp primitive, respectively.

This procedure ends with the initiator receiving a connectionCfm primitive and the responder receiving a connectionStatusInd primitive. The latter is due to the SIP three-way acknowledgment scheme described in [Ros1].

Two procedures in this MSC are assumed to be executed automatically by the Service Provider: The generation of the "100 Trying" provisional response at responder's side, and the generation of the final ACK signal at initiator's side. The latter can, however, be forced by the Service User itself via the connectionStatusRsp primitive, but this means that the Service User must accordingly be configured not to generate the ACK signal automatically.

Final SIP responses indicating other reasons than success are generated either automatically by the Service Provider or explicitly by the responder's Service User via the connectionStatusReq primitive. These SIP responses are notified to the initiator's Service User via the connectionStatusInd primitive.

Figure 27:
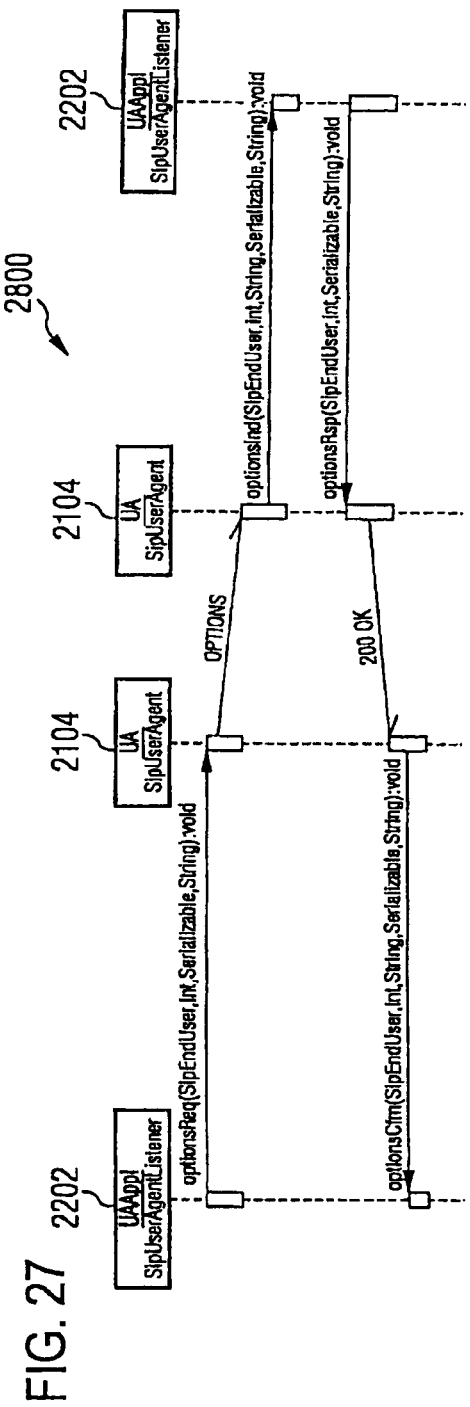
Figure 28:
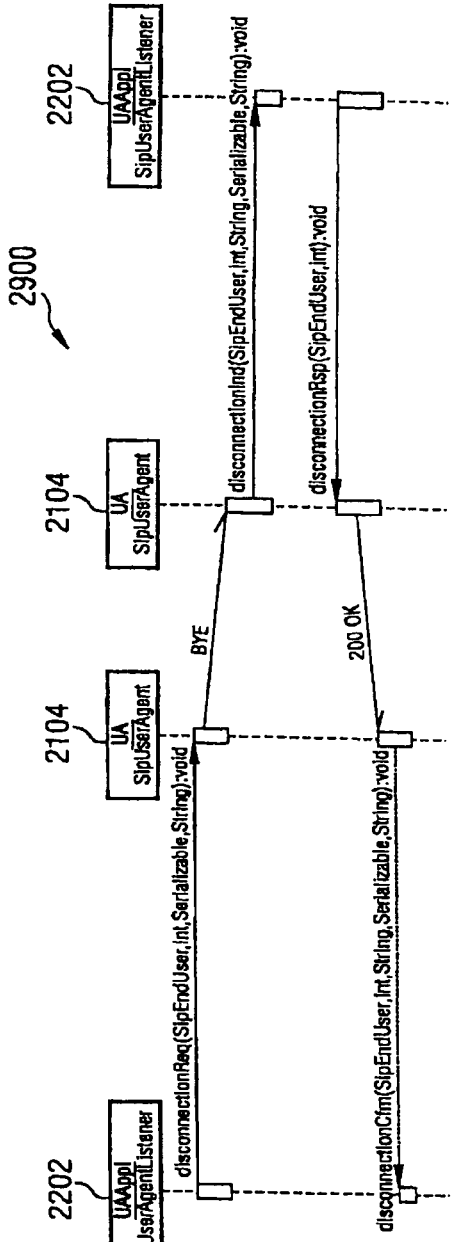

FIG. 27 shows how the OPTIONS method is handled via the optionsReq|Ind|Rsp|Cfm primitives. FIG. 28 shows how a SIP session can be released via the disconnectionReq|Ind|Rsp|Cfm primitives. The MSC shows the case of BYE, but the same procedure invoked during a connection establishment generates a CANCEL.

In the following subsection, the Finite State Machine 106 (FSM) applied to the E2ENP UA 128 shall briefly be described.

The core of the E2ENP UA 128 is composed of a Finite State Machine 106 (FSM), which coordinates the overall functionality and implements a part of the aforementioned interfaces. More specifically, the FSM 106 implements the Service User part of the IF3, IF4 and IF5, and the Service Provider part of the IF1 and IF2. Furthermore, the E2ENP UA FSM 106 makes use of the Cache 104 described above.

The FSM 106 is designed hierarchically as a StateChart. In the Root State (cf. FIG. 29), the FSM 106 handles session-terminating events, either associated with local or remote users' decisions. Furthermore, the Root State handles pre-negotiation, lease renewal, negotiation as Offerer/Answerer, re-negotiation, and session release processes. It should be noted that the term "negotiation" process is used for indicating a multimedia session establishment, intertwined with resource reservation coordination and QoS negotiation, as described in [ReqSpec].

The role of the Offerer is taken by the peer who is initiating a session establishment with QoS negotiation and resource reservation, but also by the peer who decides to initiate a re-negotiation. The role of the Answerer is always taken by the peer who is responding to an invitation to carry out a session establishment process with QoS negotiation and resource reservation, but also by the peer who decides to respond to an invitation to carry out a re-negotiation. This means that a peer initially acting the Offerer role can later take either the Offerer or the Answerer role during a re-negotiation. And vice versa, a peer initially acting the Answerer role can later take either the Offerer or the Answerer role during a re-negotiation.

Figure 29:
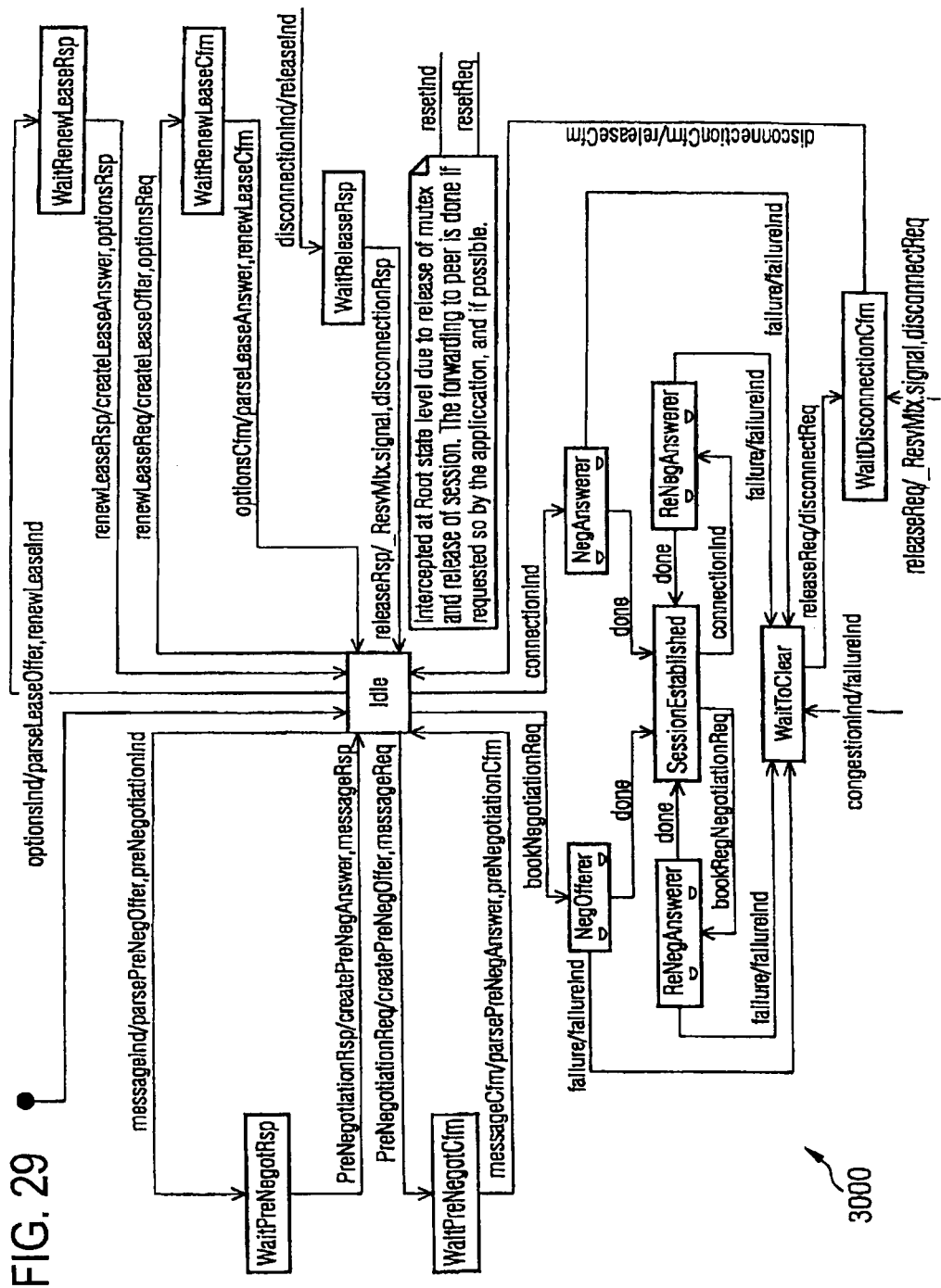
FIG. 29 shows a first state transition diagram for a nested Finite State Machine (FSM) showing the mutex-related procedures executed in the root state.

For the sake of simplicity, FIG. 29 does not detail the handling of primitives associated with IF1 (Management API); neither the internal interfaces with the FSM factory 106 nor the Cache 104 are taken into account.

The following subsections provide a detailed description of the mutex-related procedures shown in FIG. 29.

Figure 30:
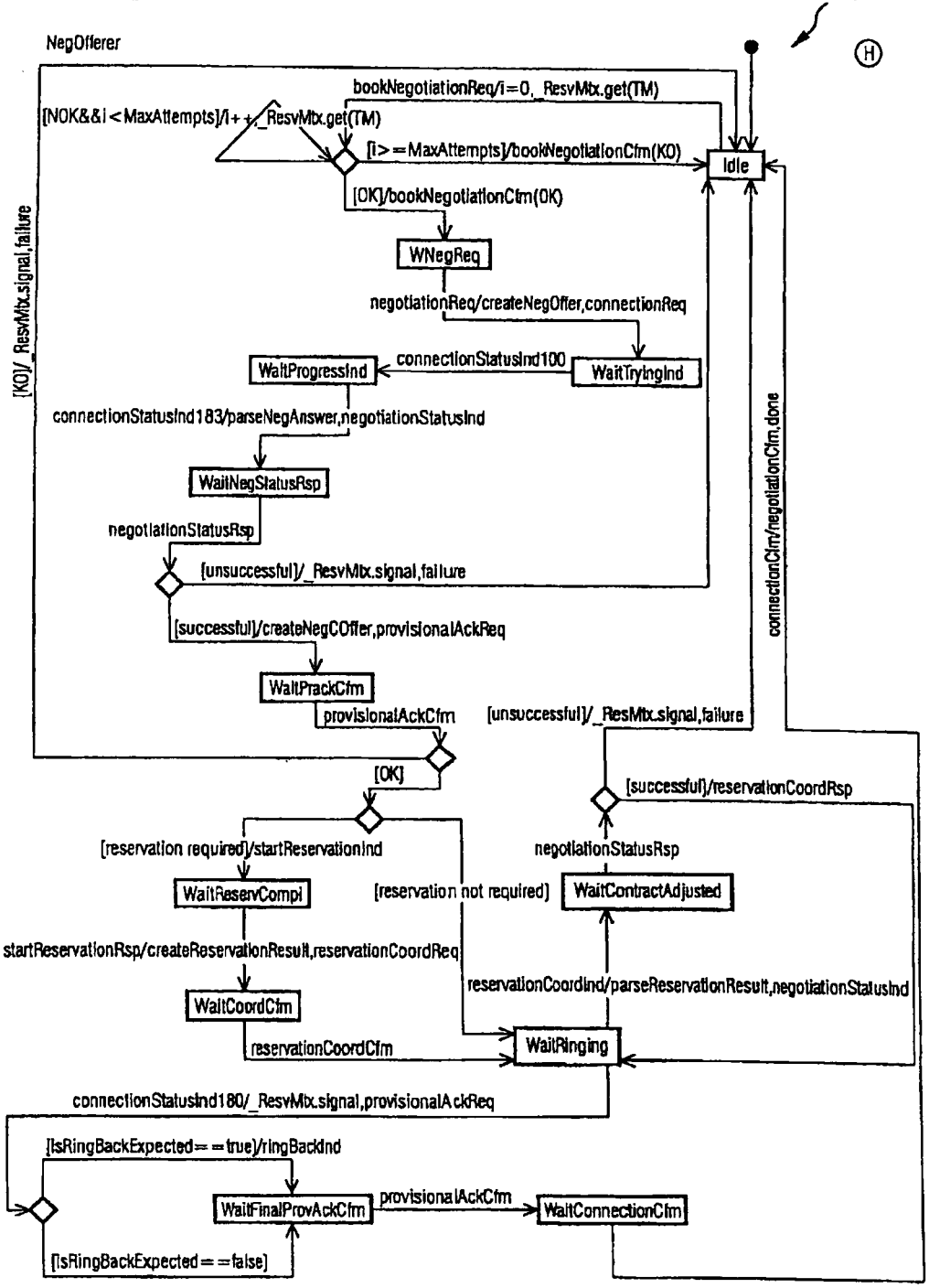
FIG. 30 shows a second state transition diagram for a nested Finite State Machine (FSM) showing the mutex-related procedures executed in the NegOfferer sub-state.
Figure 31:
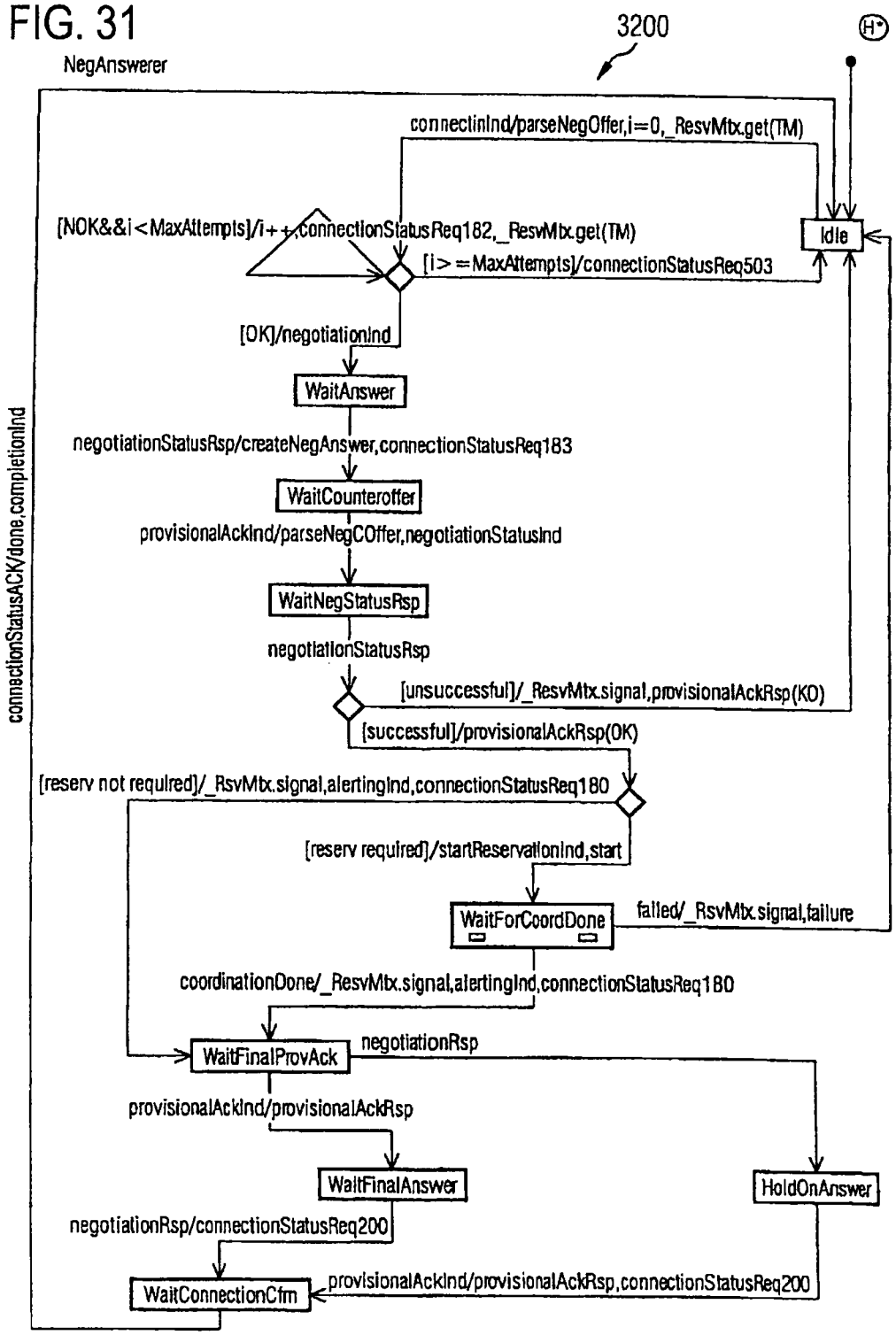
FIG. 31 shows a third state transition diagram for a nested Finite State Machine (FSM) showing the mutex-related procedures executed in the NegAnswerer sub-state.

Lower-level details of the negotiation process as Offerer/Answerer are encapsulated in nested FSMs 106, respectively the NegOfferer sub-state (cf. FIG. 30) and the NegAnswerer sub-state (cf. FIG. 31).

The NegOfferer sub-state contains a nested FSM 106 capturing the logic handling the negotiation process, as seen from the Offerer perspective. The NegAnswerer sub-state contains a nested FSM 106 capturing the logic handling the negotiation process, as seen from the Answerer perspective.

In order to guarantee consistency and avoid deadlocks during the combined reservation of local, peer, and network resources as described in [ReqSpec], the FSMs 106 nested in the NegOfferer sub-state and in the NegAnswerer sub-state use the system-wide "_ResvMtx" FSM 106 for accessing the reservation phase on a mutually exclusive basis, with respect to other instances of the E2ENP UA FSM 106. The "_ResvMtx" FSM 106 interacts with various instances of the E2ENP UA FSMs 106 via atomic local methods invocation (e.g. via any specific system call provided by the underlying Operating System).

The following subsections provide a detailed description of the mutex-related procedures shown in FIG. 30.

Figure 32:
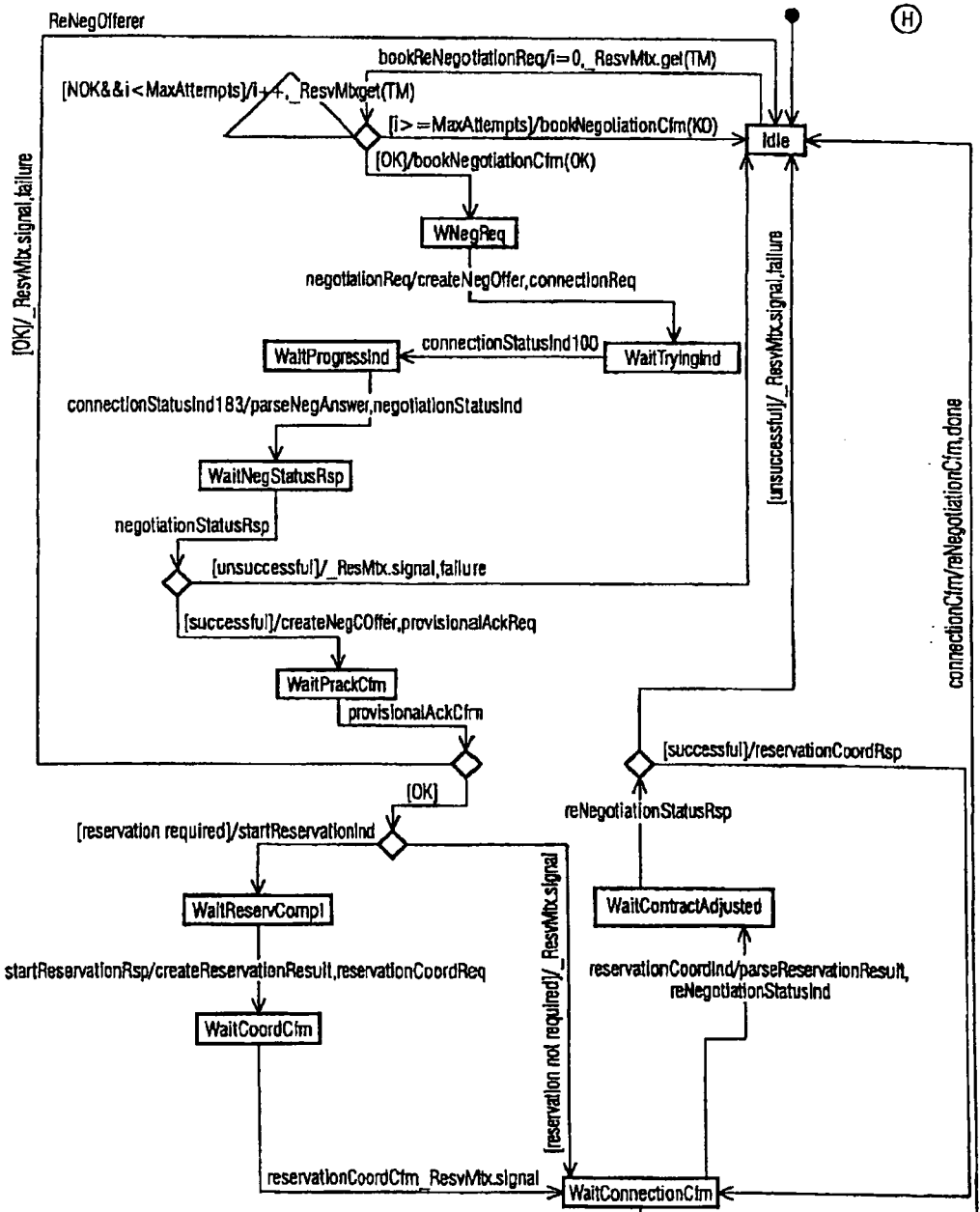
FIG. 32 shows a fourth state transition diagram for a nested Finite State Machine (FSM) showing the mutex-related procedures executed in the ReNegOfferer sub-state.
Figure 33:
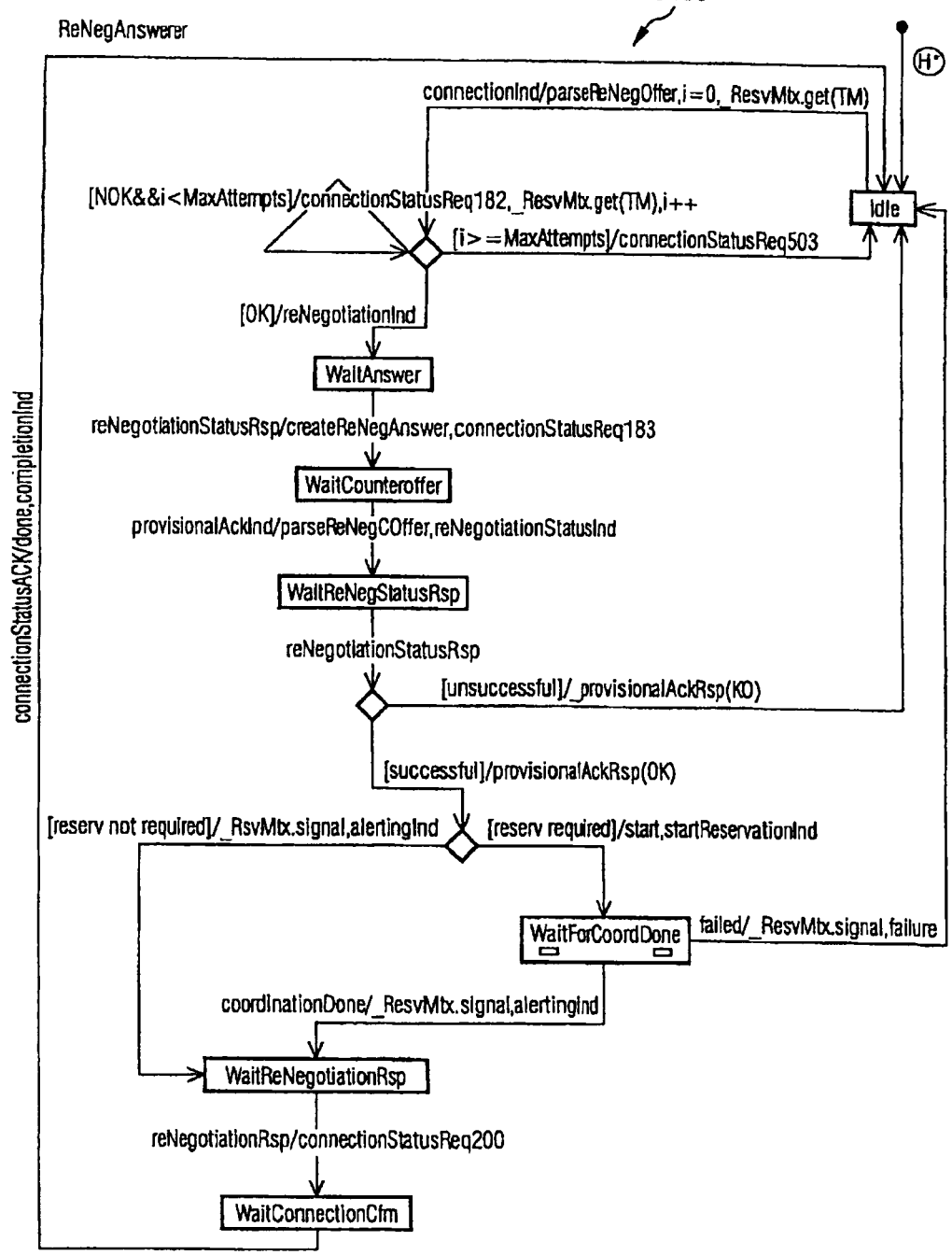
FIG. 33 shows a fifth state transition diagram for a nested Finite State Machine (FSM) showing the mutex-related procedures executed in the ReNegAnswerer sub-state.

Lower-level details of the re-negotiation process as Offerer/Answerer are encapsulated in nested FSMs 106, respectively the ReNegOfferer sub-state (cf. FIG. 32) and the ReNegAnswerer sub-state (cf. FIG. 33).

The ReNegOfferer sub-state contains a nested FSM 106 capturing the logic handling the re-negotiation process, as seen from the Offerer perspective.

The ReNegAnswerer sub-state contains a nested FSM 106 capturing the logic handling the re-negotiation process, as seen from the Answerer perspective.

In order to guarantee consistency and avoid deadlocks during the combined reservation of local, peer, and network resources as described in [ReqSpec], the FSMs 106 nested in the ReNegOfferer sub-state and in the ReNegAnswerer sub-state use the system-wide "_ResvMtx" FSM 106 for accessing the reservation phase on a mutually exclusive basis, with respect to other instances of the E2ENP UA FSM 106. The "_ResvMtx" FSM 106 interacts with various instances of the E2ENP UA FSMs 106 via atomic local methods invocation (e.g. via any specific system call provided by the underlying Operating System).

The following subsections provide a detailed description of the mutex-related procedures shown in FIG. 32.

This mechanism enforces a transaction-like processing of the resource reservation phase by enforcing various concurrent instances of the E2ENP UA Service Users to mutually exclusively access such a phase, as described in [ReqSpec].

In other words, the resource reservation mutex allows defining the phase between local admission control and final network resource reservation as a critical section. Combined with the contention resolution policy, this mechanism also guarantees that no deadlock situation as described in [ReqSpec] might affect the E2ENP whatsoever.

Concurrent E2ENP UA Service User instances try to seize the mutex via suspensive method calls. The Service User instance owning the mutex releases it via the signal call event.

Figure 34:
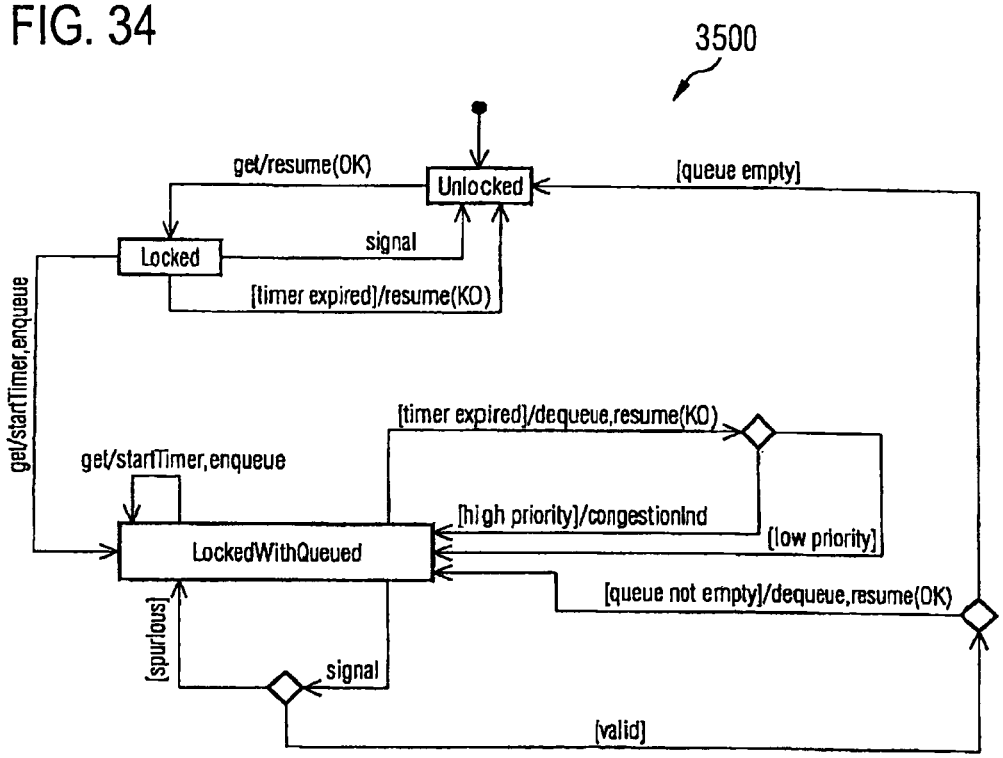
FIG. 34 shows a sixth state transition diagram for the "_Resv-Mtx" Finite State Machine (FSM) for allowing multiple requests to seize the mutex in a coordinated manner, based on their priority.

The "_ResvMtx" is associated with a priority queue for allowing multiple requests to seize the mutex in a coordinated manner, based on their priority (cf. FIG. 34).

Any request is served immediately if the mutex is unlocked; otherwise, the request is queued. Requests with high priority are queued in front of requests with low priority. Requests with the same priority are queued in a "First-In-First-Out" (FIFO) order.

All requests to acquire the mutex are limited in time. Upon expiration of such a (configurable) time, the given E2ENP UA Service User instance pending on the mutex is resumed with a return value indicating failure.

This design choice allows detecting (and thus preventing) starvation of concurrent E2ENP UA Service User instances suspended on the mutex, which occurs when the Service User instance owning the mutex is misbehaving (or maybe blocked). This is of most importance, especially in case the ill-behaved Service User instance are suspended on some other application-specific mutex, semaphore or lock, eventually seized by one of the Service User instances queued on the "_ResvMtx": In such an unfortunate situation, a dead lock would in fact inevitably occur.

When the timer associated with each blocked request expires, the priority of that request (specified in the parameter list of respectively the bookNegotiationReq or bookRenegotiationReq primitives, cf. FIG. 38) should be higher than the priority of the one for which the mutex was granted, the mutex would throw a signal event, congestionInd, to the instance of the FSM 106 UA associated with the Service User instance owning the mutex. This event is caught by the E2ENP UA FSM 106 Root state and mapped to a failureInd primitive sent to the Service User instance owning the mutex.

According to application-specific policies, such Service User instance might react on such event by rolling-back the current status of its activities and starting a release operation, which in turn would force the release of the mutex, as indicated in FIG. 29. Should however such Service User instance act differently (either based on application-specific policies or because being blocked or just misbehaving), the other instances would nevertheless be able to detect the prolonged delay on acquiring the mutex (after a configured number of failed attempts to invoke the get method successfully), thanks to the bookNegotiationCfm (or bookRenegotiationCfm in the re-negotiation case) primitives indicating a failure case (see FIGS. 31 and 33, respectively). In such cases, the notified E2ENP UA Service User instances might invoke the mediation of an application-specific arbitration unit. To manage all these exceptional cases/dead locks, the resetReq primitive can be issued at any time to cancel the current given session and release the mutex, if necessary.

A key issue typically encountered when using mutex entities is the so-called priority inversion problem, which occurs whenever a task $T_j$ owning the mutex has a lower priority than other tasks $T_k$ blocked on the mutex, and more precisely when the $T_j$ gets pre-empted by a task $T_l$ with a priority greater than $T_j$ but less than $T_k$.

Given the design choice of enforcing loosely coupled interfaces to both the E2ENP UA Service Users and to the SIP UA 110, the E2ENP UA 128 containing the "_ResvMtx" implementation cannot directly enforce well-known protocols, e.g. the Priority Inheritance Protocol or the Priority Ceiling Protocol. This is after all a consequence of designing the E2ENP UA 128 as a software component.

However, if the E2ENP UA FSM 106 is designed to handle a thread-pool for processing concurrently multiple instances of the FSM 106, the priority inversion problem might be tackled at least on this level. In this connection, the enforcement of the Priority Inheritance Protocol allows to achieve a good performance in handling the aforementioned problem. To this extent, the priority specified in the parameter list of the bookNegotiationReq primitive (or bookRenegotiationReq in the re-negotiation case, cf. FIG. 38) issued by each E2ENP UA Service User instance is assigned as priority of the thread serving that FSM 106 instance. The "_ResvMtx" shall therefore temporarily raise the priority of the thread associated with the FSM 106 instance owning the mutex to the priority of any blocked thread if the priority of the latter is greater than the one of the former.

The E2ENP UA 128 thus provides the tools for solving deadlock and priority inversion problems: However, this is up to the applications 130 or QoS Brokers 130 using such tools to guarantee that those problems will never occur.

In the following subsection, the resource reservation coordination process shall be described.

Figure 35:
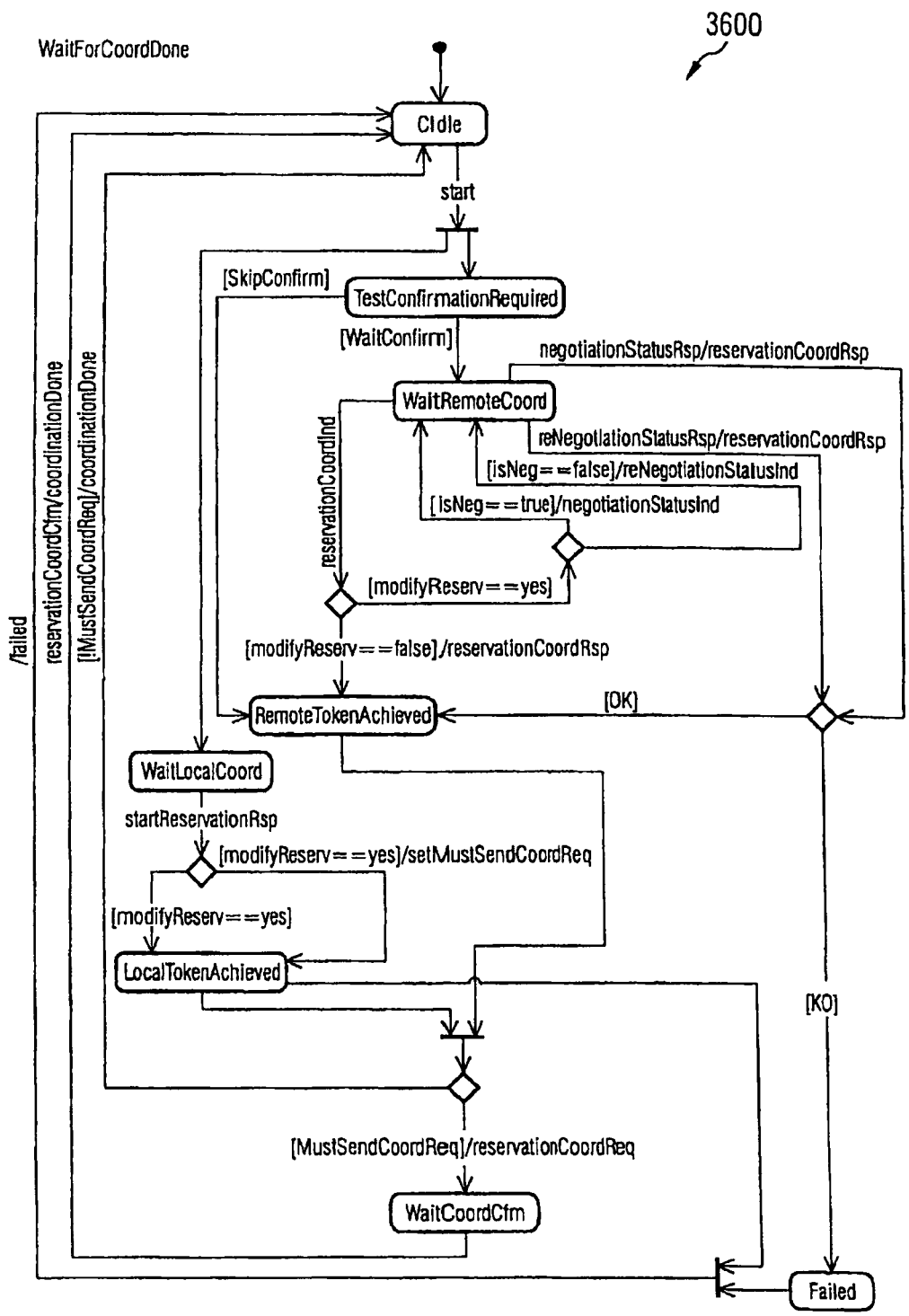
FIG. 35 shows a seventh state transition diagram for a nested Finite State Machine (FSM) showing the mutex-related procedures executed in the WaitForCoordDone sub-state, FIG. 36 exhibits a UML message sequence chart (MSC) showing the pre-negotiation procedure needed for the correlation of the Application Programming Interface (API) of the E2ENP User Agent (E2ENP UA) and the generic Application Programming Interface (API) of the SIP User Agent (SIP UA), thereby using the above-mentioned Finite State Machine (FSM) of the E2ENP User Agent (E2ENP UA), FIGS. 37A and 37B exhibit a UML message sequence chart (MSC) showing the session establishment with the QoS negotiation procedure and the resource reservation coordination needed for the correlation of the Application Programming Interface (API) of the E2ENP User Agent (E2ENP UA) and the generic Application Programming Interface (API) of the SIP User Agent (SIP UA), thereby using the above-mentioned Finite State Machine (FSM) of the E2ENP User Agent (E2ENP UA)

The NegAnswerer (cf. FIG. 31) and ReNegAnswerer (cf. FIG. 33) sub-states each contain an instance of the same composite state, the WaitForCoordDone sub-state (cf. FIG. 35), whose nested FSM 106 captures the logic handling the coordination of resource reservation signaling required before the Answerer is actually alerted and the Offerer informed correspondingly thereupon.

The resource reservation coordination process is based on the mechanisms described in [Cam1], with the following differences:

1. The preconditions described in [Cam1] can be mapped to the E2ENP "qosdef" section and its corresponding negotiation process described in [ReqSpec].
2. The E2ENP prescribes the synchronization of the reservation processes between peers (the "confirm" tag in [Cam1]) as always mandatory due to the "Economy Principle": This means that the end-to-end signaling of the "confirm" tag (or anything equivalent) is unnecessary and thus shall not be supported by any E2ENP implementation.
3. In case of no network resource reservation carried out by the Offerer, the Answerer shall determine this case by examining the preconditions sent by the Offerer, and correspondingly mark the state RemoteTokenAchieved as active in FIG. 35, so that the Answerer will be able to transparently deal with resource reservation coordination.

Impact on SIP implementation (e.g. the introduction of the status response and the new value "preconditions" for the "Supported" header field of the OPTIONS method) are left for further study.

An important aspect is that the E2ENP described in [ReqSpec] explicitly claims that the Economy Principle is always required, including the concept described in [Cam1] of allowing both end-to-end and segmented reservations. In the latter case, enforcing the Economy Principle might not always be desirable. There might in fact be situations where reservation can be well done locally on beforehand with no cost and/or major impact on session establishment. For instance, some users might be attached to an intranet or wireless LAN, where network resource reservation might be free and starving other users might flexibly be handled. Therefore, the original E2ENP shall accommodate this case and rely on the applicability of the Economy Principle to allow the aforementioned case.

It should be noted that the E2ENP does not imply that a direct interface to reservation entities is available: It is up to the applications 130 or QoS Broker 130 to access those entities. If the latter wishes to execute a "pre-reservation" of network resources, it might do that, but the E2ENP signaling would still give the right timing to the applications 130 or QoS Broker 130, thereby informing it when the reservations at all sides have been accomplished according to the Economy Principle, e.g. which signal has reached the level of the desired QoS (even though best effort communications might well have been started on beforehand, if specified by the applications 130 or QoS Broker 130, respectively).

For the sake of simplicity, the model depicted in FIGS. 30 to 36 only partially details the handling of unexpected events and error cases. FIGS. 55A-D complete the description of said model by indicating the behavior expected in case any of such events or errors occur.

A set of timers is defined to avoid that the E2ENP UA FSM 106 gets stuck in a state waiting for an event from the Service User and/or the SIP UA 110. The treatment of timers for handling primitives across the E2ENP UA API 101*b* (T1-T22) does not prescribe the E2ENP UA FSM 106 taking autonomously corrective actions, except for a few cases (missing negotiationReq in Root.NegOfferer.WaitNegReq and renegotiationReq in Root.ReNegOfferer.WaitReNegReq). The E2ENP UA FSM 106 simply notifies the misbehaving Service User about the detected problem via the failureInd primitive upon which the Service User is supposed to clean up and send a releaseReq primitive to the E2ENP UA FSM 106. However, if this counteraction does not succeed, e.g. owing to massive problems at the Service User side, the E2ENP UA FSM 106 would detect this situation upon expiration of yet another timer: in this case, the E2ENP UA FSM 106 finally takes the decision to release the SIP connection and the overall E2ENP session. To manage all these exceptional cases/dead locks, the resetReq primitive can be issued at any time to cancel the current given session and release the mutex, if necessary.

However, the composite states Root.ReNegOfferer, Root.NegAnswerer, Root.ReNegOfferer, Root.ReNegAnswerer may detect a later arrival of the missed primitive (eventually triggered by the invocation of the failureInd primitive) by using each an History state (cf. FIGS. 31, 32, 33, and 34). With this solution, the late primitive arrival would be caught in the right original state and processed correctly. This means that whenever the aforementioned timers expire, the aforementioned composite states shall each take care of updating the history to point to the state where the timer expired.

Should a SIP primitive fail, specific timers (T101-T106) would detect the failure at the Root.ReNegOfferer, Root.NegAnswerer, Root.ReNegOfferer, Root.ReNegAnswerer composite states: In these cases, the same procedure as described above (based on the failureInd primitive) shall be enforced.

For the interface, similar approaches to the potential problem of primitive failure have to be pursued by means of the management entity 102, which is however not detailed in this section.

For properly implementing the E2ENP concept, the dual seizure event (peers simultaneously initiating a negotiation session with each other) shall be properly detected and handled in order to allow that consistency is guaranteed and that any correlation between outgoing and incoming invitations is enforced.

The former issue can be addressed by using a mutex for regulating the access to the Economy Principle phase on a system-wide basis (the "_ResvMtx" described in the sections above).

For enforcing any correlation, some additional support is required instead. Two possible approaches are envisioned:
a. to use the push-pull model for allowing both Offerer and Answerer having a chance to send an offer to the peer, thus avoiding the possibility of simultaneously generating two negotiations in both directions for the same session;
b. to treat the attempt of handling negotiations simultaneously in both direction as a double seizure, which requires a contention resolution policy to be enforced (e.g. wait on a random timer on both sides, and then retry). But this would mean that both peers should use the same external representation of the session ID in order to be able to detect a double seizure. Otherwise, each of the two UAs would treat the outgoing and incoming negotiations as independent sessions. This would be similar to the case peer A invited peer B to e.g. a videoconference, while peer B would invite peer A to another videoconference, whereas the videoconference could actually be the same. The way E2ENP defines the external representation of the session ID described in [ReqSpec] allows the two peers creating only distinct IDs. Therefore, the E2ENP-specification per se does not allow detecting double seizures at all.

A reasonable solution to this issue is to enforce the push-pull model (first approach) as much as possible and to include in the re-negotiation phase the possibility to allow the Answerer to send an offer to the Offerer at a later time (i.e. after the first negotiation has been entirely completed).

This means that the E2ENP shall allow the Offerer and/or any Answerer to negotiate with the other Answerers and/or the Offerer upgraded or new information for establishing QOS-aware multimedia sessions. This means that re-negotiations can be subdivided in two classes:
  planned re-negotiations as described originally in [ReqSpec],
  unplanned re-negotiations, which are used for negotiating upgraded or new information during the lifetime of a session.

An explicit Boolean parameter in the pre-negotiation primitive indicates which of the two classes the given primitive should be used for. Of course, the semantics could be inferred from the information passed, which would be different in the two cases, but the Boolean parameter is a good trade-off between having this distinction, which has explicitly been made for improving performance, and the need to keep the E2ENP UA API 101b and FSM 106 simple by avoiding additional primitives.

However, applying the aforementioned solution might not suffice in the general case since a non-E2ENP compliant SIP UA 110 might interfere with E2ENP compliant peers, or one of the participants might try to invite some of the other participants to a parallel multimedia session and use the E2ENP to accomplish this.

SIP loosely tackles the dual seizure problem by suggesting a contention resolution policy (indicated as a "MAY" requirement in [Ros1]), whereby peers abort the invitation by replying with an Internal Server Error response, carrying a Retry-After SIP header field set-to the time after which the remote peer should retry.

The dual seizure detection is accomplished by matching all messages between each given couple of users, via the To- and From-SIP header fields. This means if a first user is using UA A and sends an INVITE to a second user on UA B, and vice versa, both users can detect the dual seizure by using the couple (To, From) as a unique identifier for correlating the two INVITEs.

But this is not exactly the way E2ENP identifies sessions. If users are engaged in two independent videoconferences, the E2ENP can actually distinguish such cases by using the session ID described in [ReqSpec]. In any case, the biggest issue is what would the SIP UA 110 do in such a case, given that the aforementioned SIP requirement is a MAY requirement and thus not necessarily supported by all SIP implementations.

One has to assume that the aforementioned policy may be implemented: Thereby, the E2ENP UA 128 would not notice the dual seizure, except for an indication of an unsuccessful ne-gotiation or re-negotiation phase. But one could also get into dual seizure troubles if the contention resolution policy is not supported by the underlying SIP UA 110 implementation.

To tackle the latter case, the Cache 104 should store for each of its entries also the (E2ENPFromnAddress, E2ENPTo-Address) couple associated with the outgoing INVITE and use this information for correlating an incoming INVITE with a pending outgoing INVITE registered in the Cache 104, thus detecting the double seizure case: This would then trigger a contention resolution policy. This means that every incoming INVITE received after sending an INVITE should be checked by searching the Cache 104 with the aid of a secondary key, using the (From, To) couple. Although this is an extra effort, it is only limited to the specific case of receiving an INVITE after having sent one.

As an alternative to the contention resolution policy suggested by [Ros1], which is eventually implemented by the underlying SIP UA 110, the E2ENP UA 128 shall support a more general policy, which is also applicable to complex scenarios like one-to-many or many-to-many described in [ReqSpec].

Whenever initiating a negotiation or pre-negotiation phase, the E2ENP UA 128 should not only include the session ID described in [ReqSpec] in the offer sent within the INVITE but also a hash thereof which takes the IP address of the computing unit where the E2ENP UA 128 is active into account and a time stamp. This hash might also be signed digitally in order to improve security aspects [ReqSpec]. The hash will be used as a substitute for the session ID in any subsequent SIP message. Should a dual seizure occur, the E2ENP would detect it by using the aforementioned (From, To) couple. Thereby, said contention resolution policy would be applied as follows:

If the two peers are not already involved in multimedia sessions (which means no entry in the Cache 104 for a given local peer), each peer would compare the hash it generated with the one received from the peer. The peer with the biggest value is automatically chosen as Offerer and thus proceeds with the pre-negotiation or negotiation phase as such, whereas the other peer, the "loser", automatically moves to the Answerer mode, according to the following MSC:

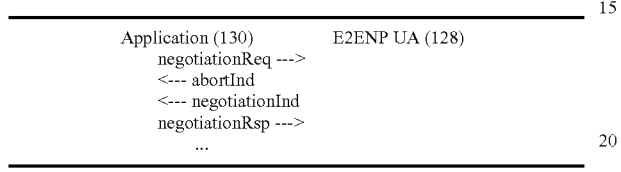

If the two peers are already involved in multimedia sessions (which means an entry in the Cache 104 for the given (From, To) couple), the "bully" process described in the previous point could be applied as well. The peer whose request is rejected could apply an unplanned re-negotiation after the winner of the "bully" process has completed its negotiation. An example for this case is the simultaneous detection and re-negotiation reaction of the involved peers to a QoS violation.

Since the generated session ID contains also a randomly generated number (together with the IP, port, etc. information) for the identification, it is not to be expected that some of the peers would always be "winners" and some always "losers".

Finally, the aforementioned contention resolution process also applies to the case of a negotiation procedure colliding with a pre-negotiation procedure or even a lease-renewed procedure as well as for the collision of a pre-negotiation procedure with a lease-renewed procedure.

The model described in the previous subsections represents the static definition of the E2ENP UA FSM 106. At runtime, the E2ENP UA 128 shall associate a specific E2ENP session with an object representing it. This object—the Session—shall contain any information related with the given E2ENP instance: most notably, a pointer to the current state and the instance of all the condition variables defined in the model above.

A thread of execution shall dynamically be associated with each of these Session objects: either created on demand, or—better—picked up from a thread-pool (potentially with lazy initialization).

This version of the E2ENP is based on the SIP protocol specification described in [Ros1]. If at later time another session level protocol or a more generic approach is chosen, the FSM 106 should be reworked in order to mask the corresponding changes from applications 130 or QoS Brokers 130, thanks to the E2ENP UA API 101b abstraction. This means that the interaction of the FSM 106 with the E2ENP UA API 101b Service User is a design-invariant.

The use of the SIP MESSAGE method is tentatively indicated in FIG. 29. Alternatively, the SIP OPTIONS method could be used. In the scope of the underlying invention, only the latter is exposed by the SIP UA Generic API 101c since the use of the former for implementing the FSM 106 model described below is still being investigated.

In order to avoid that entities interfacing with the E2ENP UA 128 (e.g. the E2ENP UA 128 Service Users, the SIP UA 110, and E2ENP management entities 102) directly invoke E2ENP UA 128 incoming primitives in response to E2ENP UA 128 outgoing primitives before the E2ENP UA 128 has ever had a chance to reach a stable state configuration, the E2ENP UA 128 is by design always loosely coupled with the aforementioned external entities. Another reason for this design choice is the possibility that otherwise there would be a non-null probability that the entities interfacing with the E2ENP UA 128 might block indefinitely a E2ENP UA thread.

This means that the E2ENP UA 128 shall enforce one incoming message queue for the whole E2ENP UA FSM 106 as well as an outgoing message queue for each of the interfaces IF1, IF2, and IF3. The reason for the latter queues is due to the fact that the E2ENP UA 128, which is a software component, can not make any assumption on the way applications 130 would handle primitives thrown by the UA.

This approach is not necessary for IF4 and IF5 since the Parser 112 and the Factory 114 are designed as thread-safe, re-entrant libraries accessed by the E2ENP UA FSM 106 via synchronous interfaces.

Concurrent instances of the E2ENP UA FSM 106 are handled with the aid of a thread-pool.

The E2ENP UA FSM 106 depends on the following components:
the E2ENP UA API 101b, exposing the E2ENP functionality as implemented by the FSM 106,
the Parser API 101d, used for accessing services dealing with the parsing of session descriptions contained in received SIP messages,
the Factory API 101e, used for accessing services dealing with the creation of session descriptions to be inserted in outgoing SIP messages,
the SIP UA Generic API 101c, used for accessing SIP services,
the E2ENP Management API 101a, used for accessing services dealing with the overall E2ENP UA 128 management functionality, and
the Cache 104, used for storing and correlating identifiers of a given session.

The E2ENP UA FSM model is described in FIGS. 30, 31, 32, 34, and 36 in terms of UML State Charts and can be implemented by using various well-known design patterns. In any case, as indicated in FIG. 1, the FSMs 106 are associated at runtime with instances of the applied framework or design pattern to implement the model. Each instance is associated with a specific SIP phase [ReqSpec], i.e. pre-negotiation, lease renewal, or negotiation. Re-negotiations run on the same instance as the underlying session established with the corresponding negotiation.

In order to handle the life cycle of an FSM 106 instance (creation, activation, deactivation, and destruction), an FSM instance factory 106 (see FIG. 1) is envisioned. This should be a singleton object creating instances of the FSM 106 either upon invocation of specific E2ENP UA API 101b primitives (negotiationReq, prenegotiationReq, renewLeaseReq) or upon invocation of specific SIP UA Generic API 101c primitives (connectionInd, optionsInd, messageInd).

Figure 36:
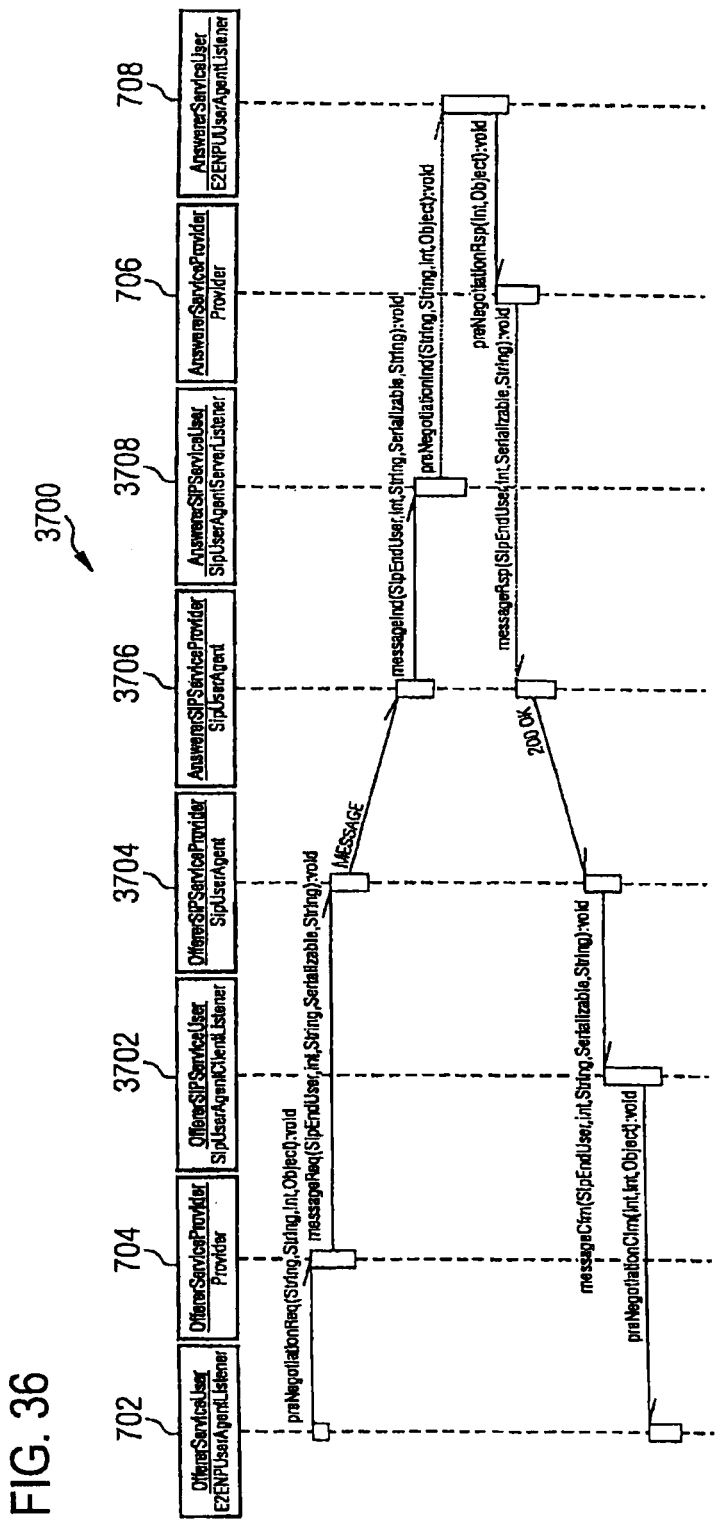

FIG. 36 depicts the MSC for a simple pre-negotiation scenario, wherein the correlation between the E2ENP UA API 101b and the SIP UA Generic API 101c via the E2ENP UA FSM 106 is highlighted.

Figure 37A:
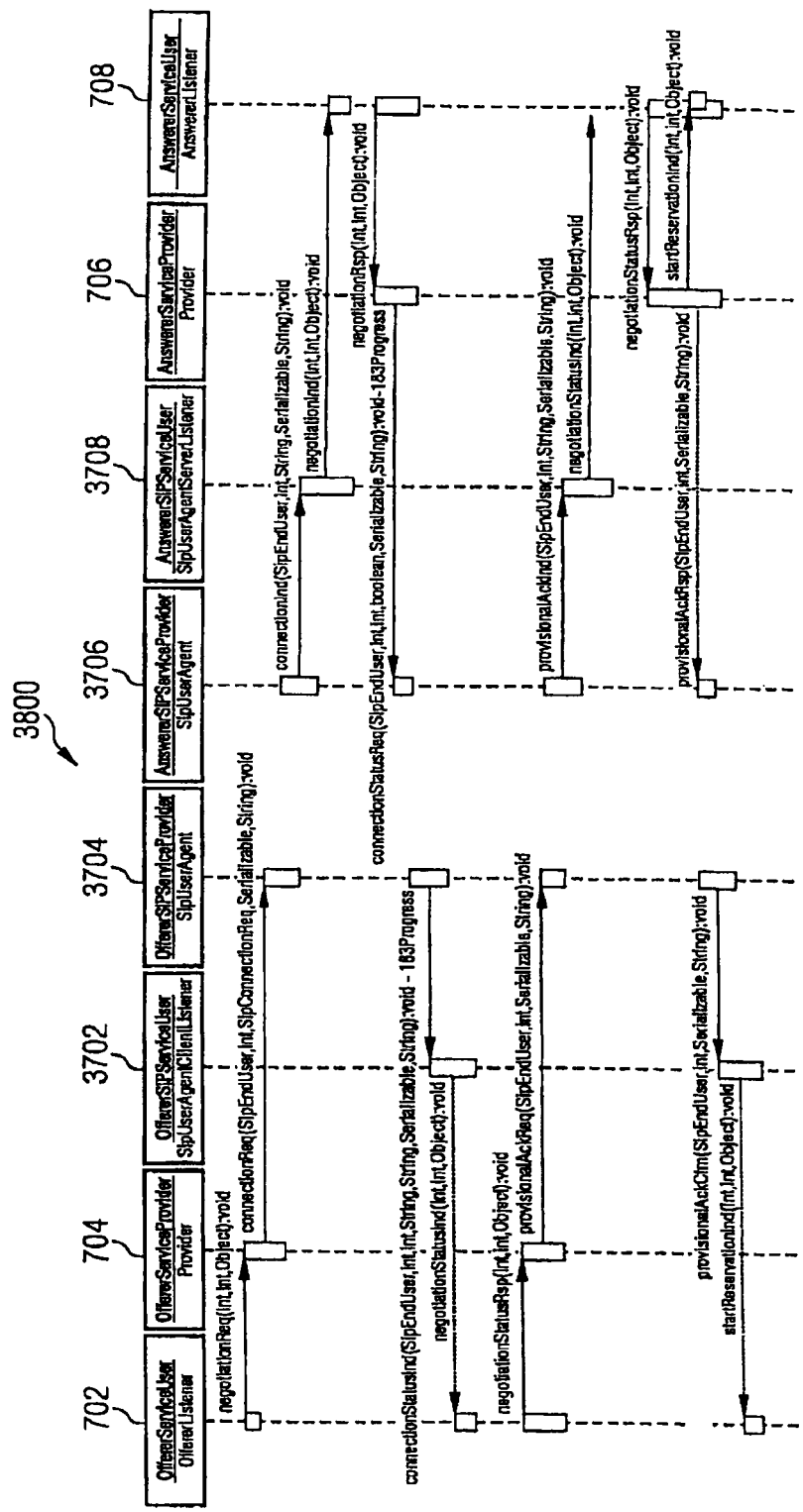
Figure 37B:
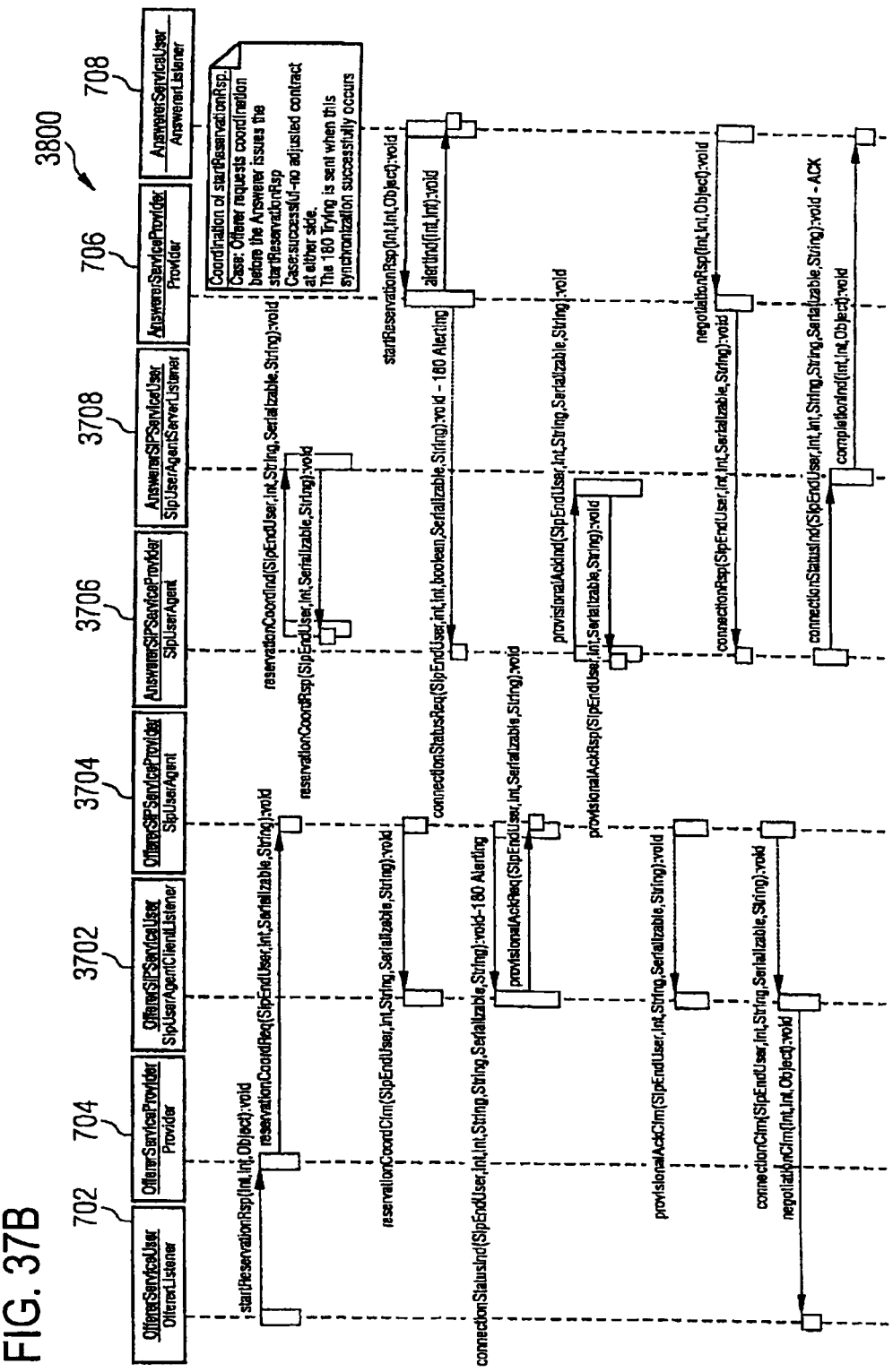

FIGS. 37A and 37B depict the MSC for a simple session establishment scenario, wherein the correlation between the E2ENP UA API 101b and the SIP UA Generic API 101c via the E2ENP UA FSM 106 is highlighted. In the presented scenario, the confirmation of resource reservation completion from the Offerer side arrives before the same happens at Answerer side. Likewise, it is assumed that the resource reservation process succeeds in reserving exactly the amount of the originally requested resource.

In the following subsection, the E2ENP UA factory 108 shall briefly be described.

The E2ENP UA factory 108 is a management functionality modeled according to the "abstract factory" design pattern described in [Gam] for instantiating a specific E2ENP UA 128 implementation using an implementation-independent interface.

This entity handles the instantiation of all the classes described in the previous sections required to create an instance of the E2ENP UA 128. More specifically, the E2ENP UA factory 108 creates the following entities:
 an E2ENP UA FSM factory, which in turn creates the E2ENP UA FSM static structure,
 the FactoryFactory 120, which in turn creates the E2ENP Factory 114,
 the ParserFactory 118, which in turn-creates the E2ENP Parser 112, and
 the Cache 104.

Thereby, said E2ENP UA factory 108 depends on the following components:
 the application 130 and/or middleware 130, which may directly call the E2ENP UA factory 108, alternatively a management entity 102.
 the E2ENP UA FSM 106, whose factory is created by the given concrete E2ENP UA factory implementation.
 the Factory 114 and Parser 112, whose factories are created by the given concrete E2ENP UA factory implementation.
 the Cache 104, which is created by the given concrete E2ENP UA factory implementation.

The E2ENP UA factory 108 has been designed by using the object-oriented paradigm. Thus, it is hereby described by using the Unified Modeling Language (UML).

In the following, the E2ENP object configuration parameters shall briefly be summarized.

The E2ENP UA 128 and its sub-components (FSM 106, Parser 112, Factory 114, Cache 104) are configurable elements. The initial configuration should consider the specific features of the peer using the E2ENP UA 128.

The E2ENP UA 128 should be initialized with the following parameters:
 The E2ENP UA FSMs 106 are initiated with specific time-outs for the crucial states, where prompt decisions about the performance should be taken. The length of the time-outs depends on the specific underlying protocol of the E2ENP UA 128 and on the performance features of the respective peer. The time-outs of the different devices and networks may vary with a certain extent. The implementers should consider these variations by defining the time-outs.
 The Cache 104 does not need any configuration parameters and is initiated by the E2ENP UA 128.

The Parser 112 and the Factory 114 are respectively configured with the used underlying protocol type and their respective class name. They are initiated by means of the E2ENP UA 128.

The configuration of the E2ENP UA 128 and its respective components can be performed either manually with the aid of a Graphical User Interface (GUI) or can be preset with configuration parameters read from a configuration file.

Concerning the E2ENP UA FSM 106, the following parameters are configurable:
 Thread-pool configuration parameters:
  Maximum number of threads in the E2ENP thread-pool.
  Selector indicating whether the pool should have a lazy initialization (i.e. threads are created only when required).
  Selector indicating whether thread-pool optimization is required (only when lazy initialization is enforced). For optimization reasons, the pool might be reconfigured at runtime based on the actual pool usage.
  Thread-pool optimization timer: Upon expiration of such timer, the optimization process should be applied (i.e. unused threads released).
 Timers (cf. FIGS. 56A and 56B).
 Mutex:
  Timer for detecting potential indefinite lock of the mutex, eventually with the aid of a low-priority instance of the FSM 106 (cf. TM in FIGS. 56A and 56B).
  The number of attempts to get said mutex is limited by a maximum number (Max-Attempts).

The SIP UA implementation 110 shall allow configuring at least the following parameters:
 Underlying Session Protocol: This is the protocol used by E2ENP for carrying its meta-messages (SIP, RMI, socket). In future specifications of E2ENP, other session-layer protocols could be used (e.g. H323).
 Underlying Transport Protocol: The type of transport protocol to be used by SIP. In future specifications, this parameter might become a configuration parameter of the SIP UA 110 itself.

The following subsection provides information about the decision to make communication between the E2ENP UA 128 and the Parser 112 respectively the Factory 114 synchronous. In this connection, the E2ENP UA 128 shall support multiple concurrent instances of the E2ENP UA FSM 106. In order to avoid an unbounded usage of OS resources, the E2ENP UA 128 shall enforce a thread pool.

Communication between the E2ENP UA 128 and the Parser 112 respectively Factory 114 could also be asynchronous, e.g. implemented by an active request interface and a passive confirmation interface. This option is not used within the scope of the underlying invention because some gain in performance and flexibility is opposed by much more complicated state models for the FSMs 106 of the E2ENP UA 128.

One consequence of this decision is that the E2ENP UA 128 and the Parser 112 (also the Factory 114) communicate synchronously, thus having to share a common address space, which in most circumstances is a reasonable assumption. Another consequence of this decision is that both the ParserFactory and the FactoryFactory have to be designed as threadsafe, re-entrant libraries.

Due to the discussion above, it is decided that communication between the E2ENP UA 128 and the Parser 112 as well as the Factory 114 is synchronous.

In conclusion, the main advantageous differences between the underlying invention and the state of the art shall be emphasized. Briefly summarized, the main benefits of the proposed approach consists in

- a QoS pre-negotiation with a lease-based management of pre-negotiated information, QoS negotiation, and QoS re-negotiation, and
- a resource reservation and/or release coordination offered by the E2ENP UA 128.

Moreover, the information to be negotiated (capabilities, application-level QoS Contracts, network-level QoS Contracts, stream-level adaptation paths, and stream-group-level adaptation paths) can be expressed in an interchangeable format in such a way that heterogeneous applications 130 and/or middleware 130 can easily agree on a reference model, which said applications 130 and/or said middleware 130 can then use for dynamically configuring Finite State Machines 106 (FSMs) in order to orchestrate local, peer, and network resources according to the preferences and profiles of the respective user, policies of the respective systems and network providers in a coordinated manner among a plurality of heterogeneous applications 130 and middleware 130 used by various peers.

Finally, said E2ENP UA 128 can be used for any session-layer protocol and session description language, a plurality of applications 130 and different types of middleware 130.

TABLE A

Used Abbreviations

| Abbr. | Brief Explanation |
|---|---|
| ABNF | Augmented Backus-Naur Form |
| API | Application Programming Interface |
| ASCII | American Standard Code for Information Interchange |
| E2ENP | End-to-End Negotiation Protocol |
| FSM | Finite State Machine |
| IF<X> | Interface <X> |
| IP | Internet Protocol |
| IPv6 | IP version 6 |
| LAN | Local Area Network |
| MIME | Multi-Purpose Internet Mail Extensions |
| MSC | Message Sequence Chart (UML) |
| OSI | Open Systems Interconnection |
| QoS | Quality of Service |
| RMI | Remote Method Invocation |
| RPC | Remote Procedure Call |
| SAP | Service Access Point |
| SDP | Session Description Protocol |
| SDPng | Session Description Protocol (next generation) |
| SIP | Session Initiation Protocol |
| UML | Unified Modeling Language |
| XML | Extensible Markup Language |

TABLE B

Depicted Features and their Corresponding Reference Signs

| No. | Technical Feature |
|---|---|
| 100 | block diagram showing the applied architecture for the User Agent (UA) of the End-to-End Negotiation Protocol (E2ENP) according to the underlying invention |
| 101a | E2ENP Management API (=interface IF1) between the E2ENP UA Factory 108 and the Management Entities 102 |
| 101b | E2ENP UA API (=interface IF2) between the E2ENP UA 128 and any application 130 or middleware 130 using the services offered by said E2ENP UA 128 |
| 101c | SIP UA Generic API (=interface IF3) between the E2ENP UA FSM 106 and the carrier protocol UA 110 (SIP, RMI, etc.) |
| 101d | Parser API (=interface IF4) between the E2ENP UA FSM 106 and the implemented Parser 112 |
| 101e | Factory API (=interface IF5) between the E2ENP UA FSM 106 and the implemented Factory 114 |
| 102 | E2ENP Management Entities of the E2ENP architecture 100 |
| 103 | Cache API between the Cache 104 and the E2ENP UA FSM 106 |
| 104 | two-stage Cache of the E2ENP architecture 100, connected to the Finite State Machine (FSM) 106 of the E2ENP User Agent (UA) 128 |
| 106 | Finite State Machine (FSM) applied to the E2ENP User Agent (UA) 128 of the E2ENP architecture 100 |
| 108 | E2ENP UA generation factory of the E2ENP architecture 100 |
| 108a | SIP-based E2ENP UA generation factory of the E2ENP architecture 100 |
| 110 | placeholder for the implementation of the carrier protocol (SIP, RMI, etc.) User Agent (UA), also referred to as Service Provider |
| 110a | SIP User Agent (UA) used for the UA implementation 110 of the carrier protocol within the applied E2ENP architecture 100 according to the first implementation example 200 |
| 110b | Java Remote Method Invocation (RMI)-based User Agent (UA) used for the UA implementation 110 of the carrier protocol within the applied E2ENP architecture 100 according to the second implementation example 300 |
| 110c | socket-based User Agent (UA) used for the UA implementation 110 of the carrier protocol within the applied E2ENP architecture 100 according to the third implementation example 400 |
| 112 | placeholder for the implementation of the applied Parser |
| 112a | SDPng Parser used for the Parser implementation 112 of the applied E2ENP architecture 100 according to the first implementation example 200 |
| 112b | Dummy Parser used for the Parser implementation 112 of the applied E2ENP architecture 100 according to the second implementation example 300. The Dummy Parser is used together with the Java RMI based UA 110b. |

TABLE B-continued

Depicted Features and their Corresponding Reference Signs

| No. | Technical Feature |
|---|---|
| 112c | Dummy Parser used for the Parser implementation 112 of the applied E2ENP architecture 100 according to the third implementation example 400. The Dummy Parser is used together with the socket based UA 110c. |
| 114 | placeholder for the implementation of the applied Factory |
| 114a | SDPng Factory used for the Factory implementation 114 of the applied E2ENP architecture 100 according to the first implementation example 200 |
| 114b | Dummy Factory used for the Factory implementation 114 of the applied E2ENP architecture 100 according to the second implementation example 300. The Dummy Factory is used together with the Java RMI based UA 110b. |
| 114c | Dummy Factory used for the Factory implementation 114 of the applied E2ENP architecture 100 according to the third implementation example 400. The Dummy Factory is used together with the socket based UA 110c. |
| 116 | Generation factory of the carrier protocol User Agent (UA) implementation |
| 116a | Java-based SIP agent 110a generation factory for the carrier protocol User Agent 110 for SIP according to the first implementation example 200 |
| 116b | RMI agent 110b generation factory for the carrier protocol User Agent 110 for Java RMI according to the second implementation example 300 |
| 116c | Socket-based agent 110c generation factory for the carrier protocol User Agent 110 for socket-based connections according to the third implementation example 400 |
| 118 | Generation factory of the applied Parser implementation 112 |
| 118a | SDPng Parser 112a generation factory (ParserFactory) of the applied Parser 112 according to the first implementation example 200 |
| 118b | Dummy Parser 112b generation factory (ParserFactory) of the applied Parser 112 according to the second implementation example 300 |
| 118c | Dummy Parser 112c generation factory (ParserFactory) of the applied Parser 112 according to the third implementation example 400 |
| 120 | Generation factory of the applied Factory implementation 114 |
| 120a | SDPng Factory 114a generation factory (FactoryFactory) of the applied Factory 114 according to the first implementation example 200 |
| 120b | Dummy Factory 114b generation factory (FactoryFactory) of the applied Factory 114 according to the second implementation example 300 |
| 120c | Dummy Factory 114c generation factory (FactoryFactory) of the applied Factory 114 according to the third implementation example 400 |
| 122 | Java-based SIP stack (JSIP) applied as a component of the said SIP User Agent (UA) 110a |
| 124a | Remote Method Invocation (RMI) skeleton of the Java RMI-based User Agent (UA) 110b according to the second implementation example 300 |
| 124b | Remote Method Invocation (RMI) stub of the Java RMI-based User Agent (UA) 110b according to the second implementation example 300 |
| 126a | TX socket of the socket-based User Agent (UA) 110c according to the third implementation example 400 used for transmitting strings or objects |
| 126b | RX socket of the socket-based User Agent (UA) 110c according to the third implementation example 400 used for receiving strings or objects |
| 126c | Adapter of the socket-based User Agent (UA) 110c according to the third implementation example 400 used for receiving and/or transmitting strings or objects using the said sockets 126a + b |
| 128 | combined unit comprising said Cache 104, said E2ENP UA FSM 106, and said E2ENP UA Factory 108, in the following referred to as E2ENP-based User Agent (E2ENP UA) |
| 130 | multi-session multimedia application or QoS Broker (middleware) using the E2ENP UA API 101b to connect with the E2ENP UA 128 |
| 200 | first implementation example of the applied architecture for the User Agent (UA) of the End-to-End Negotiation Protocol (E2ENP) according to one embodiment of the underlying invention using a Java-based SIP Stack (JSIP) and SDPng Parser and Factory |
| 300 | second implementation example of the applied architecture for the User Agent (UA) of the End-to-End Negotiation Protocol (E2ENP) according to one embodiment of the underlying invention using Sun's Java Remote Method Invocation (RMI) |

TABLE B-continued

Depicted Features and their Corresponding Reference Signs

| No. | Technical Feature |
|---|---|
| 400 | third implementation example of the applied architecture for the User Agent (UA) of the End-to-End Negotiation Protocol (E2ENP) according to one embodiment of the underlying invention using the socked-based User Datagram Protocol (UDP) or Transmission Control Protocol (TCP) |
| 500 | UML class diagram showing the org::mind::e2enp package |
| 502 | E2ENPUSerAgentListener interface within the org::mind::e2enp package |
| 504 | Provider interface within the org::mind::e2enp package |
| 506 | OffererListener interface, generalized to said interface Listener 502 within the org::mind::e2enp package |
| 508 | AnswererListener interface, generalized to said interface Listener 502 within the org::mind::e2enp package |
| 510 | ManagerProvider interface |
| 512 | ManagerListener interface |
| 514 | class ConfigurationRequest |
| 516 | class ParserFactoryConfiguration |
| 600 | Augmented Backus-Naur Form (ABNF) of the E2ENP address as a Universal Resource Identifier (URI) |
| 700 | first message sequence chart (MSC) showing the pre-negotiation procedure enabled by the User Agent (UA) 128 of the End-to-End Negotiation Protocol (E2ENP) |
| 702 | class OffererServiceUser, derived from the class E2ENPUserAgentListener, implementing the Listener interface 502 |
| 704 | class OffererServiceProvider, derived from the class Provider, which implements the Provider interface 504 |
| 706 | class AnswererServiceProvider, derived from the class Provider, which implements the Provider interface 504 |
| 708 | class AnswererServiceUser, derived from the class E2ENPUserAgentListener, implementing the Listener interface 502 |
| 800 | second message sequence chart (MSC) showing the session establishment with a QoS negotiation and resource reservation coordination enabled by the User Agent (UA) of the End-to-End Negotiation Protocol (E2ENP) |
| 900 | UML class diagram showing the org::mind::e2enp::Cache sub-package |
| 902 | class LevelOneCache representing the first level (L1) of the two-stage Cache 104 |
| 904 | class LevelTwoCache representing the second level (L2) of the two-stage Cache 104 |
| 906 | class LevelOneEntry encompassing methods for storing and loading information to/from the first level (L1) of said two-stage Cache 104 |
| 908 | class LevelTwoEntry encompassing methods for storing and loading information to/from the second level (L2) of said two-stage Cache 104 |
| 1000 | diagram showing the top-level view of an Extensible Markup Language (XML) description used for the End-to-End Negotiation Protocol (E2ENP) |
| 1001 | Complex Type definition descType of the SDPng desc element. The illustration also incorporates the E2ENP specific changes made by the redefine mechanism. |
| 1002 | "e2enp:purpose" child element of the "desc" element. |
| 1003 | "sdpng:def" child element of the "desc" element. |
| 1004 | "sdpng:cfg" child element of the "desc" element. |
| 1005 | "sdpng:constraints" child element of the "desc" element. |
| 1006 | "sdpng:conf" child element of the "desc" element. |
| 1100 | diagram showing the XML substitution groups used for the End-to-End Negotiation Protocol (E2ENP) |
| 1101 | Complex Type definition descType of the SDPng desc element. The illustration also incorporates the E2ENP specific changes made by the redefine mechanism. |
| 1102 | "e2enp:purpose" child element of the "desc" element. |
| 1103 | "sdpng:def" child element of the "desc" element. |
| 1104 | "sdpng:cfg" child element of the "desc" element. |
| 1105 | "sdpng:constraints" child element of the "desc" element. |
| 1106 | "sdpng:conf" child element of the "desc" element. |
| 1107 | "sdpng:d" element, head of the substitution group which defines the valid child elements of the "sdpng:def" section. |
| 1108 | "audio:codec" element, member of the "sdpng:d" substitution group. |
| 1109 | "e2enp:closdef" element, member of the "sdpng:d" substitution group. |
| 1110 | "rtp:pt" element, member of the "sdpng:d" substitution group. |
| 1111 | "rtp:transport" element, member of the "sdpng:d" substitution group. This element in turn is head of the "rtp:transport" substitution group. |

TABLE B-continued

Depicted Features and their Corresponding Reference Signs

| No. | Technical Feature |
|---|---|
| 1112 | "rtp:udp" element, member of the "rtp:transport" substitution group. |
| 1113 | "video:codec" element, member of the "sdpng:d" substitution group. |
| 1200 | diagram showing the XML purpose element used for the End-to-End Negotiation Protocol (E2ENP) |
| 1201 | "purpose" element. Can be used to convey additional information about the description following in the protocol data unit (PDU). |
| 1202 | "e2enp:use" element. Child of the "purpose" section, can be used to indicate referenced sessions. |
| 1203 | "description" element. Can be used to indicate a description PDU. |
| 1204 | "mediation" element. Can be used to indicate a mediation PDU. |
| 1205 | "e2enp:session" element |
| 1206 | "expires" element |
| 1300 | diagram showing the XML qosdef element used for the End-to-End Negotiation Protocol (E2ENP) |
| 1300' | XML qosdef element |
| 1301 | "audio:codec" element. Describes an audio capability of the system. |
| 1302 | "video:codec" element. Describes an video capability of the system. |
| 1303 | "rtp:pt" element. Can be used to specify a desired payload format for a given capability. |
| 1304 | "e2enp:policy" element. Can be used to specify the resource management policy to enforce. |
| 1305 | "e2enp:audio" element. Can be used to describe the QoS contracts for audio streams. |
| 1306 | "e2enp:video" element. Can be used to describe the QoS contracts for video streams. |
| 1307 | "e2enp:control" element. Can be used to describe the QoS contracts for control streams. |
| 1308 | "e2enp:data" element. Can be used to describe the QoS contracts for data streams. |
| 1309 | "rtp:map" element. Can be used to define a mapping between an application level QoS Contract and a specific RTP payload format. |
| 1310 | "e2enp:contract" element |
| 1311 | "predicate" element |
| 1312 | "criterion" element |
| 1400' | XML qoscfg element |
| 1400 | diagram showing the XML qoscfg element used for the End-to-End Negotiation Protocol (E2ENP) |
| 1401 | "e2enp:context" element. Can be used to define associations between data streams and thus to express time synchronization and/or QoS correlation. Briefly, this element defines high level QoS Contracts. |
| 1402 | "e2enp:adapath" element |
| 1403 | "default" element |
| 1404 | "alt" element |
| 1405 | "event" element |
| 1406 | "path" element |
| 1407 | "comp" element |
| 1408 | "constraints" element |
| 1409 | "par" element |
| 1500 | UML message sequence chart (MSC) showing the interaction between the E2ENP User Agent (UA) 128 according to the underlying invention and the applied Parser 112 and Cache 104 |
| 1700 | UML class diagram showing the general structure of a Document Object Model (DOM) tree |
| 1702 | class DocumentTree, which models the general structure of said DOM tree and can therefore be interpreted as the document root element |
| 1704 | class DocumentNode aggregated to said class DocumentTree 1702, which in turn aggregates between 0 and n children, thus recursively describing the tree structure |
| 1800 | UML class diagram showing a structural overview of the Parser implementation 112 using a "visitor design pattern" for traversing the DOMTree 1804 and generating a XMLObject 1802 |
| 1802 | class XML Object used within the Parser implementation 112 |
| 1804 | class DOMTree, which models the general structure of said DOM tree and can therefore be interpreted as the document root element |
| 1806 | class DOMNode aggregated to said class DOMTree 1804 |
| 1808 | generic Parser visitor class pVisitor, which visits between 1 and N DOMNodes |

TABLE B-continued

Depicted Features and their Corresponding Reference Signs

| No. | Technical Feature |
|---|---|
| 1810a | first specialized DOMNode of said class DOMNode 1806 |
| 1810n | N-th specialized DOMNode of said class DOMNode 1806 |
| 1812a | first specialized Parser visitor class pVisitor 1, which is applied to handle the first derived DOMNode |
| 1812n | N-th specialized Parser visitor class pVisitor N, which is applied to handle the N-th derived DOMNode |
| 1900 | UML message sequence chart (MSC) showing the interaction between the E2ENP User Agent (UA) 128 according to the underlying invention and the applied Factory 114 and Cache 104 |
| 2000 | UML class diagram showing a structural overview of the Factory implementation 114 |
| 2002 | generic Factory visitor class fVisitor, which visits between 1 and N instances of ObjectGraphNode classes |
| 2004 | class ObjectGraphNode used within the Factory implementation 114 |
| 2006a | first specialized Factory visitor class fVisitor 1, which is applied to handle the first derived Node 2008a of the class ObjectGraphNode 2004 |
| 2006n | N-th specialized Factory visitor class fVisitor N, which is applied to handle the N-th derived Node 2008n of the class ObjectGraphNode 2004 |
| 2008a | first specialized Node (subclass) of the class ObjectGraphNode 2004 |
| 2008n | N-th specialized Node (subclass) of the class ObjectGraphNode 2004 |
| 2100 | UML class diagram showing the org::mind::sip::sipApi package |
| 2102 | class management of the org::mind::sip::sipApi package |
| 2104 | class userAgent of the org::mind::sip::sipApi package |
| 2106 | class registrar of the org::mind::sip::sipApi package |
| 2107 | class time of the org::mind::sip::sipApi package |
| 2108 | interface SipListener of the org::mind::sip::sipApi package |
| 2110 | interface SipProvider of the org::mind::sip::sipApi package |
| 2112 | class SipExpiresHandling of the org::mind::sip::sipApi package |
| 2114 | class SipEndUser of the org::mind::sip::sipApi package |
| 2200 | UML class diagram showing the org::mind::sip::sipApi::userAgent package |
| 2202 | interface SipUserAgentListener of the org::mind::sip::sipApi::userAgent package |
| 2204 | interface SipUserAgentServerListener of the org::mind::sip::sipApi::userAgent package, derived from the class SipUserAgentListener 2202 |
| 2206 | interface SipUserAgentClientListener of the org::mind::sip::sipApi::userAgent package, derived from the class SipUserAgentListener 2202 |
| 2208 | Class SipConnectionReq of the org::mind::sip::sipApi::userAgent package |
| 2210 | interface SipUserAgentType of the org::mind::sip::sipApi::userAgent package |
| 2212 | interface SipUserAgentFactory of the org::mind::sip::sipApi::userAgent package |
| 2214 | class SipUserAgent of the org::mind::sip::sipApi::userAgent package, derived from the class SipUserAgentType 2210 |
| 2214a | class UAClient of the org::mind::sip::sipApi::userAgent package, derived from the class SipUserAgent 2214 |
| 2214b | class UAServer of the org::mind::sip::sipApi::userAgent package, derived from the class SipUserAgent 2214 |
| 2216 | class SipNegotiationModel of the org::mind::sip::sipApi::userAgent package |
| 2218 | class SipRegistrationReq of the org::mind::sip::sipApi::userAgent package |
| 2220 | class SipRegistrationCfm of the org::mind::sip::sipApi::userAgent package |
| 2300 | UML class diagram showing the org::mind::sip::sipApi::registrar package |
| 2302 | interface SipRegistrarListener of the org::mind::sip::sipApi::registrar package |
| 2304 | interface SipRegistrarType of the org::mind::sip::sipApi::registrar package |
| 2306 | class SipRegistrar of the org::mind::sip::sipApi::registrar package, derived from said class Sip-RegistrarType 2304 |
| 2308 | class SipRegistrationInd of the org::mind::sip::sipApi::registrar package |

TABLE B-continued

Depicted Features and their Corresponding Reference Signs

| No. | Technical Feature |
|---|---|
| 2310 | class SipRegistrationRsp of the org::mind::sip::sipApi::registrar package |
| 2312 | interface SipRegistrarFactory of the org::mind::sip::sipApi::registrar package |
| 2400 | UML class diagram showing the org::mind::sip::sipApi::management package |
| 2402 | interface SipManagementListener of the org::mind::sip::sipApi::management package |
| 2404 | interface SipManager of the org::mind::sip::sipApi::management package |
| 2406 | class SipConfigurationReq of the org::mind::sip::sipApi::management package |
| 2500 | UML class diagram showing the org::mind::sip::sipApi::time package |
| 2502 | interface SipExpiresType of the org::mind::sip::sipApi::time package |
| 2504 | class SipParseException of the org::mind::sip::sipApi::time package |
| 2506 | class SipExpires of the org::mind::sip::sipApi::time package |
| 2508 | interface SipExpiresFactory of the org::mind::sip::sipApi::time package |
| 2600 | UML message sequence chart (MSC) showing the configuration of the Service Provider and the binding of the Service User with said Service Provider |
| 2700 | UML message sequence chart (MSC) showing the connection establishment between the User Agents of a client and a server |
| 2800 | UML message sequence chart (MSC) showing the OPTIONS method used for the End-to-End Negotiation Protocol (E2ENP) |
| 2900 | UML message sequence chart (MSC) showing the connection release between the User Agents of a client and a server |
| 3000 | first state transition diagram for a nested Finite State Machine (FSM) showing the mutex-related procedures executed in the root state |
| 3100 | second state transition diagram for a nested Finite State Machine (FSM) showing the mutex-related procedures executed in the NegOfferer sub-state |
| 3200 | third state transition diagram for a nested Finite State Machine (FSM) showing the mutex-related procedures executed in the NegAnswerer sub-state |
| 3300 | fourth state transition diagram for a nested Finite State Machine (FSM) showing the mutex-related procedures executed in the ReNegOfferer sub-state |
| 3400 | fifth state transition diagram for a nested Finite State Machine (FSM) showing the mutex-related procedures executed in the ReNegAnswerer sub-state |
| 3500 | sixth state transition diagram for the ResvMtx Finite State Machine (FSM) for allowing multiple requests to seize the mutex in a coordinated manner, based on their priority |
| 3600 | seventh state transition diagram for a nested Finite State Machine (FSM) showing the mutex-related procedures executed in the WaitForCoordDone sub-state |
| 3700 | UML message sequence chart (MSC) showing the pre-negotiation procedure needed for the correlation of the Application Programming Interface (API) of the E2ENP User Agent (UA) and the generic Application Programming Interface (API) of the SIP User Agent (UA), thereby using the above-mentioned Finite State Machine (FSM) of the E2ENP User Agent (UA) |
| 3702 | class OffererSIPServiceUser, implementing the interface SipUserAgentClientListener 2206 |
| 3704 | class OffererSIPServiceProvider, derived from the class SipUserAgent 2214 |
| 3706 | class AnswererSIPServiceProvider, derived from the class SipUserAgent 2214 |
| 3708 | class AnswererSIPServiceUser, implementing the interface SipUserAgentServerListener 2204 |
| 3800 | UML message sequence chart (MSC) showing the session establishment with the QoS negotiation procedure and the resource reservation coordination needed for the correlation of the Application Programming Interface (API) of the E2ENP User Agent (UA) and the generic Application Programming Interface (API) of the SIP User Agent (UA), thereby using the above-mentioned Finite State Machine (FSM) of the E2ENP User Agent (UA) |

TABLE B-continued

Depicted Features and their Corresponding Reference Signs

| No. | Technical Feature |
|---|---|
| 3900 | FIG. 38: table showing a list of primitives implemented by the Service Provider, based on a Java implementation of the Application Programming Interface (API) applied to the User Agent (UA) of the End-to-End Negotiation Protocol (E2ENP) |
| 4000 | FIGS. 39A and 39B: table showing a list of primitives to be implemented by the Service User, based on a Java implementation of the Application Programming Interface (API) applied to the User Agent (UA) of the End-to-End Negotiation Protocol (E2ENP) |
| 4100 | FIG. 40: table showing a list of primitives to be implemented by the Service User acting as an Offerer, based on a Java implementation of the Application Programming Interface (API) applied to the User Agent (UA) of the End-to-End Negotiation Protocol (E2ENP) |
| 200 | FIG. 41: table showing a list of primitives to be implemented by the Service User acting as an Answerer, based on a Java implementation of the Application Programming Interface (API) applied to the User Agent (UA) of the End-to-End Negotiation Protocol (E2ENP) |
| 4300 | FIG. 42: table showing the methods provided by the Application Programming Interface (API) of the first Cache level |
| 4400 | FIG. 43: table showing the methods provided by the Application Programming Interface (API) of the second Cache level |
| 4500 | FIGS. 44A and 44B: table showing a list of primitives which have to be implemented by the Application Programming Interface (API) of the Parser |
| 4600 | FIG. 45: table showing a list of primitives which have to be implemented for generating a specific parser instance |
| 4700 | FIG. 46: table showing a list of primitives which have to be implemented by the Application Programming Interface (API) of the Factory |
| 4800 | FIG. 47: table showing a list of primitives which have to be implemented for generating a specific factory instance |
| 4900 | FIG. 48: table showing the methods provided by the well-known factory-factory class E2ENPContentHandlerFactory |
| 5000 | FIG. 49: table showing a list of primitives implemented by the Service Provider, based on a Java implementation of the generic Application Programming Interface (API) applied to the User Agent (UA) of the End-to-End Negotiation Protocol (E2ENP) |
| 5100 | FIG. 50: table showing a list of client-side-specific primitives implemented by the Service User, based on a Java implementation of the generic Application Programming Interface (API) applied to the User Agent (UA) of the End-to-End Negotiation Protocol (E2ENP) |
| 5200 | FIG. 51: table showing a list of server-side-specific primitives implemented by the Service User, based on a Java implementation of the generic Application Programming Interface (API) applied to the User Agent (UA) of the End-to-End Negotiation Protocol (E2ENP) |
| 5300 | FIG. 52: table showing a list of both client-side- and server-side-specific primitives implemented by the Service User, based on a Java implementation of the generic Application Programming Interface (API) applied to the User Agent (UA) of the End-to-End Negotiation Protocol (E2ENP) |
| 5400 | FIG. 53: table showing a list of primitives implemented by the Service Provider, based on a Java implementation of the generic Application Programming Interface (API) applied to the User Agent (UA) of the End-to-End Negotiation Protocol (E2ENP) |
| 5500 | FIG. 54: table showing a list of primitives implemented by the Service User, based on a Java implementation of the generic Application Programming Interface (API) applied to the User Agent (UA) of the End-to-End Negotiation Protocol (E2ENP) |
| 5600 | FIGS. 55A-D: state transition table showing a survey of the applied exception events |
| 5700 | FIGS. 56A and 56B: table showing the applied timers applied to the End-to-End Negotiation Protocol (E2ENP) according to the underlying invention |

The invention claimed is:

1. A system offering an Application Programming Interface for multi-stream multimedia applications running on at least two registered end peers participating in a mobile telecommunication session or middleware that connects to a mobile network, the system providing guaranteed end-to-end quality and resource capabilities using a concept of concatenated End-to-End Negotiation Protocol (E2ENP) phases, the system comprising:
   a processor in each of the two registered end peers, the processors being configured to provide:
      a pre-negotiation between the two registered end peers of a multiplicity of alternative capabilities and QoS Contracts,
      management of leased pre-negotiated information,
      session establishment between the two registered end peers with negotiation of a multiplicity of alternative capabilities or QoS Contracts by referencing pre-negotiated information, and
      a dynamic re-negotiation between the two registered end peers of the end-to-end quality and capabilities by referencing the pre-negotiated information, wherein information to be negotiated is expressed in an interchangeable format so as to allow the multi-stream multimedia applications to agree on a specific reference model of the negotiated information, which can then be used for dynamically configuring Finite State Machines to orchestrate local, peer, and network resources according to the preferences and profiles of the respective user; and
   a unit configured to
      pre-cache information during the execution of a given E2ENP pre-negotiation or negotiation procedure, wherein the pre-cached data remains cached for future reference during a later E2ENP session once the given procedure has been successfully completed, and
      to cache information which can be applied as a reference to data, which has already been (pre-)negotiated among the end peers, during a new E2ENP pre-negotiation or negotiation procedure.

2. The system according to claim 1, wherein the system is internally decomposed into a set of Finite State Machines coordinating the internal processes and Application Programming Interfaces.

3. The system according to claim 2, wherein the multi-stream multimedia applications or the middleware use the Finite State Machines for a dynamic configuration.

4. The system according to claim 1, herein the system is configured to support multiple concurrent users.

5. The system according to claim 1, further comprising a two-stage E2ENP Cache that manages negotiation object identifiers in order to decouple an identification scheme of a specific application or middleware from one specified for the E2ENP by non-persistently storing and retrieving
   E2ENP session identifiers referring to the respective mobile telecommunication session,
   the E2ENP session identifiers referring to a respective Service Provider handled by the Finite State Machine of a unit, and
   the E2ENP session identifiers referring to a respective Service User handled by any application or middleware using services offered by the unit.

6. The system according to claim 1, wherein E2ENP session-layer protocol APIs are independent of an actually used session-layer protocol and session description protocol implementations.

7. The system according to claim 1, wherein a Factory API representing an interface (IFS) between a unit and a Factory instance encodes an E2ENP session description.

8. The system according to claim 7, wherein a Parser instance and the Factory instance are configured independently by using the same protocol.

9. The system according to claim 1, further comprising a Parser API representing an interface (IF4) between a unit and a Parser instance that decodes an E2ENP session description.

10. The system according to claim 1, further comprising a novel usage of a Session Initiation Protocol (SIP) in conjunction with extensions of a Session Description Protocol (SDP) or Session Description Protocol—Next Generation (SDPng), respectively.

11. The system according to claim 10, wherein a session-layer protocol and the Session Description Protocol (SDP) or Session Description Protocol-Next Generation (SDPng), respectively, are independently configurable.

12. A telecommunications network, comprising the system according to claim 1.

13. A computer software program product including a non-transitory medium encoded thereon with instructions that when executed on a mobile terminal in a wireless network environment, causes the mobile terminal to implement the system according to claim 1.

14. The system according to claim 1, wherein the negotiation of a multiplicity of alternative capabilities or QoS Contracts includes negotiation of capabilities, application-level QoS Contracts, network-level QoS contracts, stream-level adaptation paths, and stream-group-level adaptation paths.

15. A negotiation method providing guaranteed end-to-end quality and resource capabilities for multi-stream multimedia applications running on at least two registered end peers participating in a mobile telecommunication session or middleware that connects to a mobile network to dynamically adapt to changes in transmission quality, which is based on extensions of an End-to-End Negotiation Protocol (E2ENP), the method providing:
   a pre-negotiation between the two registered end peers of a multiplicity of alternative capabilities and QoS Contracts,
   management of leased pre-negotiated information,
   session establishment between said two registered end peers with negotiation of a multiplicity of alternative capabilities or QoS Contracts and coordination of terminal and network resource reservations by referencing pre-negotiated information, and
   a fast, dynamic re-negotiation between the two registered end peers of the end-to-end quality and capabilities using the concept of concatenated E2ENP phases by referencing the pre-negotiated information,
   the method comprising
   expressing information to be negotiated in an inter-changeable format so as to allow the multi-stream multimedia applications to agree on a specific reference model of the negotiated information, which can then be used for dynamically configuring Finite State Machines to orchestrate local, peer, and network resources according to the preferences and profiles of the respective user
   pre-cache information during the execution of a given E2ENP pre-negotiation or negotiation procedure, wherein the pre-cached data remains cached for future reference during a later E2ENP session once the given procedure has been successfully completed, and to cache information which can be applied as a reference to data, which has already been (pre-)negotiated among the end peers, during a new E2ENP pre-negotiation or negotiation procedure.

16. The negotiation method according to claim 15, wherein a resource reservation coordination process is based on a multi-phase call-setup mechanism that makes network QoS and security establishment a precondition to sessions initiated by a session-layer protocol and described by a session description protocol implementation, network resource reservation mechanisms are deployed before a session is started, and Indication (Ind) and Confirmation (Cfm) primitives, which are invoked by a unit to a registered client side of the middleware in order to respectively indicate an arrival of a particular message exchange or confirm a conclusion of a given message exchange, are an integral part of the E2ENP and mapped to a E2ENP qosdef section, which either specifies capabilities of a peer or defines validated QoS contracts that have been validated by entities using the unit, and its corresponding negotiation process.

17. The negotiation method according to claim 15, further comprising a mandatory synchronization of the reservation processes between different peers.

18. The negotiation method according to claim 15, wherein in case no network resource reservation is conducted by the end peer at an Offerer side, the Offerer being a peer who is initiating a session establishment with QoS negotiation and resource reservation on the peer who decides to initiate a re-negotiation, the unit of another end peer acting as an Answerer determines this case by examining preconditions made by the Offerer and correspondingly enables the Answerer to deal with resource reservation coordination.

19. The negotiation method according to claim 15, further comprising a step of allowing both end-to-end and segmented reservations, wherein network resource reservation is done locally on beforehand with no cost or major impact on session establishment.

20. The negotiation method according to claim 15, wherein in case a multi-stream multimedia application or middleware wishes to execute a pre-reservation of network resources, the E2ENP signaling gives a right timing to the application or middleware, respectively, thereby informing it when resource reservations at all sides have been accomplished.

21. The negotiation method according to claim 15, wherein a new E2ENP syntax, which allows that E2ENP addresses identifying different E2ENP users, which are passed on by the applied pre-negotiation and negotiation primitives and mapped to a specific syntax used by an underlying session-layer protocol that is used for piggybacking E2ENP information, are independent of the session-layer protocol or a respective transport protocol used underneath by the unit.

22. A contention resolution method used for the negotiation method according to claim 15, which is applied in case of two peers initiating E2ENP phases at a same time, wherein a E2ENP User Agent does not only include a session identifier sent by an Offerer, the Offerer being a peer who is initiating a session establishment with QoS negotiation and resource reservation on the peer who decides to initiate a re-negotiation, but also a hash thereof as a substitute for the session identifier in any subsequent session-layer protocol message which takes an IP address of a computing unit where the E2ENP User Agent is active into account and a time stamp, which is applied whenever a negotiation or pre-negotiation phase is initiated.

23. The contention resolution method according to claim 22, wherein in case two peers are not already involved in multimedia sessions, each peer compares the hash it has generated with the one received from the peer, and the peer with a biggest value is automatically chosen as the Offerer and thus proceeds with the pre-negotiation or negotiation phase as such, whereas the other peer automatically moves to an Answerer mode.

24. The contention resolution method according to claim 22, wherein in case two peers are already involved in multimedia sessions, a peer whose request has been rejected applies an unplanned re-negotiation procedure after a peer whose request has been accepted has completed its negotiation procedure, and the unplanned re-negotiation procedure negotiates upgraded or new information during a lifetime of a session.

* * * * *